(12) United States Patent
Panchal et al.

(10) Patent No.: US 10,992,576 B1
(45) Date of Patent: *Apr. 27, 2021

(54) VIRTUAL PERFORMANCE HUB

(71) Applicant: Equinix, Inc., Redwood City, CA (US)

(72) Inventors: Pragnesh Shashikant Panchal, Santa Clara, CA (US); Paul R. Mason, San Jose, CA (US); William Breakell Long, Louisville, CO (US)

(73) Assignee: EQUINIX, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,682

(22) Filed: Jul. 15, 2019

Related U.S. Application Data

(63) Continuation of application No. 15/491,802, filed on Apr. 19, 2017, now Pat. No. 10,355,989.

(60) Provisional application No. 62/426,006, filed on Nov. 23, 2016, provisional application No. 62/325,171, filed on Apr. 20, 2016.

(51) Int. Cl.
*H04L 12/713* (2013.01)
*H04L 12/46* (2006.01)

(52) U.S. Cl.
CPC .......... *H04L 45/586* (2013.01); *H04L 12/467* (2013.01)

(58) Field of Classification Search
None
See application file for complete search history.

(56) References Cited

U.S. PATENT DOCUMENTS

| | | |
|---|---|---|
| 9,787,559 B1 | 10/2017 | Schroeder |
| 10,355,989 B1 | 7/2019 | Panchal et al. |
| 2008/0205410 A1 | 8/2008 | Raut |
| 2010/0080235 A1 | 4/2010 | Yamate et al. |
| 2013/0268588 A1 | 10/2013 | Chang et al. |
| 2013/0332602 A1 | 12/2013 | Nakil et al. |
| 2015/0134485 A1 | 5/2015 | Kim et al. |
| 2015/0295731 A1 | 10/2015 | Bagepalli et al. |
| 2016/0072727 A1 | 3/2016 | Leafe et al. |
| 2016/0080502 A1 | 3/2016 | Yadav et al. |
| 2016/0088092 A1 | 3/2016 | Cardona-Gonzalez et al. |
| 2016/0094328 A1 | 3/2016 | Wang et al. |
| 2016/0127254 A1 | 5/2016 | Kumar et al. |

(Continued)

OTHER PUBLICATIONS

Response to Advisory Action dated Mar. 25, 2020 from U.S. Appl. No. 15/396,349, filed Apr. 27, 2020, 12 pp.

(Continued)

*Primary Examiner* — Saumit Shah
(74) *Attorney, Agent, or Firm* — Shumaker & Sieffert, P.A.

(57) ABSTRACT

In general, this disclosure describes a virtual router configured to enable multi-cloud service provider connectivity. The multi-cloud service provider connectivity may enable network function virtualization (NFV) services to be applied to network traffic such as enterprise traffic. The NFV services may be offsite, cloud-based NFV services or data center provider-hosted NFV services, for example. In one example, a system comprises at least one computing device deployed to a data center by a data center provider and configured by the data center provider to execute a virtual router, wherein the virtual router is configurable by a customer to route packet flows to one or more servers that host network function virtualization services for application of the network function virtualization services to the packet flows.

20 Claims, 32 Drawing Sheets

(56) References Cited

U.S. PATENT DOCUMENTS

| | | |
|---|---|---|
| 2016/0127454 A1 | 5/2016 | Maheshwari et al. |
| 2016/0134520 A1 | 5/2016 | Kapadia et al. |
| 2016/0182378 A1 | 6/2016 | Basavaraja et al. |
| 2016/0182380 A1 | 6/2016 | Mehra et al. |
| 2016/0218918 A1 | 7/2016 | Chu et al. |
| 2016/0308762 A1 | 10/2016 | Teng et al. |
| 2016/0337473 A1 | 11/2016 | Rao |
| 2016/0337474 A1 | 11/2016 | Rao |
| 2016/0344628 A1 | 11/2016 | Rocker et al. |
| 2016/0373474 A1 | 12/2016 | Sood et al. |
| 2018/0091395 A1 | 3/2018 | Shinohara |
| 2018/0115485 A1 | 4/2018 | Chiba |

OTHER PUBLICATIONS

Notice of Allowance from U.S. Appl. No. 15/396,349, dated Jun. 29, 2020, 9 pp.

"Cisco Virtual Topology System: Data Center Automation for Next-Generation Cloud Architectures," Cisco Systems, Inc., Jun. 2015, 16 pp.

"Network Functions Virtualization (NFV); Management and Orchestration," ETSI GS NFV-MAN 001 v1.1.1, European Telecommunications Standards Institute (ETSI), Dec. 2014, 184 pp.

Rosen et al., "BGP/MPLS IP Virtual Private Networks (VPNs)," RFC 4364, Network Working Group, The Internet Society, Feb. 2006, 47 pp.

U.S. Appl. No. 15/414,697, filed Dec. 6, 2013, by Felbinger et al.

U.S. Appl. No. 15/475,957, by Wagner et al., filed Mar. 31, 2017.

U.S. Appl. No. 15/396,349, filed Dec. 30, 2016, by Panchal et al.

Prosecution History from U.S. Appl. No. 15/396,349, dated Mar. 7, 2017 through Nov. 21, 2019, 227 pp.

Prosecution History from U.S. Appl. No. 15/491,802, dated Nov. 28, 2018 through Jun. 18, 2019, 29 pp.

Final Office Action from U.S. Appl. No. 15/396,349, dated Dec. 19, 2019, 17 pp.

Response to the Office Action dated Dec. 19, 2019, from U.S. Appl. No. 15/396,349, filed Feb. 19, 2020, 5 pp.

Advisory Action from U.S. Appl. No. 15/396,349, dated Mar. 25, 2020, 3 pp.

U.S. Appl. No. 17/080,418, filed Oct. 26, 2020, naming inventors Panchal, et al.

US 10,992,576 B1

VIRTUAL PERFORMANCE HUB

This application is a continuation of U.S. application Ser. No. 15/491,802, filed Apr. 19, 2017, which claims the benefits of U.S. Provisional Patent Application No. 62/325,171, filed Apr. 20, 2016; and U.S. Provisional Patent Application No. 62/426,006, filed Nov. 23, 2016; the entire contents of each of which is incorporated by reference herein.

TECHNICAL FIELD

The disclosure relates to computer networks and, more specifically, to connections among cloud service customers and cloud service providers.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, this disclosure describes a virtual router configured to enable multi-cloud service provider connectivity. The multi-cloud service provider connectivity may enable network function virtualization (NFV) services to be applied to network traffic such as enterprise traffic. The NFV services may be offsite, cloud-based NFV services or data center provider-hosted NFV services, for example.

For example, an enterprise that is a customer of a cloud-based services exchange (or "cloud exchange") provider may not be co-located at the cloud exchange, in that the enterprise does not lease space of a data center that hosts the cloud exchange. For example, the enterprise may not deploy enterprise equipment for direct connection to the cloud exchange and interconnection to one or more cloud service provider network reachable by the cloud exchange. The enterprise may nevertheless send and receive network traffic via the cloud exchange, such as by contracting with a network service provider that provides connectivity with the cloud exchange for the enterprise. The network service provider may provide the connectivity using a cross-connect between the network service provider network and the cloud exchange network.

One or more computing devices co-located at the data center may host a virtual router configurable by the enterprise. The virtual router may be a software function that reproduces, in software, operations of a dedicated, hardware-based layer 3 network router. The cloud exchange network may be configured with a virtual circuit, e.g., a virtual layer 2 (L2) or layer 3 (L3) connection to transport network traffic between the one or more computing devices that host the virtual router and the cross-connect between the network service provider network and the cloud exchange network. Moreover, the cloud exchange network may be further configured with one or more virtual circuits that offer, to the virtual router, network connectivity with one or more of cloud service provider networks that host NFV services and are connected to the cloud exchange.

By configuring the virtual router to route enterprise network traffic sourced by or destined to the enterprise network via the network service provider, the enterprise may cause enterprise network traffic to flow along a NFV services path of one or more NFV services hosted by the cloud service provider networks. The virtual router thus operates as an integration point (or hub) for inter-NFV services hosted by cloud service provider networks, and the virtual router may be usable for service linking, and as a termination point for Internet service. Moreover, the virtual router becomes the control point for directing traffic among network functions and, because the virtual router is physically located within the data center, the virtual router performance hub techniques described herein may enable enterprises to connect physical assets (e.g., Physical network functions or 'PNFs') located in the customer cages to the virtual performance hub to achieve low-latency and more easily consumable network function delivery to the customer.

In some cases, the virtual router techniques described herein may remove the requirement for an enterprise to physically deploy equipment within the data center that hosts the cloud exchange. As a result, the techniques may reduce, and in some cases eliminate, on-site visits to the cloud exchange data center to configure network services for application to enterprise traffic. The techniques may in some cases reduce or even eliminate requests by the enterprise to the cloud exchange provider to configure the cloud exchange network to provide interconnectivity for enterprise network traffic between the enterprise/NSP and an NFV service, between NFV services, or between an NFV service and the Internet, as examples.

In one example, a system comprises at least one computing device deployed to a data center by a data center provider and configured by the data center provider to execute a virtual router, wherein the virtual router is configurable by a customer to route packet flows to one or more servers that host network function virtualization services for application of the network function virtualization services to the packet flows.

In one example, a data center comprises a data center network comprising a physical network layer having one or more physical ports to receive cross connects with two or more networks of customer equipment co-located in the data center; and at least one computing device deployed to the data center by a data center provider and configured by the data center provider to execute a virtual router to route packet flows between the two or more networks.

In one example, a computing system comprises one or more processors operably coupled to a memory; and a virtual performance hub configured for execution by the one or more processors, wherein the virtual performance hub comprises a virtual router configurable by a customer to route packet flows to one or more servers that host network function virtualization services for application of the network function virtualization services to the packet flows.

In one example, a method comprises deploying a virtual router to at least one computing device deployed to a data center by a data center provider; receiving, by the virtual router, configuration data to cause the virtual router to route packet flows to one or more servers that host network function virtualization services for application of the network function virtualization services to the packet flows; receiving, by the virtual router, a first packet flow from the packet flows; sending, by the virtual router, the first packet flow to a first server from the servers for application of a first network function virtualization service from the network function virtualization services to generate a second packet flow based on the first packet flow; receiving, by the virtual router, the second packet flow from the first server; and sending, by the virtual router, the second packet flow to a second server from the servers for application of a second network function virtualization service from the network function virtualization services to generate a third packet flow based on the second packet flow.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
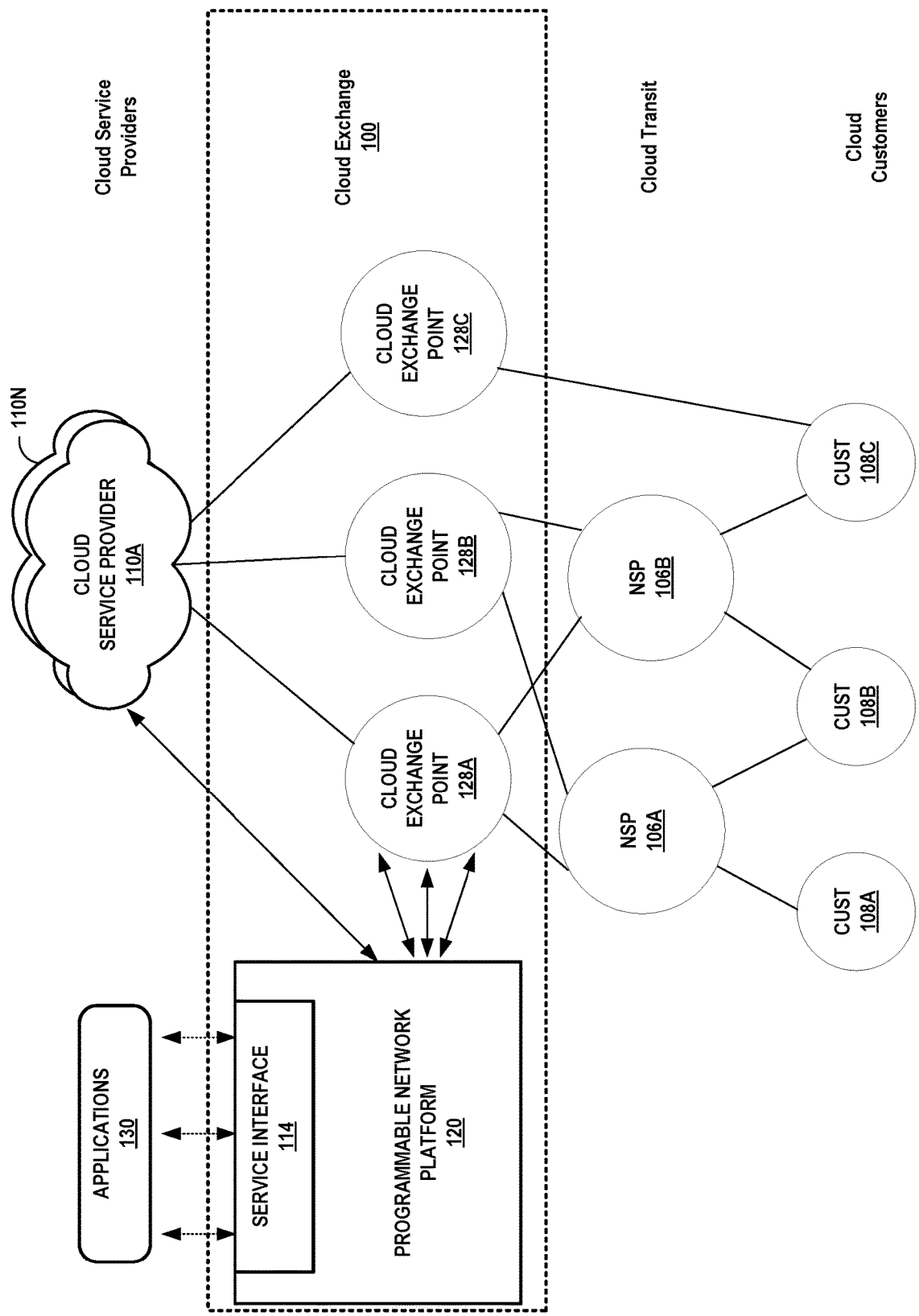
FIG. 1 is a block diagram that illustrates a conceptual view of a network system having a metro-based cloud exchange that provides multiple cloud exchange points according to techniques described herein.

FIG. 1 illustrates a conceptual view of a network system having a metro-based cloud exchange that provides multiple cloud exchange points according to techniques described herein. Each of cloud-based services exchange points 128A-

128D (described hereinafter as "cloud exchange points" and collectively referred to as "cloud exchange points 128") of cloud-based services exchange 100 ("cloud exchange 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers 108A-108D (collectively, "cloud customers 108") receive cloud services from multiple cloud service providers 110A-110N (collectively, "cloud service providers 110"). Cloud exchange 100 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. Cloud exchange 100 allows private networks of any customer to be directly cross-connected to any other customer at a common point, thereby allowing direct exchange of network traffic between the networks of the customers.

Cloud customers 108 may receive cloud-based services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with a cloud exchange provider for cloud exchange 100 to directly access layer 3 cloud services via cloud exchange points 128C. In this way, customer 108C receives redundant layer 3 connectivity to cloud service provider 110A, for instance. Customer 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer 108 networks, all having at least one port offering connectivity within one or more of the cloud exchange points 128.

In some examples, cloud exchange 100 allows a corresponding one of customer customers 108A, 108B of any network service providers (NSPs) or "carriers" 106A-106B (collectively, "carriers 106") or other cloud customers including customers 108C to be directly connected, via a virtual layer 2 (L2) or layer 3 (L3) connection to any other customer network and/or to any of CSPs 110, thereby allowing direct exchange of network traffic among the customer networks and CSPs 110. The virtual L2 or L3 connection may be referred to as a "virtual circuit."

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers 108 may already have network presence, such as by having one or more accessible ports available for interconnection within the data center, which may represent any of cloud exchange points 128. This allows the participating carriers, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

Cloud exchange 100 includes a programmable network platform 120 for dynamically programming cloud exchange 100 to responsively and assuredly fulfill service requests that encapsulate business requirements for services provided by cloud exchange 100 and/or cloud service providers 110 coupled to the cloud exchange 100. The programmable network platform 120 may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the cloud exchange 100 to dynamically configure and manage the cloud exchange 100 to, for instance, facilitate virtual connections for cloud-based services delivery from multiple cloud service providers 110 to one or more cloud customers 108. The cloud exchange 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 120 enables the cloud service provider to configure cloud exchange 100 with a L3 instance requested by a cloud customer 108, as described herein. A customer 108 may request an L3 instance to link multiple cloud service providers by the L3 instance, for example (e.g., for transferring the customer's data between two cloud service providers, or for obtaining a mesh of services from multiple cloud service providers).

Programmable network platform 120 may represent an application executing within one or more data centers of the cloud exchange 100 or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications 130, such as a customer portal, may invoke the programmable network platform 120. The service interface 114 may allow carriers 106, customers 108, cloud service providers 110, and/or the cloud exchange provider programmable access to capabilities and assets of the cloud exchange 100 according to techniques described herein.

For example, the service interface 114 may facilitate machine-to-machine communication to enable dynamic provisioning of virtual circuits in the cloud exchange for interconnecting customer and/or cloud service provider networks. In this way, the programmable network platform 120 enables the automation of aspects of cloud services provisioning. For example, the service interface 114 may provide an automated and seamless way for customers to establish, de-install and manage interconnections among multiple, different cloud providers participating in the cloud exchange.

Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Figure 2:
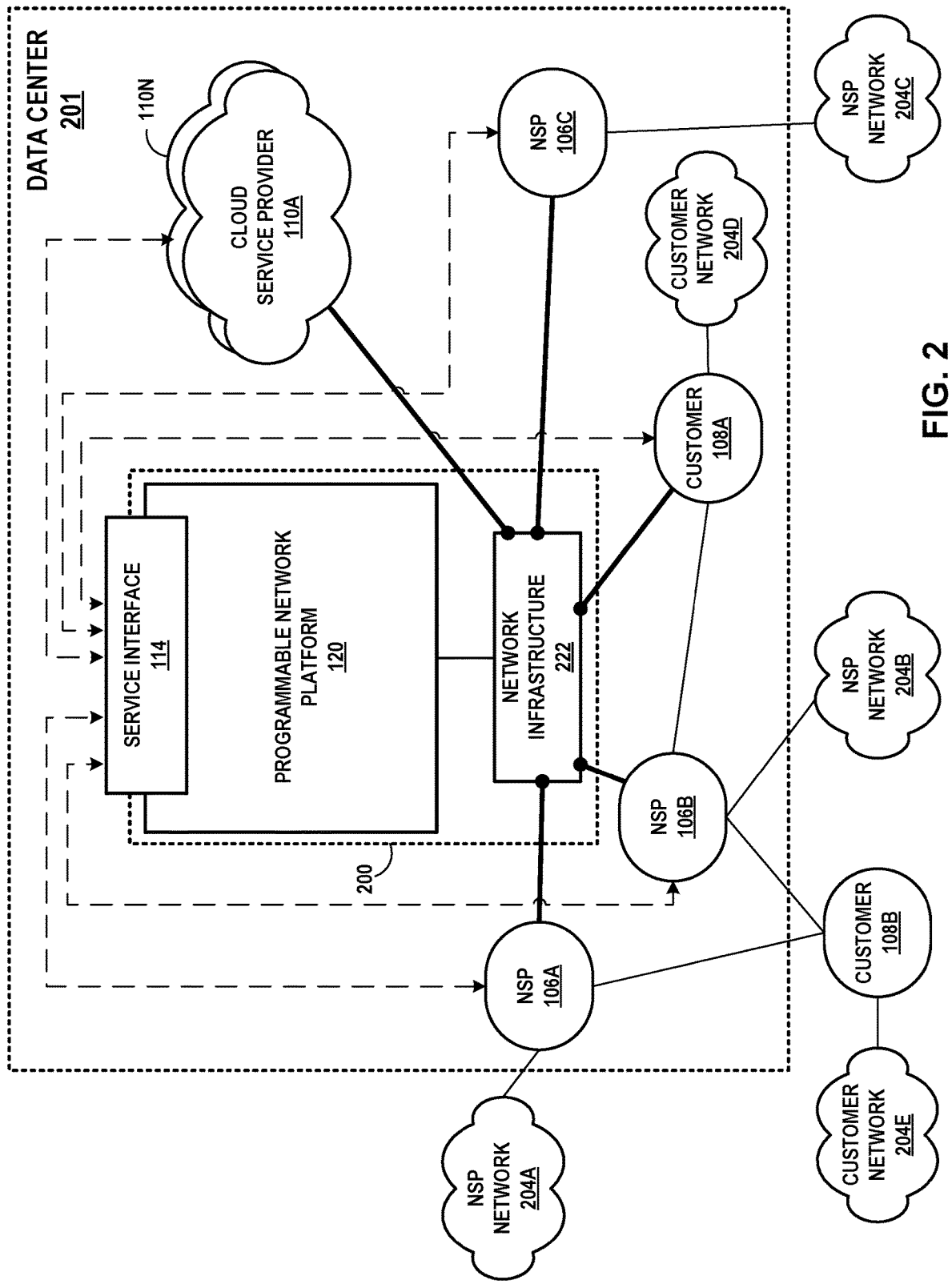
FIG. 2 is a block diagram illustrating a high-level view of a data center that provides an operating environment for a cloud-based services exchange, according to techniques described herein.

FIG. 2 is a block diagram illustrating a high-level view of a data center 201 that provides an operating environment for a cloud-based services exchange 200, according to techniques described herein. Cloud-based services exchange 200 ("cloud exchange 200") allows a corresponding one of customer networks 204D, 204E and NSP networks 204A-204C (collectively, "'private' or 'carrier' networks 204") of any NSPs 106A-106C or other cloud customers including customers 108A, 108B to be directly connected, via a layer 3 (L3) or layer 2 (L2) connection to any other customer network and/or to any of cloud service providers 110A-110N, thereby allowing exchange of cloud service traffic among the customer networks and/or CSPs 110. Data center 201 may be entirely located within a centralized area, such as a warehouse or localized data center complex, and provide power, cabling, security, and other services to NSPs, customers, and cloud service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access cloud services offered by CSPs 110 via the cloud exchange 200. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200.

In this way, cloud exchange 200 streamlines and simplifies the process of partnering CSPs 110 and customers 108 (indirectly via NSPs 106 or directly) in a transparent and neutral manner. One example application of cloud exchange 200 is a co-location and interconnection data center in which CSPs 110, NSPs 106 and/or customers 108 may already have network presence, such as by having one or more accessible ports available for interconnection within the data center. This allows the participating carriers, customers, and CSPs to have a wide range of interconnectivity options in the same facility.

Cloud exchange 200 of data center 201 includes network infrastructure 222 that provides a L2/L3 switching fabric by which CSPs 110 and customers/NSPs interconnect. This enables an NSP/customer to have options to create many-to-many interconnections with only a one-time hook up to the switching network and underlying network infrastructure 222 that presents an interconnection platform for cloud exchange 200. In other words, instead of having to establish separate connections across transit networks to access different cloud service providers or different cloud services of one or more cloud service providers, cloud exchange 200 allows customers to interconnect to multiple CSPs and cloud services using network infrastructure 222 within data center 201, which may represent any of the edge networks described in this disclosure, at least in part.

By using cloud exchange 200, customers can purchase services and reach out to many end users in many different geographical areas without incurring the same expenses typically associated with installing and maintaining multiple virtual connections with multiple CSPs 110. For example, NSP 106A can expand its services using network 204B of NSP 106B. By connecting to cloud exchange 200, a NSP 106 may be able to generate additional revenue by offering to sell its network services to the other carriers. For example, NSP 106C can offer the opportunity to use NSP network 204C to the other NSPs.

Cloud exchange 200 includes an programmable network platform 120 that exposes at least one service interface, which may include in some examples and are alternatively referred to herein as application programming interfaces (APIs) in that the APIs define the methods, fields, and/or other software primitives by which applications may invoke the programmable network platform 120. The software interfaces allow NSPs 206 and customers 108 programmable access to capabilities and assets of the cloud exchange 200. The programmable network platform 120 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 200 (e.g., customers 108 and NSPs 206) to create software applications that allow and leverage access to the programmable network platform 120 by which the applications may request that the cloud exchange 200 establish connectivity between the customer and cloud services offered by any of the CSPs 110. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to or between cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider seller side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

Service interface 114 facilitates machine-to-machine communication to enable dynamic service provisioning and service delivery assurance. In this way, the programmable network platform 120 enables the automation of aspects of cloud services provisioning. For example, the software interfaces may provide an automated and seamless way for customers to establish, de-install and manage interconnection with or between multiple, different cloud providers participating in the cloud exchange. The programmable network platform 120 may in various examples execute on one or virtual machines and/or real servers of data center 201, or off-site.

In the example of FIG. 2, network infrastructure 222 represents the cloud exchange switching fabric and includes multiple ports that may be dynamically interconnected with virtual circuits by, e.g., invoking service interface 114 of the programmable network platform 120. Each of the ports is associated with one of carriers 106, customers 108, and CSPs 110.

In some examples, a cloud exchange seller (e.g., an enterprise or a CSP nested in a CSP) may request and obtain an L3 instance, and may then create a seller profile associated with the L3 instance, and subsequently operate as a seller on the cloud exchange. The techniques of this disclosure enable multiple CSPs to participate in an Enterprise's L3 instance (e.g., an L3 "routed instance" or L2 "bridged instance") without each CSP flow being anchored with an enterprise device.

In some aspects, the programmable network platform may provision a cloud exchange to deliver services made up of multiple constituent services provided by multiple different cloud service providers, where this is provided via the L3 instance as a service described herein. Each of these constituent services is referred to herein as a "micro-service" in that it is part of an overall service applied to service traffic. That is, a plurality of micro-services may be applied to service traffic in a particular "arrangement," "ordering," or "topology," in order to make up an overall service for the service traffic. The micro-services themselves may be applied or offered by the cloud service providers 110.

Figure 3A:
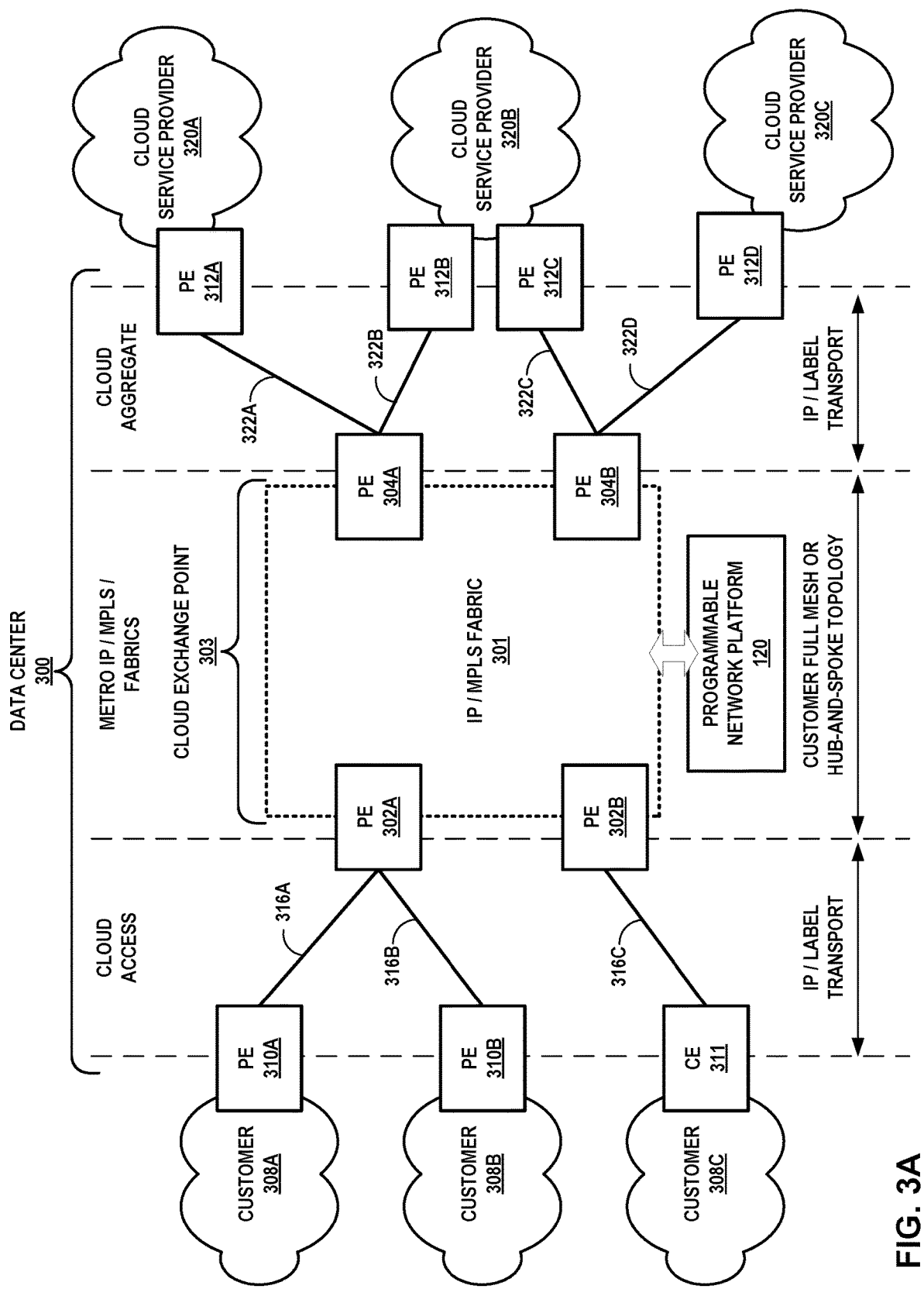
FIGS. 3A-3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in accordance with techniques described in this disclosure.
Figure 3B:
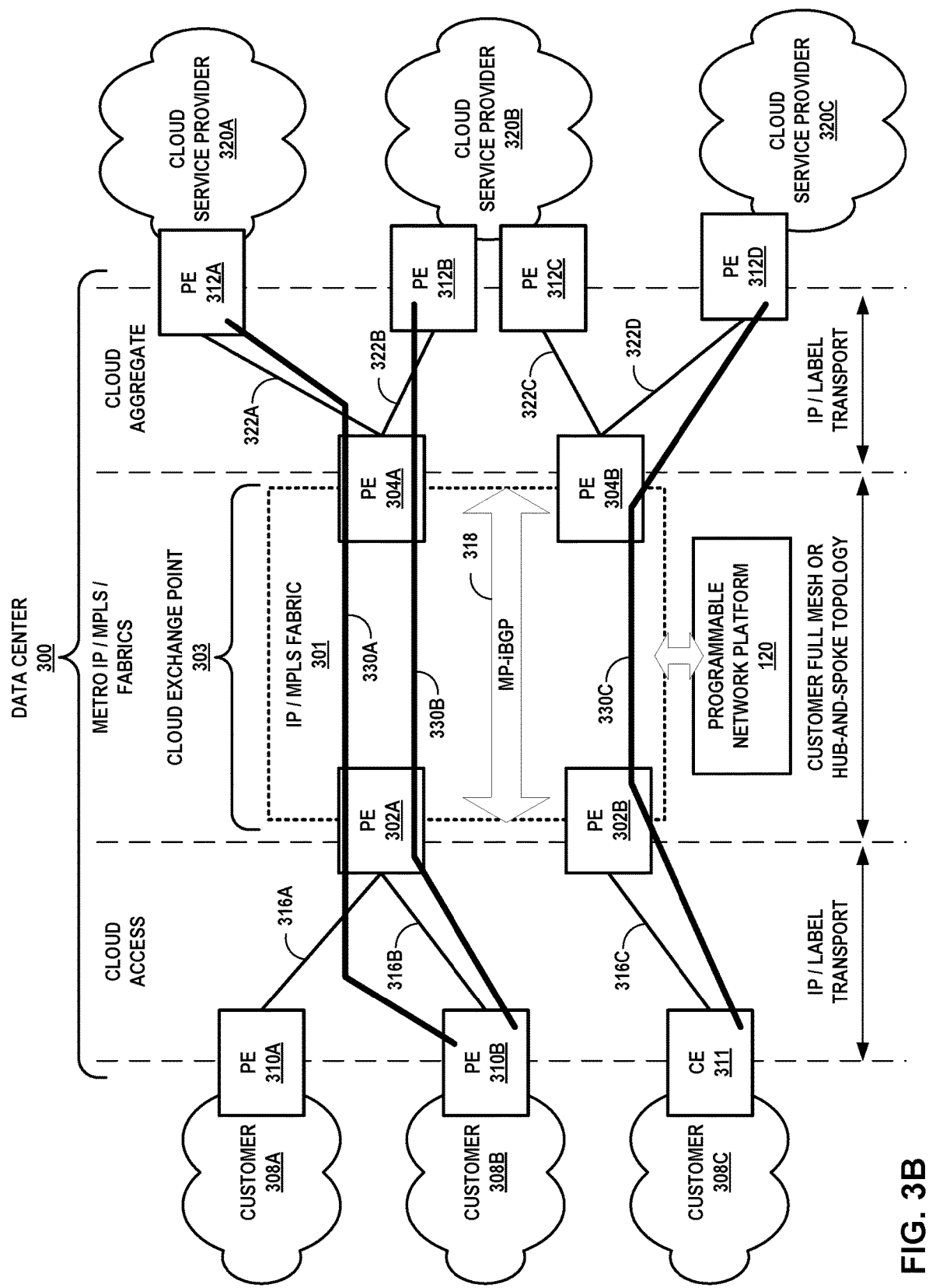

FIGS. 3A-3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in accordance with techniques described in this disclosure. In this example, customer networks 308A-308C (collectively, "customer networks 308"), each associated with a different customer, access a cloud exchange point within a data center 300 in order receive aggregated cloud services from one or more cloud service provider networks 320, each associated with a different cloud service provider 110. In some examples, customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g, QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

To create an L3 interconnection between a customer network 308 and a cloud service provider network 320, in some examples, IP/MPLS fabric 301 is configured with L3 virtual routing and forwarding instances (VRFs), as described in further detail below with respect to FIG. 4. In some cases, IP/MPLS fabric 301 may be configured with an L3 instance that includes one or more VRFs, and the L3 instance may link multiple cloud service provider networks 320. In this case, a customer network 308 may not need to be interconnected or have any physical presence in the cloud exchange or data center.

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIGS. 3A-3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 302A does not need to provision and configure separate service links from cloud service provider network 302A to each of PE routers 310, 311, for instance, in order to provide services to each of customer network 308. Cloud exchange point 303 may instead connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead connect cloud access link 316A (again, as one example) to multiple cloud aggregate links 322 to provide layer 3 peering and network reachability for the cloud services delivery to customer network 308A.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312D that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 connection.

Whereas service provider-based IP backbone networks require wide-area network (WAN) connections with limited bandwidth to transport service traffic from layer 3 services providers to customers, the cloud exchange point 303 as described herein 'transports' service traffic and connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MIPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 3B, cloud exchange point 303 is configured to implement multiple layer 3 virtual circuits 330A-330C (collectively, "virtual circuits 330") to interconnect customer network 308 and cloud service provider networks 322 with end-to-end IP paths. Each of cloud service providers 320 and customers 308 may be an endpoint for multiple virtual circuits 330, with multiple virtual circuits 330 traversing one or more attachment circuits between a PE/PE or PE/CE pair for the IP/MPLS fabric 301 and the CSP/customer. A virtual circuit 330 represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual circuit 330B, PE routers 312B, 304A, 302A, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303.

Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP VPNs or other IP-VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of cloud service provider networks 320 attached to the basic backbone L3VPN.

Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 connect. By filtering routes from cloud service provider networks 320 to customer networks 308, and vice-versa, PEs 302, 304 thereby control the establishment of virtual circuits 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure PEs 302, 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

Figure 4:
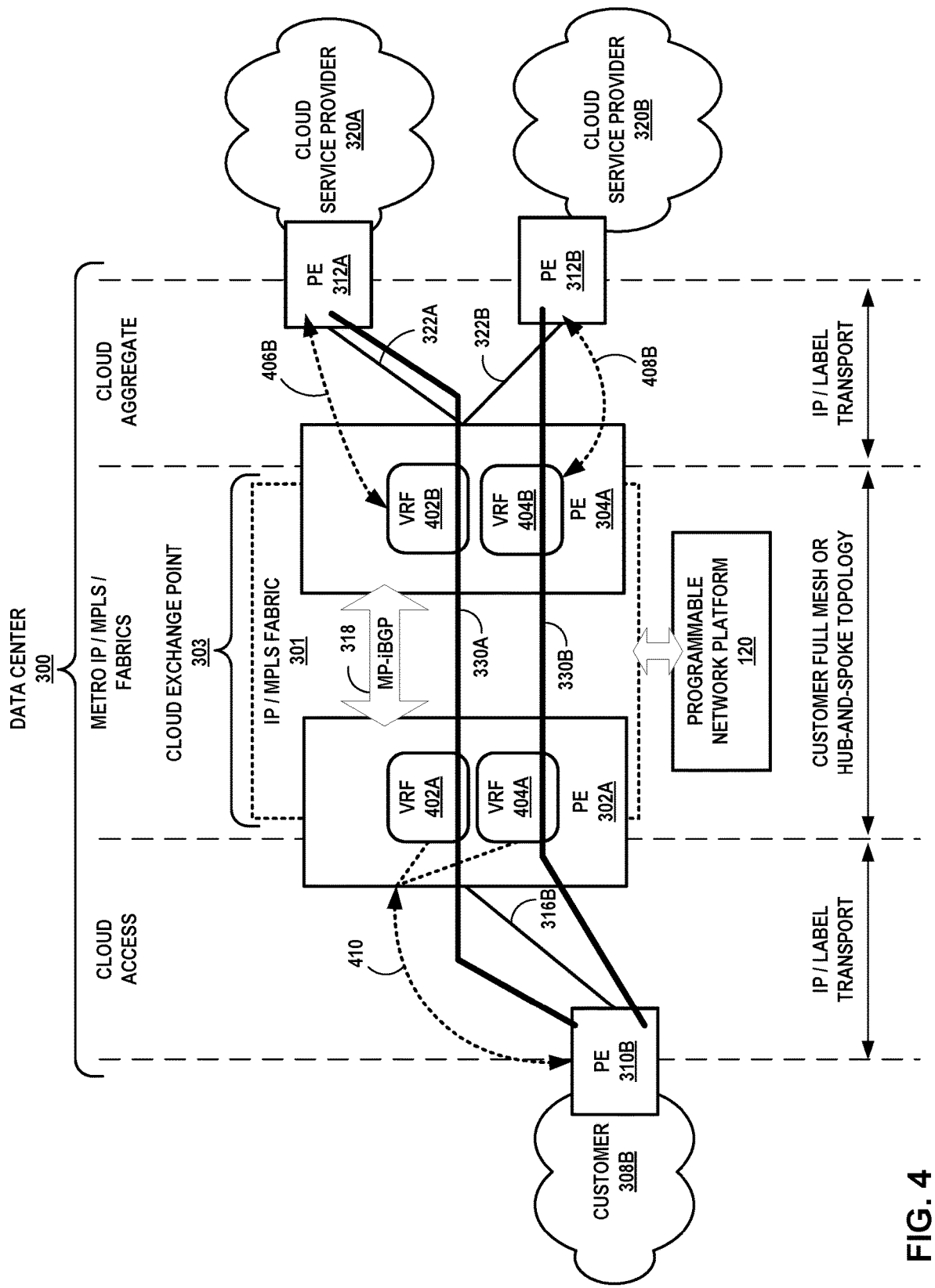
FIG. 4 is a block diagram illustrating an example of a data center-based cloud exchange point in which routers of the cloud exchange point are configured by programmable network platform with VPN routing and forwarding instances for routing and forwarding aggregated service traffic from multiple cloud service provider networks to a customer network, according to techniques described herein.

FIG. 4 is a block diagram illustrating an example of a data center-based cloud exchange point in which routers of the cloud exchange point are configured by programmable network platform 120 with VPN routing and forwarding instances for routing and forwarding aggregated service traffic from multiple cloud service provider networks to a customer network, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B. This configuration whereby a customer can access multiple layer 3 services from different CSPs each associated with separate VRFs to access the layer 3 services provides isolation of respective traffic exchanged with the CSPs. In some examples, PE 302A may be configured with a single VRF to import routes exported by both VRF 402B and VRF 404B. As noted above with respect to FIGS. 3A-3B, PEs 302, 304 may be further configured to bridge layer 2 traffic between customer 308B and cloud service providers 320.

In this example, PE 304A operates BGP or other route distribution protocol peering connections 406B, 408B with respective PEs 312A, 312B to exchange routes with respective cloud service provider networks 320A, 320B. PE 302A operates a BGP or other route distribution protocol peering connection 410 with PE 310B to exchange routes with customer network 308B. In some examples, PEs 302A, 304A may be statically configured with routes for the site networks.

An administrator or a programmable network platform described herein for cloud exchange point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302A, 304A need access to the full Internet BGP routing table to reach cloud service provider networks 320 or customer networks 308. Moreover, PEs 302A, 304A may be configured to aggregate customer/CSP routes and/or service traffic based on any one or more of physical, IP, service, and VRFs.

Figure 5:
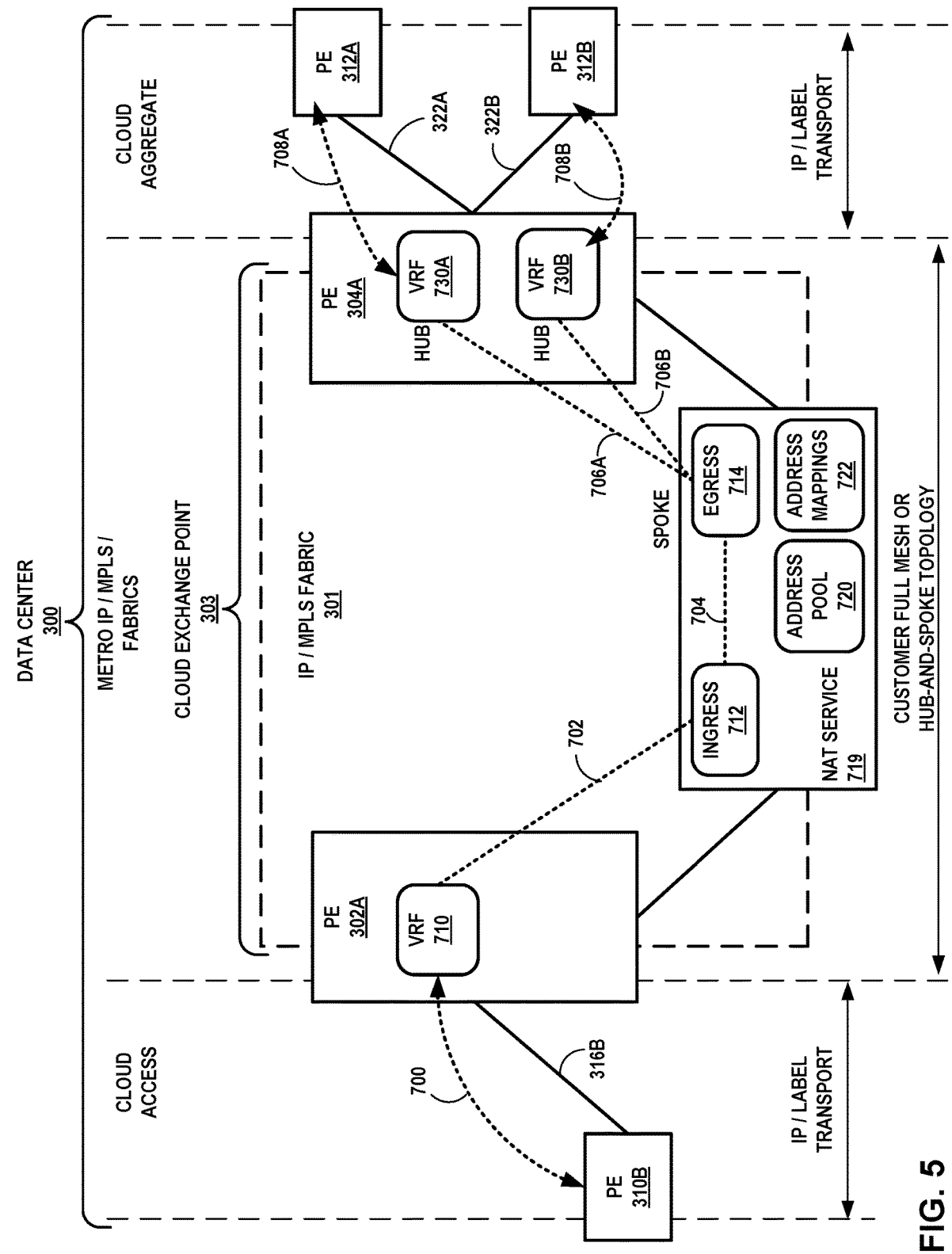
FIG. 5 is a block diagram illustrating an example of a data center-based cloud exchange point in which a cloud exchange point is configured to apply network address translation and to route and forward aggregated service traffic from multiple cloud service provider networks to a customer network, according to techniques described herein.

FIG. 5 is a block diagram illustrating an example of a data center-based cloud exchange point in which a cloud exchange point is configured to apply network address translation and to route and forward aggregated service traffic from multiple cloud service provider networks to a customer network, according to techniques described herein.

Cloud service provider networks 320 and customer networks 308 are not shown in FIG. 5 for ease of illustration purposes. In these examples, the data center-based cloud exchange point 303 applies a network address translation (NAT) service 719 to, in part, enforce network address separation between the cloud service layer accessible via cloud aggregation links 322 and the cloud access layer accessible via cloud access links 316.

A cloud exchange point 303 NAT device(s) that applies NAT service 719 performs NAT (or NAPT), which may also or alternatively include carrier-grade NAT ("CG-NAT" or "CGN"), to translate the cloud exchange point 303 addresses and CSP routes and/or to translate the cloud exchange point 303 addresses and customer routes. The cloud exchange point 303 NAT device(s) that applies NAT service 719 (also referred to herein as "NAT service 719 device") may include one or more dedicated NAT appliances, one or more virtual machines executing on real server(s) and configured to apply NAT using network function virtualization (NFV), one or more service cards configured to apply the NAT service 719 and inserted in one or more of PEs 302, 304, or other device(s) inbox or out-of-box.

NAT service 719 of FIG. 5 may be implemented in one or more NAT service devices. In FIG. 5, the NAT service 719 is associated with an address pool 720 that is configured with routes for the cloud exchange point 303 autonomous system and from which the NAT service 719 may draw to automatically provision and map, for NAT purposes, to customer and/or cloud service provider routes received via peering sessions 700 and 708A-708B, respectively. The network addresses for configured routes in address pool 720 (or "NAT pool 720") may be public, private, or a combination thereof, and may represent IPv4 and/or IPv6 routes. In some examples, the network addresses are public in order to provide global uniqueness for the network addresses.

Address mappings 722 may specify one or more NAT mappings and/or network address and port translations (NAPT) that associate routes from address pool 720 for the cloud exchange point 303 with routes received by the cloud exchange point 303 routers from any of PEs 310, 312. Routes received from any of PEs 310, 312 for translation and used in end-to-end service delivery may include any IP addresses/prefixes from enterprise/NSP customers of the cloud exchange provider, such addresses including private and/or public IPv4 and/or IPv6 addresses and received at any one or more of the cloud exchange points managed by the cloud exchange provider.

As noted above, NAT service 719 may perform NAT to translate customer routes for customer network 308B (not shown in FIG. 5) and cloud exchange point 303 routes advertised to PEs 312A, 312B for aggregated cloud access. As a result, CSP networks 320 (not shown in FIG. 5) receive the cloud exchange point 303 routes drawn from address pool 720 instead of the customer routes. The cloud exchange point 303 is thus able to filter customer network information from the CSPs, and the CSPs receive cloud exchange point 303 routes associated with a single autonomous system (i.e., the cloud exchange point 303 and one ASN per cloud exchange point) rather than customer routes (which could potentially number in the millions) associated with multiple different autonomous systems (and corresponding ASNs, which could potentially number in the hundreds) for various customers (enterprises and/or NSPs).

Further, because the cloud exchange point 303 does not advertise its routes other than to customers and CSPs, the cloud exchange point 303 does not announce its routes to the Internet, which may improve security and reduce the potential for Denial of Service (DoS) or other malicious activity directed to the cloud exchange point 303 and customers/CSPs with which the cloud exchange point 303 has peering relationships. In addition, the techniques described above may simplify end-to-end cloud service delivery processing and improve performance by ensuring that local traffic is processed locally (within the cloud exchange point 303).

In the illustrated example, NAT service 719 is associated with ingress service VRF 712 ("ingress 712") and egress service VRF 714 ("egress 714") for attracting service traffic that is associated with customer network 308B and that is to be NATted. Ingress 712 and egress 714 constitute part of a customer service chain for cloud service traffic between customer network 308B and CSP networks 320A, 320B. Customer VRF 710 associated customer network 308B receives routes from customer PE 310B via peering session 700. Customer VRF 710 may be configured in a VPN-full mesh relationship with ingress service VRFs distributed in the cloud exchange point 303 (only one peering session 702 is illustrated, however).

In some examples, PE 302A distributes, for VRF 710, customer routes received via peering session 700 to the NAT service 719, which dynamically maps the customer route prefixes to cloud exchange point route prefixes drawn from address pool 720. The customer routes are installed to ingress service VRF 712. The NAT service 719 installs the mappings to address mappings 722 and installs, to egress service VRF 714, cloud exchange point routes that specify the cloud exchange point route prefixes and NAT service 719 as the next hop. In this way, NAT service 719 and more specifically egress service VRF 714 attracts downstream traffic from CSP network 320 that is intended for the customer network 308B but destined for the cloud exchange point routes installed to egress service VRF 714. Ingress service VRF 712 and egress service VRF 714 may establish peering session 704 and be configured with route targets to cause VRFs 712, 714 to leak routes to one another via iBGP, for instance.

Egress service VRF 714 may operate as a spoke VRF for corresponding hub VRFRs 730A, 730B in a manner similar to VRFs of PE 302A operating as spoke VRFs in the example of FIG. 4. That is, egress service VRF 714 and VRFs 730A, 730B are configured with reciprocal route targets such that egress service VRF 714 advertises routes for the egress service VRF 714 for installation to VRFs 730A, 730B, while VRFs 730A, 730B advertise routes for corresponding CSP networks 320A, 320B to egress service VRF 714. NATted upstream service traffic destined to any of CSP networks 320A, 320B passes through corresponding hub VRFs 730A, 730B. Each of peering sessions 706A, 706B may be used in this way to create hub-and-spoke VPNs for the respective CSP networks 320A, 320B.

PEs 302, 304 may establish tunnels with the NAT service 719 device. Routes exchanged via peering sessions 702 and 706A, 706B may include labeled routes for implementing MPLS/BGP IP-VPNs according to RFC 4364, incorporated above.

Cloud exchange point 303 may forward and apply NAT service 719 to downstream service traffic from PE 312A, intended for customer network 308A, as follows. PE 304A receives a service packet on aggregation link 322A. The packet has a destination address that is a cloud exchange point 303 address drawn from address pool 720. VRF 730A associated with aggregation link 322A stores a route for the destination address that specifies an address for the NAT service 719 device, and PE 304A tunnels the packet using VRF 730A to the NAT service 719 device for application of the NAT service.

NAT service 719 uses address mappings 722 dynamically provisioned for routes for customer network 308A and received from PE 302A to perform NAT and replace the service packet destination address with a destination address in customer network 308A. The NAT service 719 device may determine in ingress service VRF 712 the labeled route to PE 302A (the label identifying VRF 710) and tunnel the modified service packet PE 302A, which may identify VRF 710 from the label attached to the modified service packet. PE 302A forwards the modified service packet to PE 310 via access link 316B. In this way, cloud exchange point 303 provides a NAT service to the customer to separate the customer from the cloud service layer. In a similar way, the cloud exchange point 303 may apply NAT to upstream traffic to separate cloud service providers from the cloud or network access layer by which customer networks access the cloud exchange point.

Figure 6A:
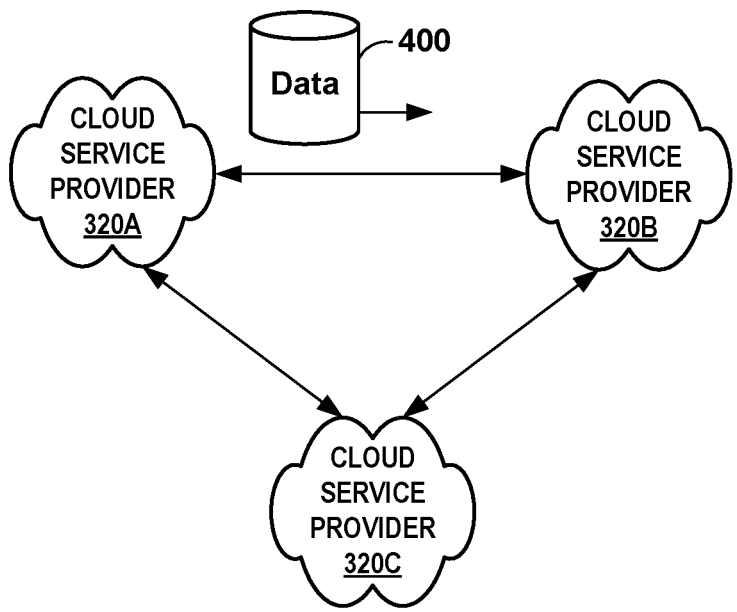
FIGS. 6A-6B are block diagrams illustrating example systems having multiple cloud service provider networks connected by multi-cloud linking, in accordance with the techniques of this disclosure.
Figure 6B:
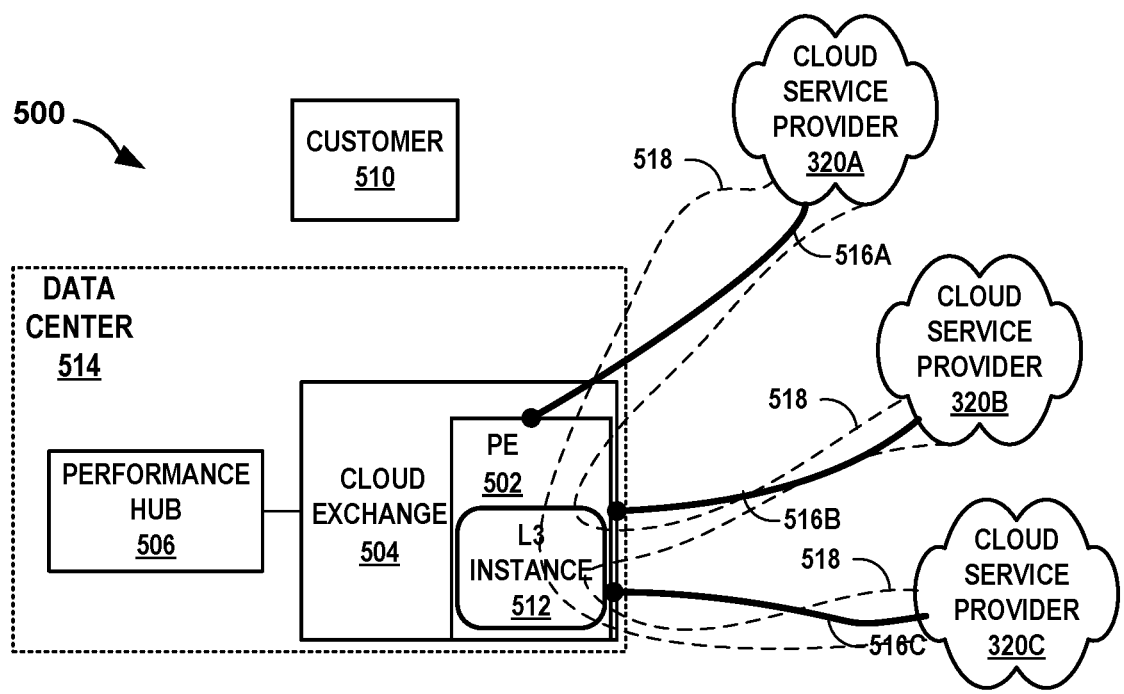

FIGS. 6A-6B are block diagrams illustrating example systems having multiple cloud service provider networks connected by multi-cloud linking, in accordance with the techniques of this disclosure. FIG. 6A illustrates at a high level how CSPs 320A-320C can exchange data and/or provide services via the cloud exchange on behalf of a customer, as if the CSP networks are directly connected.

In some examples, the customer may use the multi-cloud linking and "L3 instance as a service" techniques described herein for high throughput data migration. In the example of FIG. 6A, as one example a customer of the cloud exchange may submit a request (e.g., via a portal of the cloud exchange provider) to transfer the customer's data 400 from CSP 320A to CSP 320B. In this way, a customer can use multi-cloud linking to enable large data sets (e.g., Terabytes or Petabytes of data) to be shared securely between multiple CSPs, at a potentially lower cost. In this way, multi-cloud linking can allow a customer to migrate large amounts of data quickly between public clouds. The cloud exchange can use multi-cloud linking to support both one-time and ongoing data transfer use cases, and can make the service available as an on-demand and pay-per-use option. In some examples, the customer may use multi-cloud linking to obtain a low-latency, real-time service mix, by meshing services across directly connected CSP clouds in real time (e.g., <5 milliseconds).

FIG. 6B is a block diagram illustrating a system 500 having a data center 514. In some examples, data center 514 may correspond to data center 201 of FIG. 2, cloud exchange 504 may correspond to cloud exchange 100 of FIG. 1, for example, and CSPs 320 may represent CSPs 110. CSPs 320 may be co-located within data center 514, while customer 510 is not co-located within data center 514. As shown in FIG. 6B, cloud exchange 504 provides an L3 routing instance, also called an "L3 instance as a service," e.g., a virtual routing and forwarding (VRF) instance, such as L3 instance 512, as a service to a customer, which in the example of FIG. 6B enables multi-cloud linking. L3 instance 512 may represent an enterprise VRF configured for customer 510, as described in further detail with respect to FIGS. 7A-7B. CSPs 320 are physically connected to PE router 502 of cloud exchange 504 by attachment circuits 516A-516C, attached to PE router 502 by ports. The attachment circuits 516 are configured as interfaces for L3 instance 512.

CSPs 320 are connected to each other by end-to-end L3 connections 518 via L3 instance 512 in cloud exchange 504. In some examples, connections 518 may be virtual circuits between CSPs 320. A pair of CSPs 320 are endpoints of a given connection 518. Customer 510 is not an endpoint and is not connected to L3 instance 512, but L3 instance 512 is setup for use by customer 510. L3 instance 512 can connect to both L3 CSPs that connect by exchanging routes over a BGP peering session, and L2 CSPs that connect by connecting to VLANs. Although illustrated as attached to a single L3 instance 512 of a single PE router 502, CSPs 320 may attach to and interconnect via a full mesh of PE devices for cloud exchange 504 configured with respective VRFs to provide end-to-end L3 connections 518 between CSPs 320. In such cases, the L3 instance provided as a service may refer to the set of VRFs configured in the PEs to provide end-to-end L3 connections 518. Interconnection via a full mesh of PE devices is described in further detail elsewhere in this disclosure, e.g. FIGS. 3-5 and 7A-7B.

In the example of FIG. 6B, in one example, customer 510 may request to use CSP 320A for running a Customer Application, CSP 320B for Mobile-Backend-as-a-Service and CSP 320C for Database-aaS. The customer 510 can request the use of L3 instance 512 for obtaining a multi-service service mesh via cloud exchange 504, through which customer 510 can obtain a service mix that includes the different services from the different CSPs.

As shown in FIG. 6B, customer 510 can own and manage L3 instance 512 without a need for customer 510 to be physically connected to the cloud exchange by a physical port and attachment circuit. The customer 510 need not deploy a control point in performance hub 506 (e.g., a server) within data center 514 in order to use cloud exchange 504 to connect to multiple CSPs 320. Performance hub 506 may be a rack that provides multiple services such as aggregation, routing, switching, WAN acceleration, firewall, VPN, and load balancing, for example. Instead, customer 510 may interact with cloud exchange 504 via a customer portal (not shown) to request a programmable network platform (e.g., programmable network platforms 120, 12500 of FIGS. 1 and 11, respectively) and/or to configure L3 instance 512 within PE router 502 of cloud exchange 504 for the private use of customer 510. Customer 510 may already have a direct relationship with one or more of CSPs 320 (e.g., to set up data storage services) separate from cloud exchange 504, and in some cases customer 510 may enter data associated with the cloud services they receive via the portal for use by programmable network platform 120 in configuring the L3 instance 512, such as IP addresses for route targets.

While customer 510 need not be physically connected to cloud exchange 504, in some examples customer 510 may be physically connected to cloud exchange 504 by an attachment circuit and port, and customer 510 may be physically co-located within data center 514.

In response to receiving a request from customer 510 for a connection between two CSPs 320 (e.g., CSPs 320A and 320B), cloud exchange 504 configures L3 instance 512 with the correct route targets and route distinguishers to import and export the necessary routes from CSPs 320A and 320B to set up the path.

The cloud exchange can offer the L3 instance as a pay per use service without the need for physical port. The L3 instance as a service may be an on-demand and pay-per-use option that provides flexible and customizable "elastic" routing. An enterprise has control over the transfer of their data between the CSPs via the L3 instance (VRF). L3 instance-aaS may avoid the need for the enterprise itself to put in a router in the data center.

In some examples, the multi-cloud linking via L3 instance-aaS may be used by a CSP 320 which employs a L3 instance-aaS on behalf of its customer to transfer large amounts (e.g., petabytes) of data out of another CSP 320 at the request of its customer. In some examples, the multi-cloud linking techniques described herein may be used by a data broker or managed service provider (MSP). In some examples, the multi-cloud linking by L3 instance-aaS techniques described herein may be used by large enterprises that prefer to "own" and have control over their data, and want flexibility to migrate the data at scale.

Enterprises and Cloud Management companies may use the multi-cloud linking by L3 instance-aaS techniques described herein for various reasons, such as: (a) obtain a Best of Breed Architecture where they pick and choose services from different CSPs that need interoperability at low latencies; (b) Adopt a multi-cloud strategy to hedge risks; or (c) They acquired companies having business critical assets within other CSPs, for example.

The techniques of this disclosure may provide one or more advantages. For example, whereas a performance-hub based connectivity forces hair pinning that introduces unnecessary round trip latency, the multi-cloud linking via L3 instance-aaS approach described herein may offer lower latency. As another example, the L3 instance-aaS option can reduce setup time from 4-12 weeks to setup time on the order of minutes, hours, or days. In fact, the L3 instance-aaS approach described herein may provide cloud-like agility easily and conveniently to the enterprise (e.g., by the enterprise via a portal).

Instead of a performance hub or cloud exchange port having a commit period in months, the L3 instance-aaS approach described herein provides low commit period, e.g., the cloud exchange provider may offer hourly or monthly options. The L3 instance-aaS approach described herein provides no requirement of physical port or provider hub setup. A performance hub or cloud exchange port may have on-going management overhead, redundancy and uptime needs that can burden enterprises, but in the L3 instance-aaS approach described herein the cloud exchange provider may take over the burden.

Whereas a performance-hub based connectivity may be cumbersome to implement for certain use cases, the L3 instance-aaS approach described herein may be simple, agile, and cloud-like. The techniques of this disclosure may allow a cloud service provider to deliver cloud-to-cloud interconnectivity with a turn-key cloud-like service. In this way, the enterprise can obtain the L3 instance for only the time period needed (e.g., the time needed for transferring data from one CSP to another) without having to go through a lengthy setup of equipment and connections and without having to commit and pay for a longer time period than what the enterprise needs.

As traffic is not customer anchored, in some examples the cloud exchange provider may charge customers for the L3 instance-aaS based on port non-recurring charges (NRC) and egress usage. In some examples the co-location facility provider may require detailed reporting, monitoring, and alarming.

In some examples, clouds may provide access to IaaS and SaaS clouds hosting enterprise infrastructure and applications, making them accessible at points closer to the end users. The cloud access may be by L2 connections, L3 connections, and/or with multi-cloud linking. In some examples, cloud security services may be available for multi-cloud linking between clouds and/or Internet, and may include physical to logical security certifications.

The L3 instance-aaS approach described herein may reduce cost of sales, goods and Administration, thereby increasing a return on investment by reducing "cost of sale" for field sales and GSAs. Offering an L3 instance as a service instead of selling physical cabinet space to customers that do not need or want it means that the cabinet space remains available to be used for another customer that actually needs cabinet space.

Figure 7A:
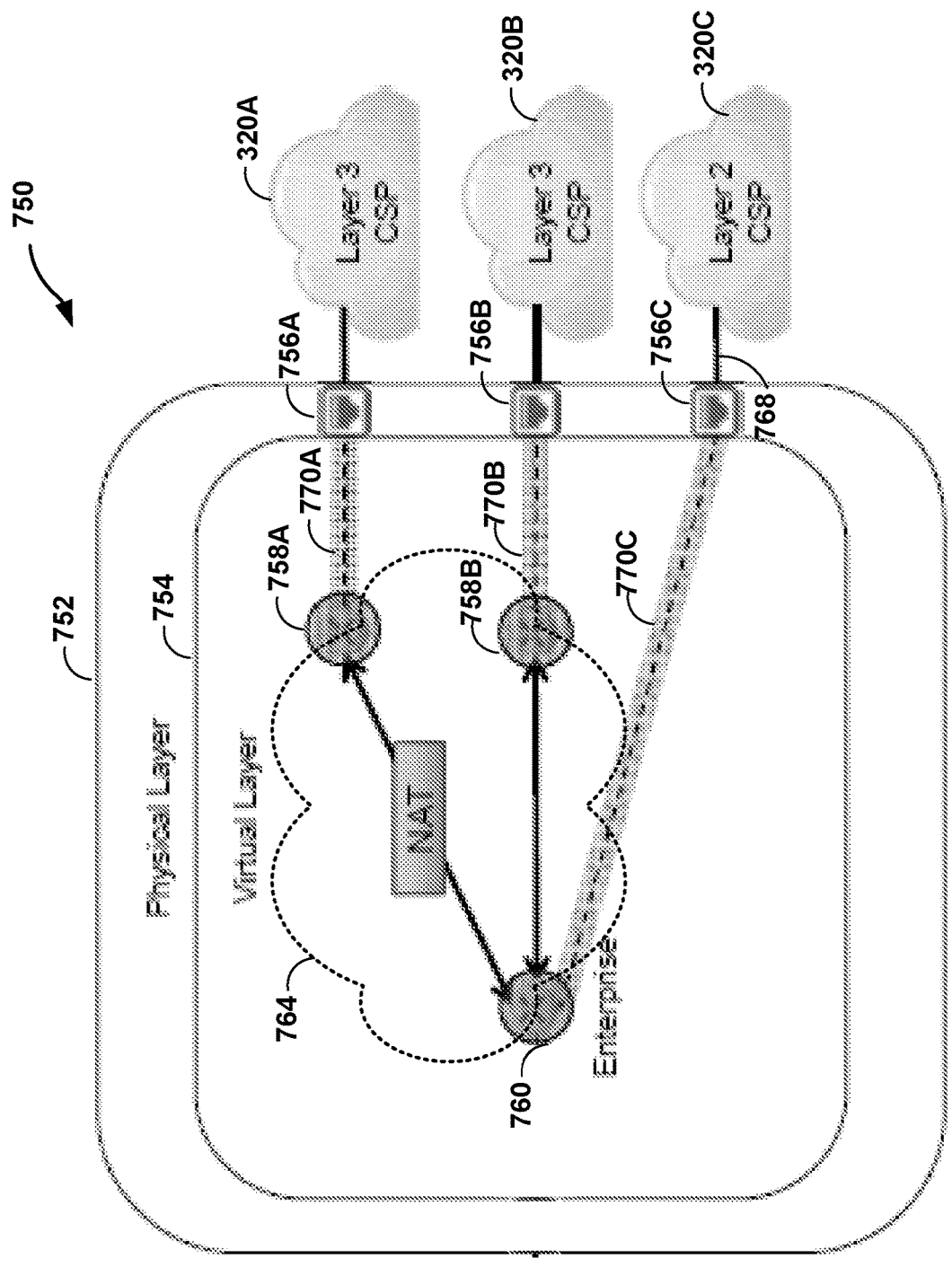
FIGS. 7A-7B are block diagrams illustrating example systems for providing an enterprise with an L3 routing instance, in accordance with the techniques of this disclosure.
Figure 7B:
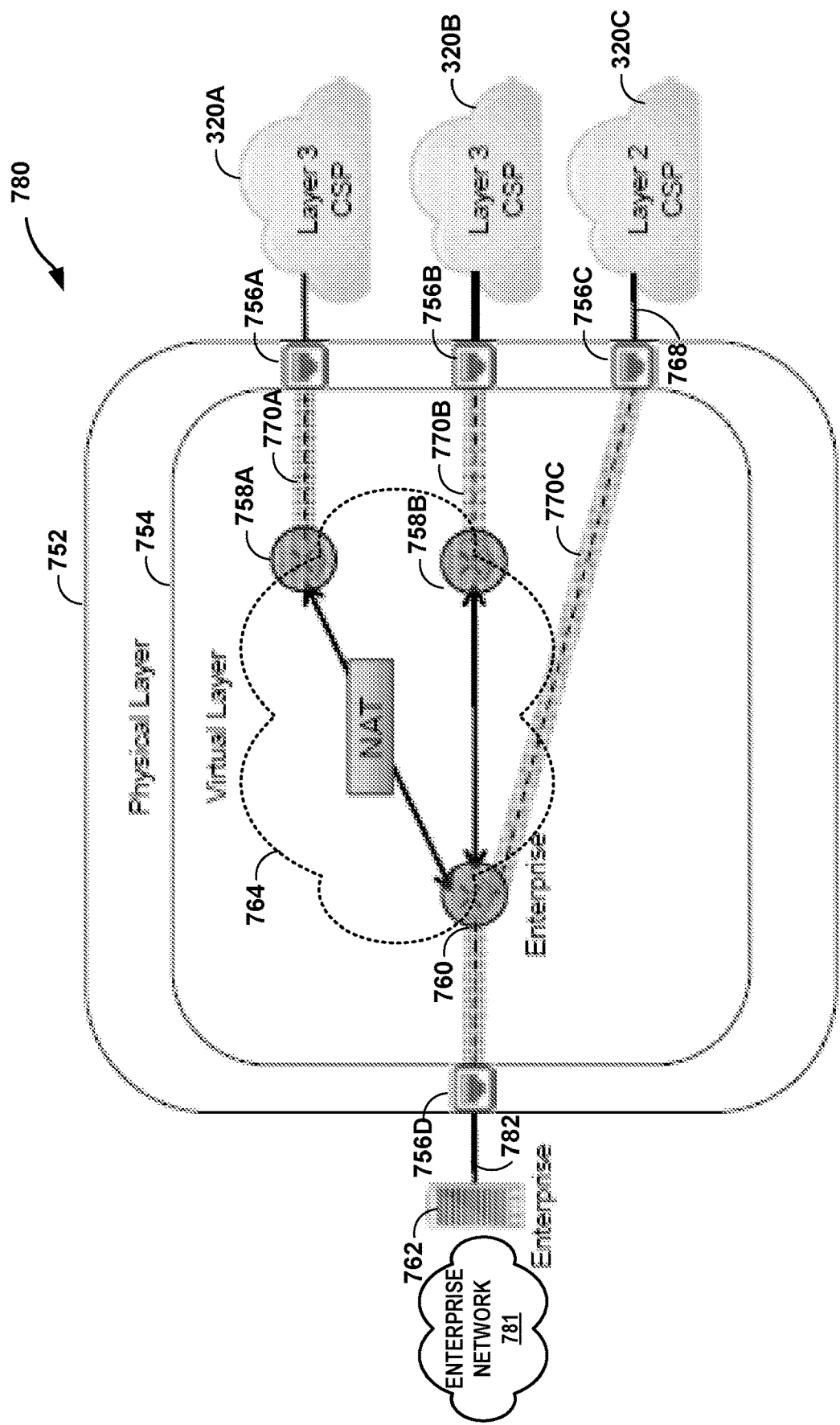

FIGS. 7A-7B are block diagrams illustrating example systems for providing an enterprise with an L3 routing instance, in accordance with the techniques of this disclosure. CSPs 320A-320C may correspond to the CSPs of FIG. 6. In some examples, the enterprise may use the L3 routing instance for linking cloud service providers that connect to the cloud exchange via L3 connections as well as cloud service providers that connect to the cloud exchange via L2 connections.

In FIG. 7A, a system 750 includes a cloud exchange having a physical layer 752 that underlies a virtual layer 754. The virtual layer is shown as having an enterprise VRF 760, which may be created and configured when an enterprise 762 requests a L3 instance as a service. In some examples, an L3 instance as a service comprises a single VRF, while in other examples, an L3 instance as a service comprises a collection of multiple VRFs. In some examples, the term "VRF" may be used interchangeably with "L3 instance," even when an L3 instance is considered to be a collection of VRFs.

The enterprise VRF 760 can be configured to forward traffic between CSP ports 756A-756C. For some layer 3 CSPs, such as CSP 320A, the enterprise VRF 760 can be configured to communicate with a CSP VRF 758A, by a route that includes an intermediate NAT operation, where CSP VRF 758A is then connected to a physical port 756A by a VLAN 770A. For some layer 3 CSPs, such as CSP 320B, the enterprise VRF 760 can be configured for route propagation between VRF 760 and VRF 758B, so that VRF 760 can communicate directly to a CSP VRF 758B that is connected to a physical port 756B by a VLAN 770B. In some cases, for a layer two CSP such as CSP 320C, the enterprise VRF 760 connects to port 756C via a VLAN 770C (which may include an attachment circuit 768 to CSP 320C). As shown in FIG. 7A, enterprise 762 can connect with multiple different CSPs 320 by a single enterprise VRF 760. Enterprise 762 does not need to have multiple separate VRFs to connect with multiple different CSPs. In this way, L3 network 764 can be configured with a single L3 instance that terminates on more than one physical port (e.g., port 756A, port 756B, and port 756C). Moreover, the L3 instance works with both L2 and L3 CSPs, and VLANS to both L2 CSPs and L3 CSPs can be created for a single VRF.

In some examples, PEs of L3 network 764 (not shown) on which the VRFs are configured may be peered to one another in a BGP peering session, and exchange route advertisements indicating customer routes for the corresponding CSP networks. VRFs 758, 760 may store customer routes as VPN routes for the IP-VPN implemented at least in part by VRFs 758, 760, in order to distinguish overlapping customer addresses, according to RFC 4364. PEs of L3 network 764 configured in this way may exchange VPN routes for the enterprise using iBGP, as described above with respect to FIGS. 1-4. Each VPN route may include a route distinguisher, and the L3 routing instance may be configured to associate a first route distinguisher with a first route, and associate a second route distinguisher with a second route.

For example, L3 network 764 may be located within a data center and configured with an L3 routing instance for enterprise 762 (e.g., VRF 760). L3 network 764 is configured with, for the L3 routing instance, respective first and second attachment circuits for first and second cloud service provider networks 3201 and 320B co-located within the data center. The L3 routing instance stores a route to a subnet of the second cloud service provider network 320B to cause the L3 routing instance to forward packets, received from the first cloud service provider network 320A via a first attachment circuit connecting CSP 320A to port 756A, to the second cloud service provider network 320B via the second attachment circuit connecting CSP 320B to port 756B. In some examples, the L3 routing instance includes an Internet Protocol Virtual Private Network (IP-VPN) having at least one virtual routing and forwarding instance (VRF) configured with respective interfaces for the first and second attachment circuits.

L3 network 764 may in some examples be further configured with, for the L3 routing instance, a third attachment circuit for a third cloud service provider network 320C co-located within the data center, in which case the L3 routing instance stores a second route to a second subnet of the third cloud service provider network to cause the L3 routing instance to forward packets, received from the first cloud service provider network via the first attachment circuit, to the third cloud service provider network via the third attachment circuit, such that the L3 routing instance stores a second route to a second subnet of the third cloud service provider network to cause the L3 routing instance to forward packets, received from the first cloud service provider network via the first attachment circuit, to the third cloud service provider network via the third attachment circuit.

In some examples, the L3 routing instance includes a first CSP VRF configured with an interface for the first attachment circuit; a second CSP VRF configured with an interface for the second attachment circuit; and a third VRF configured to receive, via a Border Gateway Protocol, the route from the second CSP VRF. The L3 network includes at least one provider edge router configured with the first CSP VRF, the second CSP VRF, and the third VRF. The third VRF is configured as a hub VRF for an Internet Protocol Virtual Private Network (IP-VPN), and the first CSP VRF and the second CSP VRF are configured as spoke VRFs for the IP-VPN such that the third VRF forwards packets between the first cloud service provider network and the second cloud service provider network.

In some examples, the L3 network 764 is an L3 autonomous system. In some examples, the L3 network does not advertise routes for the first cloud service provider network and the second cloud service provider network to the Internet.

FIG. 7B is a block diagram illustrating an example system 780 that is similar to system 750 of FIG. 7A, except that in system 780, the L3 network 764 is configured with an enterprise attachment circuit 782 for an enterprise network 781 co-located within the same data center in which the cloud exchange and the CSPs 320 are co-located. In the example of FIG. 7B, the routes stored by the L3 routing instance 760 enables the L3 routing instance to forward cloud service traffic between the enterprise network 781, and any of CSPs 320.

Figure 8:
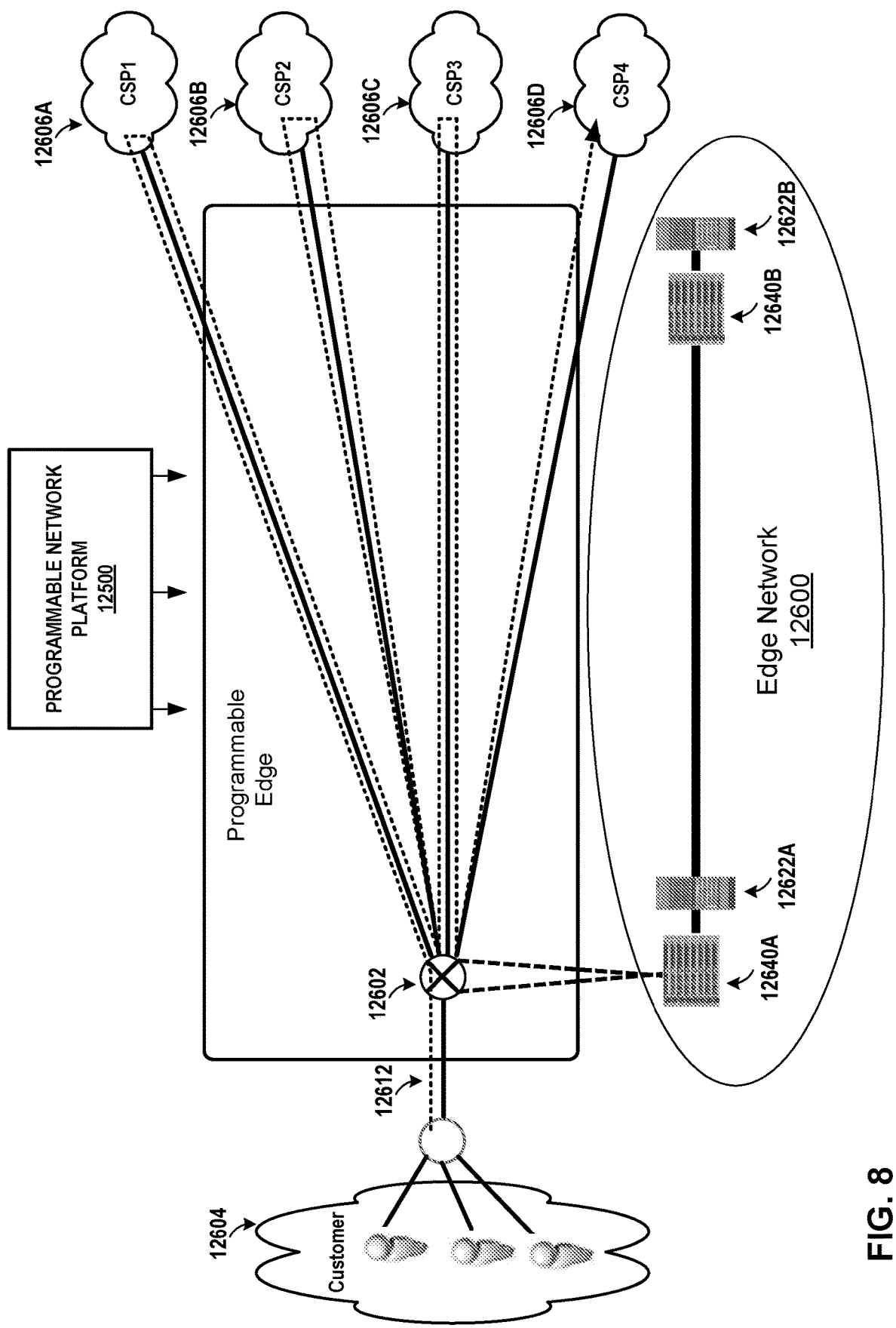
FIG. 8 is a block diagram that illustrates an example configuration of a programmable edge network that has been configured to offer an end-to-end service that is a sequence of multiple constituent micro-services applied by respective cloud service providers.

FIG. 8 is a block diagram that illustrates an example configuration of a programmable edge network that has been configured to offer an end-to-end service that is a sequence of multiple constituent micro-services applied by respective cloud service providers. Edge network 12600 may include any of the data center-based cloud exchanges or cloud exchange points described herein, such as cloud exchange points 128 of FIG. 1, and cloud exchange 200 of FIG. 2.

Micro-services for an overall service established for a customer may include a mix of Software-as-a-Service (SaaS), Platform-aaS (PaaS), Infrastructure-aaS (IaaS), Virtualization-aaS (VaaS), and data Storage-aaS (dSaaS) services in any ordering. For example, different cloud service providers 12606 may execute applications that analyze application data of service traffic 12612 to generate reporting data, store application data, generate new application data for sending as additional service traffic 12612 along the sequence of micro-services, and so forth.

In accordance with techniques described herein, each of cloud service providers 12606 offers/executes a micro-service that edge network 12600 arranges (or "chains") together to form an overall multi-cloud service for customer 12604. More specifically, in some aspects, the programmable network platform 12500 configures a router (or forwarder) 12602 to stitch together the micro-services offered by respective various cloud service providers 12606 into an overall service to apply to packets of service traffic 12612.

The customer 12604 may use the programmable network platform 12500 to select and arrange the micro-services of cloud service providers 12606 for at least some of the service traffic. In some examples, the service traffic may be originated or received by the customer 12604 network, while in other examples the service traffic may not be originated by a customer network, but rather may be originated by one of CSPs 12606 upon the request of a customer. As described above, the programmable network platform 12500 may offer the customer connectivity to multiple different cloud service providers. In some cases, as described herein, the customer need not have any connectivity to the router 12602, but uses an L3 routing instance configured on router 12602 for the customer.

Upon selecting the cloud service providers offering micro-services and a topology for the micro-services, the programmable network platform 12500 configures the edge network 12600 to provision the micro-services for the customer 12604. Selecting a cloud service provider may include entering connectivity parameters for the micro-service offered by the cloud service provider. Such connectivity parameters may include L3 routes and bandwidth or other QoS requirements. In some cases, the customer may enter the connectivity parameters. In other cases, the customer simply selects the cloud service providers while the programmable network platform 12500 manages entering the specific connectivity parameters.

In the illustrated example, router 12602 receives L3 routes for each of the cloud service provider 12606 networks that enable the router 12602 to forward service traffic 12612 along the overall end-to-end service path. To implement the router 12602, the programmable network platform 12500 may, for instance, configure one or more servers 12620A to execute a virtual router (or configure a dedicated router) that includes VRFs for each of the cloud service provider 12606 networks. As described above with respect to FIG. 4, for instance, the VRFs may be associated with route targets to establish a hub-and-spoke topology for sending and receiving service traffic 12612, with router 12602, to and from the cloud service provider 12606 networks that offer the micro-services. In some examples, CSPs 12606 each have respective attachment circuits configured as interfaces to a single VRF (L3 routing instance) on router 12602 for the customer.

Consequently, the cloud exchange provider that administers edge network 12600, using via the programmable network platform 12500, may alleviate customer 12604 from establishing, administering, and at least in some cases assuring the end-to-end service that is made up of micro-services of cloud service providers 12606. In some examples, customer 12604, for instance, can forward service traffic 12612 to edge network 12600 in accordance with cloud exchange provider routes and need not peer with cloud service provider 12606 networks in order to obtain routes for each of those networks. Rather, the cloud exchange point of edge network 12600 internalizes the L3 routing protocol peering arrangements with the cloud service provider 12606 networks and imports the L3 routes to cloud service provider 12606 networks in order to forward service traffic along the topology of the overall service.

Router 12602 may include one or more VRFs configured as an L3 instance for an enterprise/customer, configured by the programmable network platform to import and export respective L3 routes for the services provided by cloud service providers 12606. The router 12602 may receive the routes from the programmable network platform in some instances, or receive the routes via peering sessions with other provider edge (PE) routers of edge network 12600 that connect the cloud exchange to any of the cloud service provider 12606 networks.

Service chaining may be thought of as a method of combining a number of disparate but related actions into a single action/request for the user. The end result is a more integrated way of enabling services and establishing interoperability across multiple services. If a service chain is set up over an L3 routing instance on router 12602, customer network 12604 need not be an endpoint in the service chain. Rather, the CSPs 12606 are endpoints of the service chain. In this way, the techniques described herein for multi-cloud linking may enable two or more cloud services to be integrated via a single service connection with the buyer, either at layer 2 or layer 3. The techniques may also enable multiple cloud exchange destinations to be linked via VLAN switched instances or routed instances.

In some examples, the techniques of this disclosure may be used to support internet of things (IoT) concepts, such as by linking data ingested from the Internet with cloud exchange private storage and compute services offered by CSPs. The techniques may eliminate buyer devices from traffic routing/hair pinning, and may apply service interworking of layer 3 service treatments on layer 2 services to avoid the need for customers to manage both layer 2 and 3 services via the cloud exchange. This capability may provide customers more efficient resource utilization and better performance, and may provide access to new services via the cloud exchange.

In some examples, the edge network 12600 may advertise, to customer 12604, L3 routes of the cloud exchange point autonomous system NATed with L3 routes of the cloud service provider 12606D network by the cloud exchange, L3 routes for the vNAT service 12614, (in this example that includes a NAT service), or L3 routes of the cloud service provider 12606D network. In this way, the edge network 12600 may aggregate the delivery of multiple, multi-cloud L3 services to customer 12604.

FIG. 8 illustrates the delivery, by edge network 12600, of an end-to-end service made up of multiple micro-services to service traffic 12612. In some examples, the customer 12604 network sends service traffic 12612 to edge network 12600 and destined for a network address within a prefix advertised as an L3 route by the edge network 12600 to the customer 12604 network. In other examples, one of CSPs 12606 originates service traffic 12612 to edge network 12600 and destined for a network address within a prefix advertised as an L3 route. Service traffic 12612 may include one or more packet flows, each packet flow associated with one or more packets that include application-layer data generated and/or consumed by an application executing within the customer 12604 network or CSP network 12606.

Although illustrated in FIG. 8 as originating from the customer 12604 network and proceeding upstream toward the cloud service providers, the techniques are similarly applicable to downstream service traffic destined for the customer 12604 network, as well as to downstream service traffic originated from one of the cloud service providers 12606 networks and destined for one of the cloud service provider 12606 networks. For example, a cloud service provider 12606D may inject application data via router 12602 to an application executed by the cloud service provider 12606C network to analyze the application data, which sends the analyzed application data for processing to the cloud service provider 12606B network, which in turns send the application data for storage to a dSaaS-providing cloud service provider 12606A network.

In the illustrated example, however, router 12602 receives service traffic 12612, determines the first micro-service for service traffic 12612, and directs the service traffic 12612 to the cloud service provider 12606A network. The cloud service provider 12606A network applies its micro-service returns the service traffic 12612 (which may be modified from the service traffic originated by the customer 12604 in accordance with the micro-service applied by cloud service provider 12606A) to router 12602.

Router 12602 determines the next micro-service for service traffic 12612 and forwards the service traffic 12612 to cloud service provider 12606B. The cloud service provider 12606B network applies its micro-service and returns the service traffic 12612 (which may be modified in accordance with the micro-service applied by cloud service provider 12606B) to router 12602.

Router 12602 determines the next micro-service for service traffic 12612 and forwards the service traffic 12612 to cloud service provider 12606C. The cloud service provider 12606C network applies its micro-service and returns the service traffic 12612 (which may be modified in accordance with the micro-service applied by cloud service provider 12606C) to router 12602. Router 12602 determines the next micro-service for service traffic 12612 and forwards the service traffic 12612 to cloud service provider 12606D.

Again, in some examples, CSPs 12606 may originate and edge network 12600 may deliver service traffic downstream to customer 12604, with edge network 12600 applying a set of micro-services to such downstream service traffic. For instance, the cloud service provider 12606D network may include or otherwise represent a content delivery network (CDN). A CDN may offer streaming video, streaming audio, streaming multimedia, gaming content, or other content delivery services to customers, and in this case to customer 12604 via the cloud exchange.

As a result, the edge network 12600 including a cloud exchange interconnects, in the data plane, micro-services provided by respective cloud services providers 12606 on behalf of and for the benefit of a customer 12604 of the cloud exchange or of at least one of the cloud service providers.

When provided with a service definition for an end-to-end service having multiple component micro-services, programmable network platform 12500 may orchestrate each of the micro-services within the cloud exchange and stitch the micro-services together according to the defined topology in order to reify the end-to-end service within the cloud exchange (or edge network that includes the cloud exchange). The service definition for an end-to-end service may enable a user of the programmable network platform to define not only the end-to-end service but also the service topology in such a ways as to ensure the correct sequencing of the micro-services service chain. The data encapsulated in the data model for the service definition may also include the authoritative service owner for business purposes (e.g., billing and SLA assurance). The "user" may refer to a customer, the cloud exchange provider, or a cloud service provider that is the authoritative service owner.

By using a data model for a multi-cloud, multi-service service definition as described herein, the programmable network platform (or other orchestration systems such as SDN controllers or orchestrators) may be enabled to recognize a service request as a request for a set of micro-services that make up the entire service. In some examples, the service definition includes several sections that will enable the programmable network platform to provide the service of chaining several services, whether of native services provided by the cloud exchange provider or of cloud services provided one or multiple cloud service providers. That is, the cloud exchange provider that administers the programmable network platform is able to provide a service chain that, when given respective definitions for multiple micro-services and a topology (or sequence) for the multiple micro-services, interconnects the micro-services according to the topology to facilitate an end-to-end service. The data model thus provides data with which the programmable network platform can effectively instantiate the requested chain of services and to also ensure that the services thus rendered are chained in the correct topology. The data model may be divided by the programmable network platform into one or more service requests that the native programmable network platform for the cloud exchange may issue to other service orchestration systems to complete. Other service orchestration systems may include, e.g., SDN controllers and/or orchestration systems for cloud service providers that facilitate NFV-instantiation and service traffic routing to/from NFV instances. Additional details regarding NFV management and orchestration is found in "Network Functions Virtualization (NFV); Management and Orchestration," ETSI GS NFV-MAN 001 v.1.1, European Telecommunications Standards Institute (ETSI), December, 2014, (hereinafter, "NFV MANO") which is incorporated by reference in its entirety.

A service definition conforming to a multi-cloud, multi-service data model of the described techniques may specify an overall end-to-end service associated with one or more of (1) an originator, (2) an owner, (3) a identifier, (4) a destination, and (5) a topology. The originator refers to the end-to-end service requestor, typically but not exclusively a customer of the cloud exchange. The owner refers to the authoritative service owner that, e.g., handles and is responsible for billing and charging to the originator/customer on behalf of the cloud service providers. The identifier uniquely identifies the end-to-end service within the cloud exchange. The destination refers to the cloud exchange where the requested service is instantiated. The topology determines the sequence of an array of micro-services included in the service definition.

Each micro-service defined within a service definition may be an element of an array of micro-services. A micro-service may be associated in the data model with one or more of (1) descriptive information, (2) a first or "customer" endpoint, (3) a second or "cloud service provider" endpoint, (4) policies to be applied by the cloud exchange for the micro-service, (5) Quality-of-Service (QoS) parameters for the micro-service, and (6) a time range for the micro-service.

The descriptive information may include a unique identifier for the micro-service within the cloud exchange. In some examples, the first endpoint for the data model may specify a customer identifier to which the cloud exchange is to attach for service delivery, and a service key. A service key is the license key obtained by a customer for purposes of instantiating and activating a requested service. In other examples, the customer may not be an endpoint in the data model. In these examples, in some cases a customer may request a service and the cloud exchange may obtain the service key from the cloud service provider and use the service key to instantiate and activate the service on behalf of the customer. The second endpoint for the data model may specify a cloud service provider identifier to which the cloud exchange is to attach for service delivery, and a service key. Each endpoint description for the first and second endpoint may also include endpoint specific data, such as a metro location identifier, port identifiers, data center identifiers, virtual circuits and virtual circuit bandwidth, profiles, and configuration, and so forth. Further details of multi-cloud, multi-service offerings are described in U.S. Ser. No. 15/001,822, filed Jan. 20, 2016, entitled "MULTIPLE CLOUD SERVICES DELIVERY BY A CLOUD EXCHANGE," the entire contents of which are incorporated by reference herein.

Figure 9:
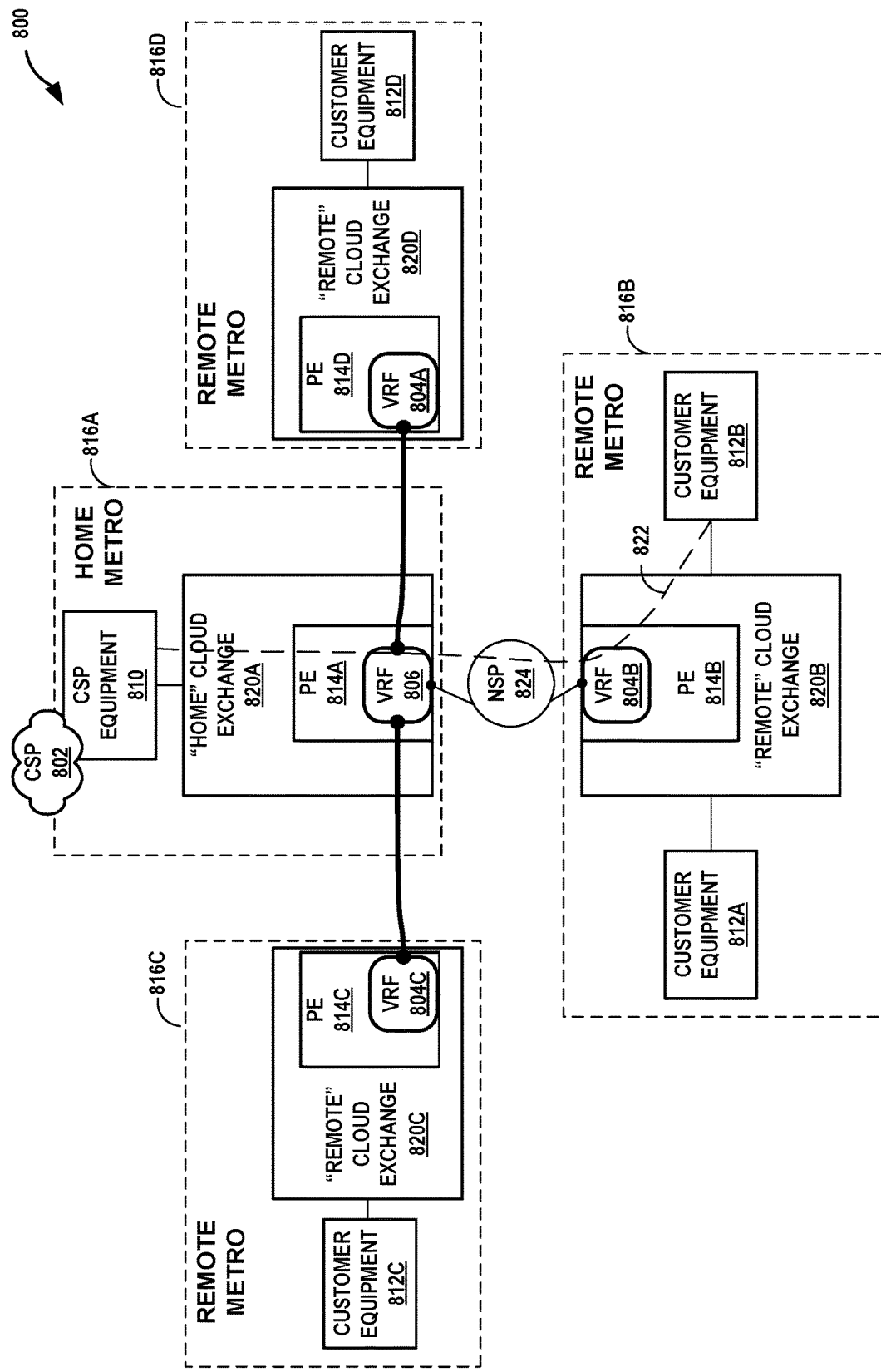
FIG. 9 is a block diagram illustrating an example system in which a CSP having a presence in a home metropolitan area ("home metro") data center can use one or more L3 instances as a service in remote networks for expanding the presence of the CSP to remote metro area data centers.

FIG. 9 is a block diagram illustrating an example system 800 in which a CSP 802 having a presence in a home metropolitan area ("home metro") data center 816A can use one or more L3 instances as a service (VRFs 804) in remote networks for expanding the presence of the CSP 802 to remote metro area data centers 816B-816D. Remote metro data centers 816B-816D may be geographically separate from home metro data center 816A. For example, home metro data center 816A may be located in Chicago, while remote metro data center 816B may be located in Dallas.

In the example of FIG. 9, CSP 802 has CSP equipment 810 (e.g., a rack co-located in a data center operated by a cloud exchange provider) physically located in a home metro data center 816A, but CSP 802 does not have CSP equipment physically located in remote metro data centers 816B-816D. CSP 802 can obtain one more VRFs 804A-804C ("VRFs 804") in respective PE routers 814B-814D located in remote metro data centers, and connect with one or more customers having respective customer equipment 812A-812D in the remote metro data centers. In this way, CSP 802 can establish an end-to-end connection 822 between CSP equipment 810 in a home metro area data center 816A and customer equipment 812B in a remote metro area data center 816B by obtaining VRF 804B in the remote cloud exchange 820B. The home cloud exchange 820A may configure VRF 806 at PE 814A on behalf of CSP 802 (or CSP 802 may enter the configuration information via a portal) to exchange routes with one or more of respective remote VRFs 804B-804D in remote cloud exchanges 820.

In one example, CSP 802 buys L3 instance as a service VRF 806 from home cloud exchange 820A. CSP 802 may then buy, from a network service provider (NSP) 824 that operates as a seller on home cloud exchange 820A, a point-to-point link to the remote cloud exchange 820B. The link is starts at CSP 820's L3 instance (VRF 806) in home metro 816A, and the link is terminated on CSP 820s L3 instance (VRF 804B) in remote cloud exchange 820 of remote metro 816B. CSP 820 can then mark the new metro location as available in its seller profile on home cloud exchange 820A. A customer having customer equipment 812B in remote metro 816B accesses a portal to the cloud exchange 820A and buys, directly from the CSP 802, connectivity between its customer equipment 812B and a CSP network of CSP 802, although CSP 802 does not have equipment physically located in remote metro area data center 816B. CSP 802 can repeat this process for all cloud exchange locations of interest.

When combined with an NSP seller on the cloud exchange, this approach may provide a rapid and low cost start-up option for CSPs in other cloud exchange locations where the CSPs do not yet have presence. In some cases, the CSPs can use the L3 instance-aaS approach until the CSPs get traction in a new market, and then may subsequently decide to install CSP equipment in the remote data centers.

The cloud exchange maintains a network-neutral position. This approach may assume that NSPs are available as sellers on both "Home" and "Remote" cloud exchange metros. Although illustrated as only having NSP 824 between metros 816A and 816B, in some examples each of the remote metros 816 may be reached via intermediate NSP sellers.

This approach uses L3 instance-aaS to provide a seamless solution across metros, and may avoid the need for a cloud exchange to set up its own Network Backhaul to a remote metro, which could introduce unwanted latency. This approach may allow CSPs to try offering their services in new cloud exchange geographic markets without making upfront hardware capital investment. This approach may make it simpler for Enterprises to consume services from CSPs, as the enterprises now need not establish a physical presence in the CSP's home metro to access the CSP's services.

When NSP Sellers offer true Network-aaS via the cloud exchange, Enterprises could reach CSPs home cloud exchange metro on-Demand, or vice versa, end-to-end. Further details of Network-aaS inter-metro connectivity via a cloud exchange are described in U.S. Ser. No. 62/317,281, filed Apr. 1, 2016, entitled "INTER-METRO CONNECTIVITY NETWORK CONNECT," the entire contents of which are incorporated by reference herein.

Figure 10:
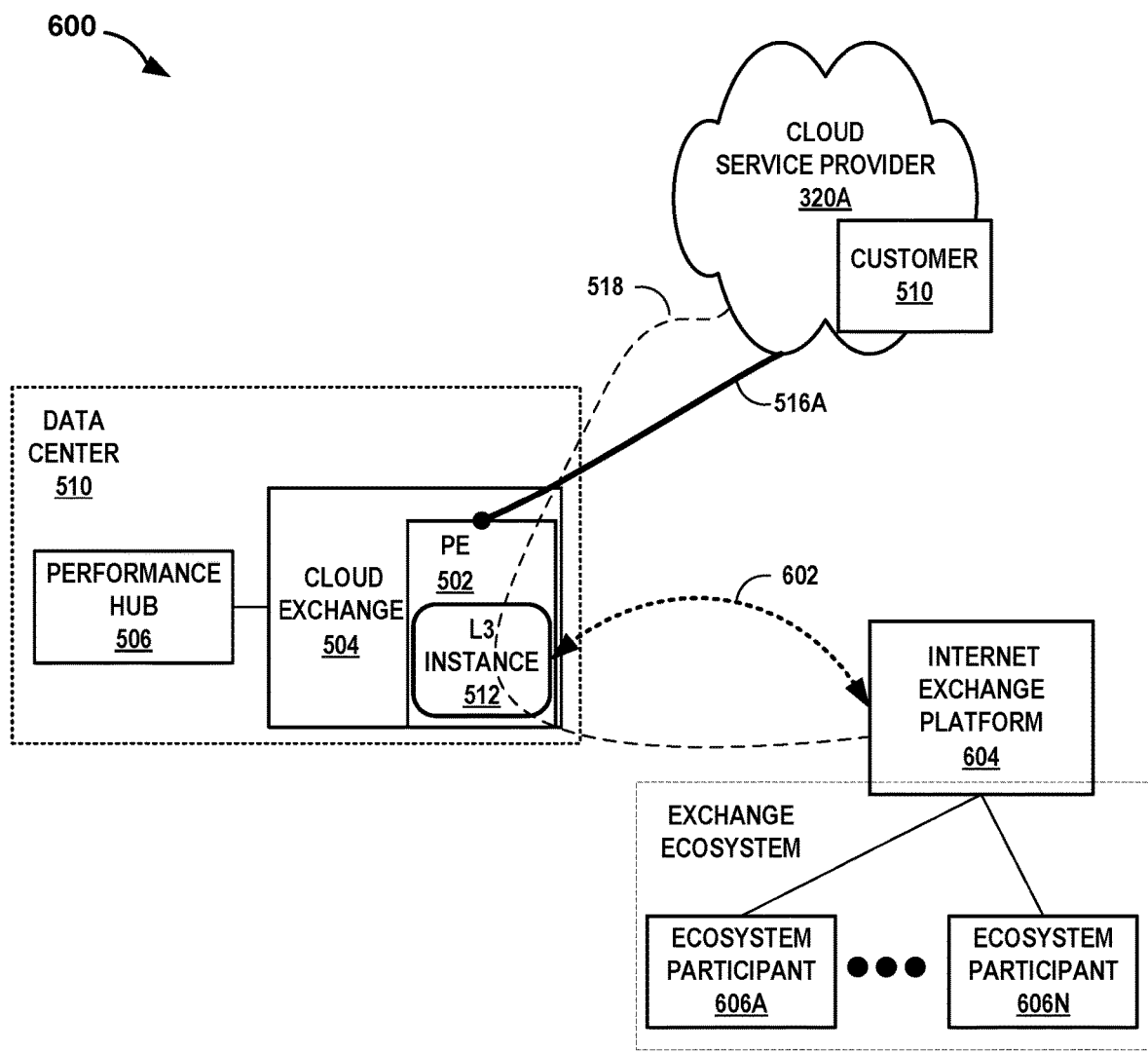
FIGS. 10 and 11 are block diagrams illustrating example use cases in accordance with one or more aspects of the techniques of this disclosure.
Figure 11:
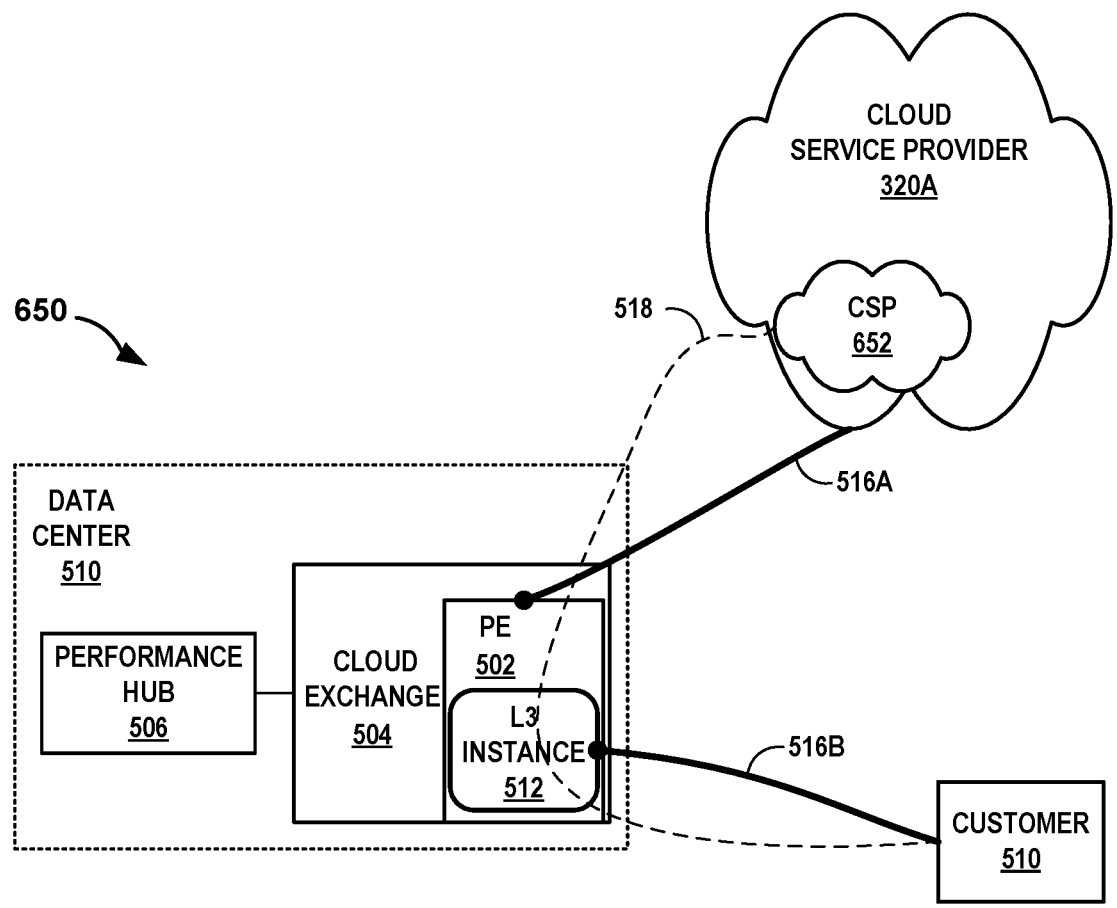

FIGS. 10 and 11 are block diagrams illustrating example use cases in accordance with one or more aspects of the techniques of this disclosure. In some examples, as shown in FIG. 10, an enterprise customer 510 that is hosted and runs within a public Infrastructure as a Service (IaaS) network (e.g., a CSP 320A) could buy the L3 instance as a service (e.g., L3 instance 512) provided by the cloud exchange 504 to connect to an internet exchange platform 604 (e.g., an advertiser ecosystem internet exchange ("ad exchange")) and peer directly with the internet Exchange via peering session 602. This would allow the enterprise to participate in an exchange ecosystem and access other ecosystem participants 606, without requiring the enterprise customer 510 to acquire space in data center 514. In this example, instead of connecting two CSPs via L3 instance 512, the enterprise customer connects itself from one CSP to a partner (e.g., ecosystem participant 606A) the customer is trying to reach in an internet exchange 604, via the cloud exchange 504.

In another example, as shown in FIG. 11, the techniques of this disclosure may allow SaaS and/or PaaS providers currently hosted within other public IaaS providers to become sellers on the cloud exchange 504. This is described as a "nested CSPs" scenario. In this example, CSP 652 purchases L3 instance 512 within cloud exchange 504 and becomes a seller in cloud exchange 504. Customer 654 can purchase services (e.g., data storage and/or data analytics services) from seller CSP 652 via cloud exchange 504, without requiring CSP 652 to acquire space in data center 514. On the backend, in some examples CSP 652 can use a direct connect service offered by CSP 320A to transmit the data of customer 654 back to its main compute services running in CSP 320A. Thus, customer 510 does not need to have a relationship with CSP 320 in order to have a relationship with CSP 652. This allows for nested SaaS providers, where one is a third party IaaS (here, CSP 320A).

The underlying CSP connectivity to CSP 320A may be "chained" to the L3 instance 512 owned by the seller CSP 652. The L3 instance as a service allows cloud exchange 504 to be configured to support such nested CSPs. In some examples, cloud exchange 504 may be configured to terminate a service profile to a physical port belonging to an entity other than the owner of the service profile, if the master owner of the service port has been designated as a CSP host. The hosted CSP (CSP 652) provides information about their environment and the systems of cloud exchange 504 can validate against this information. In this way, using the L3 instance can allow additional physical ports and Letter of Agreement (LOA) from a provider other than owner of the port for a CSP on a CSP. For example, CSP 652 resides on CSP 320A, but wants their own port: cloud exchange 504 delivers a port to facilities of CSP 320A but the LOA is for CSP 652.

In some examples, utilization and reporting for CSP 652 is limited to only those services terminating to CSP 652, or their virtual port channel (VPC) in the case of riding the same port. In some examples, the owner of the master port may set limits on the master port, e.g., limits as to how much sold bandwidth CSP 652 may use. CSP 320A may be considered a "reseller" of cloud exchange assets (e.g., a physical port or virtual port channel), and CSP 320A may have control over asset-based permissions management using techniques described in U.S. Provisional Pat. No.

62/319,627, filed Apr. 7, 2016, entitled "ASSET-BASED PERMISSIONS MANAGEMENT FOR RESELLERS OF CLOUD EXCHANGE ASSETS," the entire contents of which are incorporated by reference herein.

In some examples, the L3 routing instance-aaS techniques described herein may help customers deal with certain limitations of seller CSPs on a cloud exchange. For example, a CSP may require a customer to have dual ports to connect with the CSP. With L3 instance-aaS, the customer can simply get a single VRF and configure two different VLANs on the VRF to meet the dual port requirement. In another example, a CSP may apply a bandwidth limit for traffic. A customer can buy a CSP "direct connect" connection running on top of a physical cross-connect, associate the direct connect with a cloud exchange and connect the direct connect to the customer's VRF and have more bandwidth via the direct connect.

In some examples, the L3 instance-aaS can enable customers to connect to Cross Connect-based Direct Connect CSPs via a cloud exchange. The L3 instance-aaS can allow enterprises to connect to these CSPs directly via an L3 instance in a cloud exchange.

The L3 instance can act at "virtual CPE" or "virtual router" and can be automated. In some examples, APIs exposed for create, read, update, and delete (CRUD) operations of the L3 instances could enable automated orchestration for enterprises.

In some examples, enterprises can interconnect disparate hosted Private Branch Exchange (PBX) providers and Hosted Contact Center providers to communicate directly and share "call-state" information between the PBX and Hosted Contact Centers providers, closing the gap between different Hosted PBX and Hosted Contact Centers. The enterprise can build a connection for sharing call-state information using the L3 instance-aaS.

In some examples, the L3 instance-aaS can be used for Self Service WAN. That is, using software defined wide area network (SD-WAN) providers and service chaining features over the cloud exchange, an enterprise could build WAN-as-a-Service quickly via a cloud exchange portal. In this example, one of CSPs 320 (FIG. 6B) is an SD-WAN provider. Cloud exchange 520 becomes a hub and branch office locations of the enterprises become the spokes, where each of the branch office locations connect to the L3 instance 512.

Figure 12:
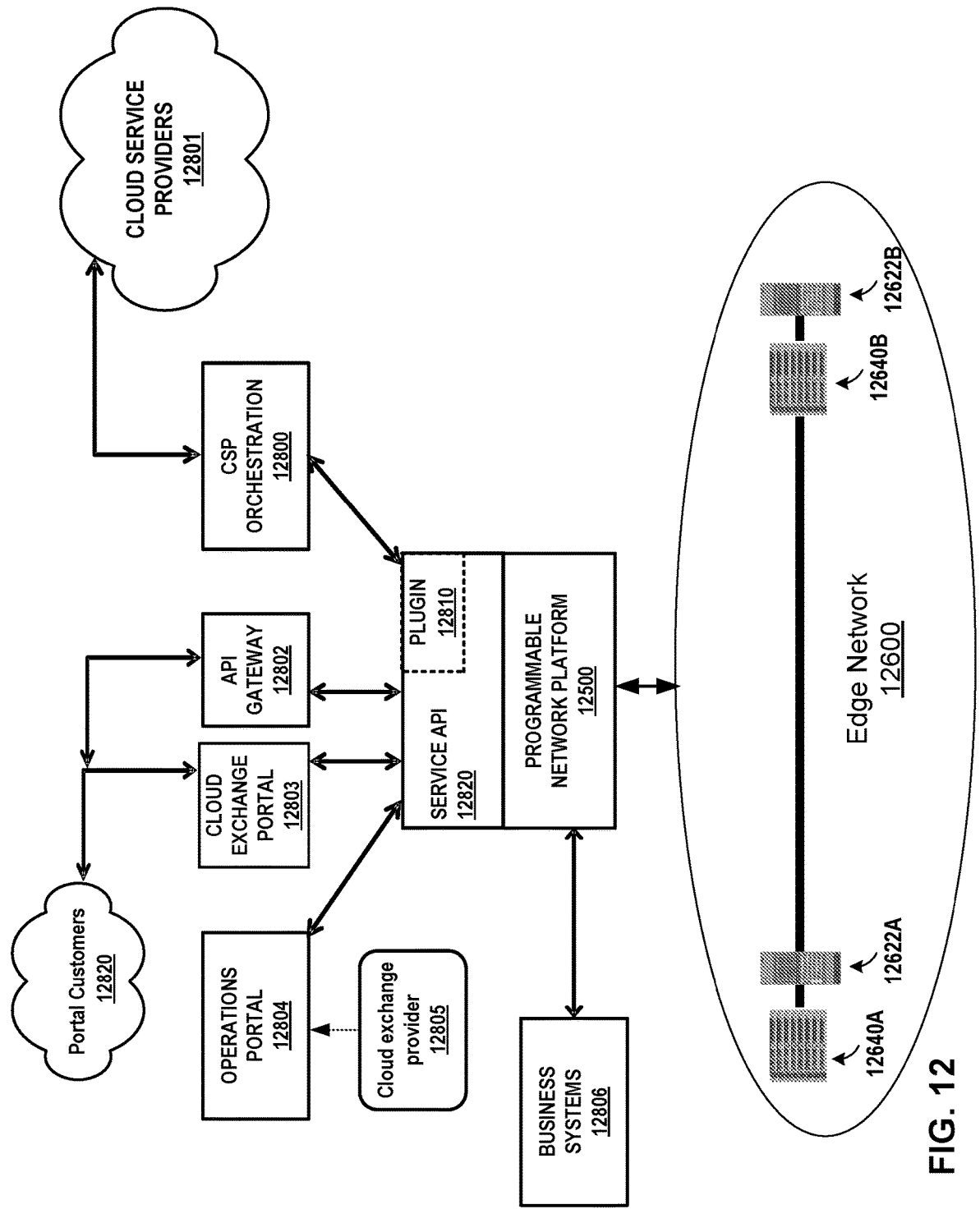
FIG. 12 is a block diagram illustrating a programmable network platform that includes interfaces by which external applications may configure a cloud exchange to facilitate delivery of cloud services from cloud service providers according to techniques described in this disclosure.

FIG. 12 is a block diagram illustrating a programmable network platform that includes interfaces by which external applications may configure a cloud exchange to facilitate delivery of cloud services from cloud service providers according to techniques described in this disclosure. In this example, programmable network platform 12500 exposes a service API 12820 for service delivery and data access. This various embodiments of APIs and other interfaces described elsewhere in this disclosure for communicating with embodiments of programmable network platform 12500 may all represent examples of service API 12820.

Service API 12820 includes, in this example, at least one third-party plugin 12810 developed by cloud service providers and executed by the programmable network platform 12500 to request and establish layer 3 cloud services from the cloud service providers. Plugin 12810 may represent any of third-party orchestration modules 10404. The plugin 12810 may implement a common plugin interface for the programmable network platform 12500 and translate interface methods, fields, etc., to a cloud service provider interface for CSP orchestration. For example, programmable network platform 12500 may invoke plugin 12810 to request a service instance from a cloud service provider for the cloud exchange provider (e.g., a 60 GB data storage service).

Plugin 12810 for the cloud service provider receives the request and invokes CSP orchestration system 12800 to allow one or more cloud service providers 12801 to orchestrate the instantiation of the requested service. CSP orchestration 12800 via plugin 12810 then returns connectivity information in the form of a "network handle" to the programmable network platform 12500. The network handle includes information by which the cloud exchange can connect to the instantiated, requested service. For example, the network handle may include a VxLAN or VLAN identifier, a layer 3 route or network address, tunnel information and/or cloud aggregate link information. The programmable network platform 12500 uses the network handle to configure edge network 12600 to connect to the instantiated, requested service, and to interconnect at least one customer network to the instantiated, requested service.

Operations portal 12804 represents a platform manufactured by the cloud service provider, for use by cloud service provider 12804 technicians or operators, e.g., that invokes the service API 12820 of programmable network platform 12500. CSP orchestration system 12800 represents one or more systems developed by the cloud service providers and usable by the programmable network platform 12500 to request layer 3 services from the cloud service providers. API gateway 12802 offers a high-level API by which customer-developed platforms or a cloud service provider-developed customer portal may request services from the programmable network platform 12500. Additional details of the API gateway and high-level API are found in U.S. patent application Ser. No. 14/927,451, incorporated above.

Programmable network platform 12500 may receive a request for a L3 instance from a portal customer 12820 via cloud exchange portal 12803 or API gateway 12802. Programmable network platform 12500 configures devices within edge network 12600 to create the requested L3 instance. In some examples, programmable network platform 12500 may provide a cloud exchange customer with a simple user interface for configuring an L3 instance, in a Platform-aaS model, while in other examples, programmable network platform 12500 may provide the L3 instances more as Infrastructure-aas, in which case programmable network platform 12500 may provide CLI access to the customer.

The techniques for L3 instances described herein may provide redundancy, in that customers can create L3 instances on multiple cloud exchanges, for example. Programmable network platform 12500 may also provide customers the ability to spawn multiple L3 instances on demand, thereby providing auto-scaling. In some examples, cloud exchange portal 12803 may present a user interface by which a customer can select on-demand, pay per use billing, such as with hourly and monthly options. In some examples, cloud exchange portal 12803 may present a user interface that provides options for customization of the L3 instances by portal customers 12820. For example, portal 12803 may allow enterprises to customize the L3 instance by defining IP ranges and other routing information where applicable.

In some examples, programmable network platform 12500 may allow an L3 instance to connect to a cross connect based Direct Connect CSP. This will enable a customer to own the cross connect to the Direct Connect CSP. Customers can then order a VLAN to the target CSP. In some examples, programmable network platform 12500 may allow a seller profile to be associated with an L3 instance. This means that a customer can create a seller profile once the customer has created an L3 instance, and can be listed as a seller on the cloud exchange. This feature enables service providers to associate themselves with an L3 instance, or in some cases to associate to an L3 instance's auto-scaling group.

The techniques described herein can also provide a degree of automation, as the L3 instance (Enterprise VRF) may be considered a "virtual customer premises equipment (CPE)" or "router as a service," and in some examples programmable network platform 12500 may automate the end to end provisioning of connectivity between L3 instance and CSPs. In some examples, cloud exchange portal 12803 and programmable network platform 12500 may allow the ability for a customer to call CRUD operations on an L3 instance. In some examples, programmable network platform 12500 may provide Virtual eXtensible LAN (VXLAN) support for L3 CSPs, providing L3 encapsulation for RFC 1918 traffic. Programmable network platform 12500 may provide dedicated L3 instances for compliance-sensitive customers that may demand single-tenancy at the hardware level. For example, a dedicated L3 instance may be created on a single-tenant router.

In some examples, programmable network platform 12500 may provide identity federation. In some examples, DNS management to resolve to names instead of IP addresses.

Figure 13:
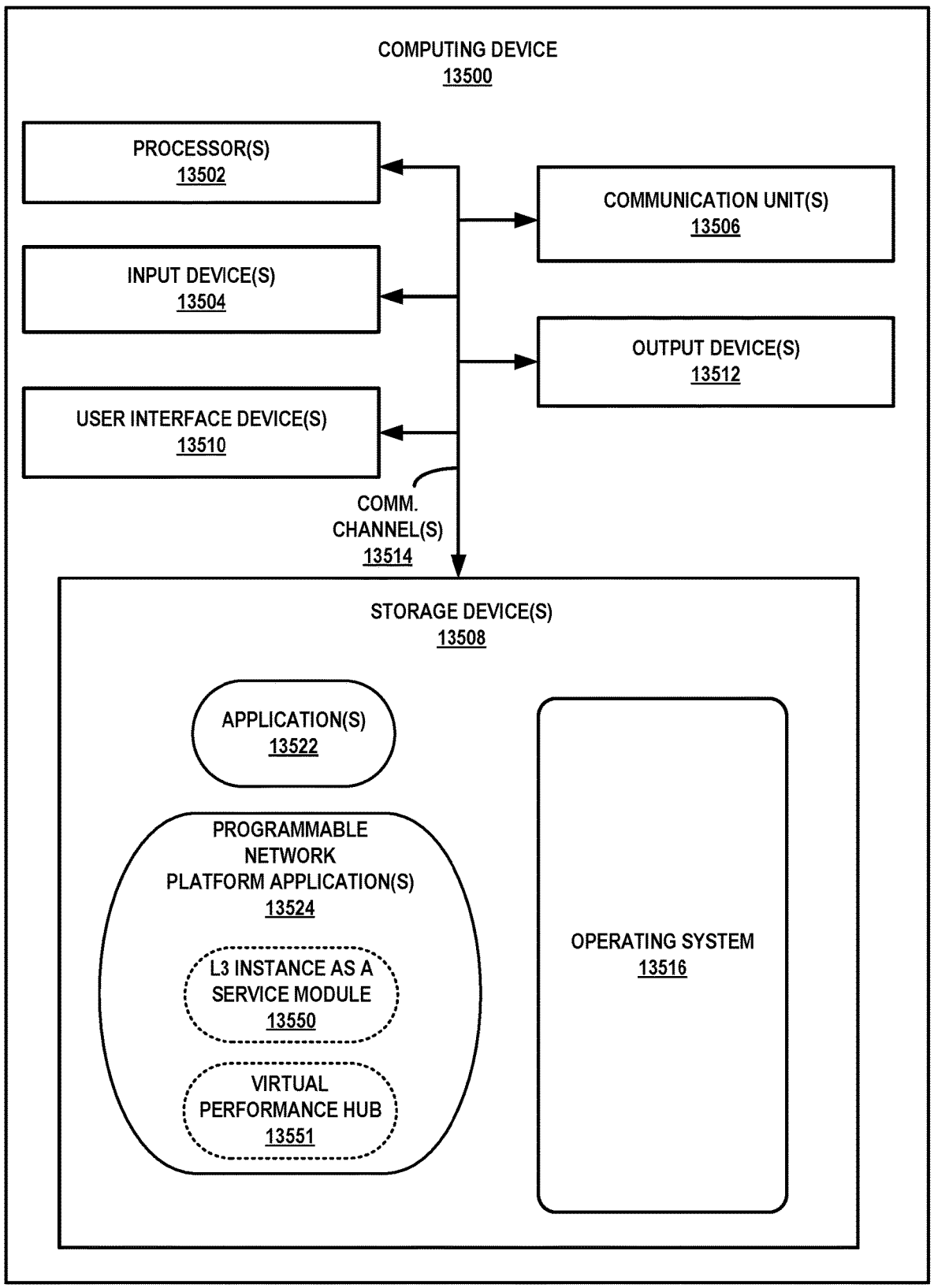
FIG. 13 is a block diagram illustrating further details of one example of a computing device that operates in accordance with one or more techniques of the present disclosure.

FIG. 13 is a block diagram illustrating further details of one example of a computing device that operates in accordance with one or more techniques of the present disclosure. FIG. 13 may illustrate a particular example of a server or other computing device 13500 that includes one or more processor(s) 13502 for executing any one or more of the programmable network platform components, or any other system, application, or module described herein. Other examples of computing device 13500 may be used in other instances. Although shown in FIG. 13 as a stand-alone computing device 13500 for purposes of example, a computing device may be any component or system that includes one or more processors or other suitable computing environment for executing software instructions and, for example, need not necessarily include one or more elements shown in FIG. 13 (e.g., communication units 13506; and in some examples components such as storage device(s) 13508 may not be co-located or in the same chassis as other components).

As shown in the specific example of FIG. 13, computing device 13500 includes one or more processors 13502, one or more input devices 13504, one or more communication units 13506, one or more output devices 13512, one or more storage devices 13508, and user interface (UI) device 13510, and communication unit 13506. Computing device 13500, in one example, further includes one or more applications 13522, programmable network platform application(s) 13524, and operating system 13516 that are executable by computing device 13500. Each of components 13502, 13504, 13506, 13508, 13510, and 13512 are coupled (physically, communicatively, and/or operatively) for inter-component communications. In some examples, communication channels 13514 may include a system bus, a network connection, an inter-process communication data structure, or any other method for communicating data. As one example, components 13502, 13504, 13506, 13508, 13510, and 13512 may be coupled by one or more communication channels 13514.

Processors 13502, in one example, are configured to implement functionality and/or process instructions for execution within computing device 13500. For example, processors 13502 may be capable of processing instructions stored in storage device 13508. Examples of processors 13502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 13508 may be configured to store information within computing device 13500 during operation. Storage device 13508, in some examples, is described as a computer-readable storage medium. In some examples, storage device 13508 is a temporary memory, meaning that a primary purpose of storage device 13508 is not long-term storage. Storage device 13508, in some examples, is described as a volatile memory, meaning that storage device 13508 does not maintain stored contents when the computer is turned off. Examples of volatile memories include random access memories (RAM), dynamic random access memories (DRAM), static random access memories (SRAM), and other forms of volatile memories known in the art. In some examples, storage device 13508 is used to store program instructions for execution by processors 13502. Storage device 13508, in one example, is used by software or applications running on computing device 13500 to temporarily store information during program execution.

Storage devices 13508, in some examples, also include one or more computer-readable storage media. Storage devices 13508 may be configured to store larger amounts of information than volatile memory. Storage devices 13508 may further be configured for long-term storage of information. In some examples, storage devices 13508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 13500, in some examples, also includes one or more communication units 13506. Computing device 13500, in one example, utilizes communication units 13506 to communicate with external devices via one or more networks, such as one or more wired/wireless/mobile networks. Communication units 13506 may include a network interface card, such as an Ethernet card, an optical transceiver, a radio frequency transceiver, or any other type of device that can send and receive information. In some examples, computing device 13500 uses communication unit 13506 to communicate with an external device.

Computing device 13500, in one example, also includes one or more user interface devices 13510. User interface devices 13510, in some examples, are configured to receive input from a user through tactile, audio, or video feedback. Examples of user interface devices(s) 13510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 13512 may also be included in computing device 13500. Output device 13512, in some examples, is configured to provide output to a user using tactile, audio, or video stimuli. Output device 13512, in one example, includes a presence-sensitive display, a sound card, a video graphics adapter card, or any other type of device for converting a signal into an appropriate form understandable to humans or machines. Additional examples of output device 13512 include a speaker, a cathode ray tube (CRT) monitor, a liquid crystal display (LCD), or any other type of device that can generate intelligible output to a user.

Computing device 13500 may include operating system 13516. Operating system 13516, in some examples, controls the operation of components of computing device 13500. For example, operating system 13516, in one example, facilitates the communication of one or more applications 13522 and programmable network platform application(s) 13524 with processors 13502, communication unit 13506, storage device 13508, input device 13504, user interface devices 13510, and output device 13512.

Application 522 and programmable network platform application(s) 13524 may also include program instructions and/or data that are executable by computing device 13500. Example programmable network platform application(s) 13524 executable by computing device 13500 may include L3 instance as a service module 13550 and virtual performance hub module 13551.

L3 instance as a service module 13550 may include instructions for causing computing device 13500 to perform one or more of the operations and actions described in the present disclosure with respect to L3 instances as a service. As one example, L3 instance as a service module 13550 may include instructions that cause computing device 13500 to configure, de-install and manage an L3 instance, including by configuring PE routers with corresponding VRFs, for example.

Virtual performance hub module 13551 may include instructions for causing computing device 13500 to perform one or more of the operations and actions described in the present disclosure with respect to configuring a virtual router and network function virtualization infrastructure for routing packet flows to and from the virtual router among multiple NFV services for a customer. Computing device 13500 may be part of NFV infrastructure of a data center and deployed by the data center provider. Virtual performance hub module may be part of a programmable network platform application for configuring NFV infrastructure within a data center, such as a virtual network layer 756, NFV infrastructure 1920, and NFV services.

Figure 14A:
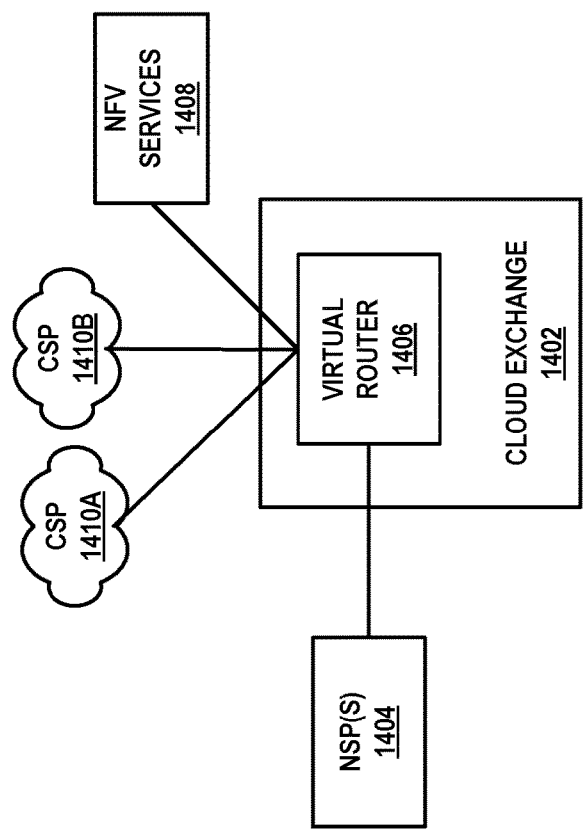
FIGS. 14A-14C are block diagrams illustrating example virtual router deployments in a cloud exchange, according to techniques described herein.
Figure 14C:
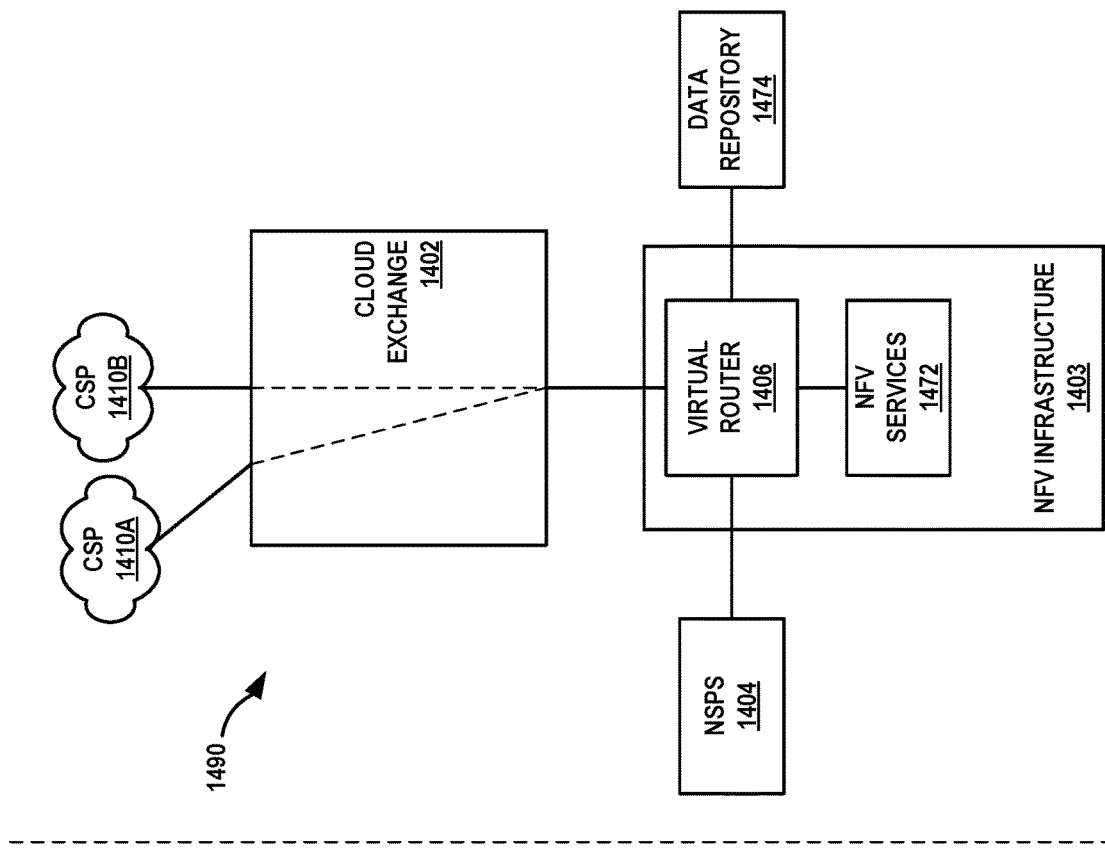
Figure 14B:
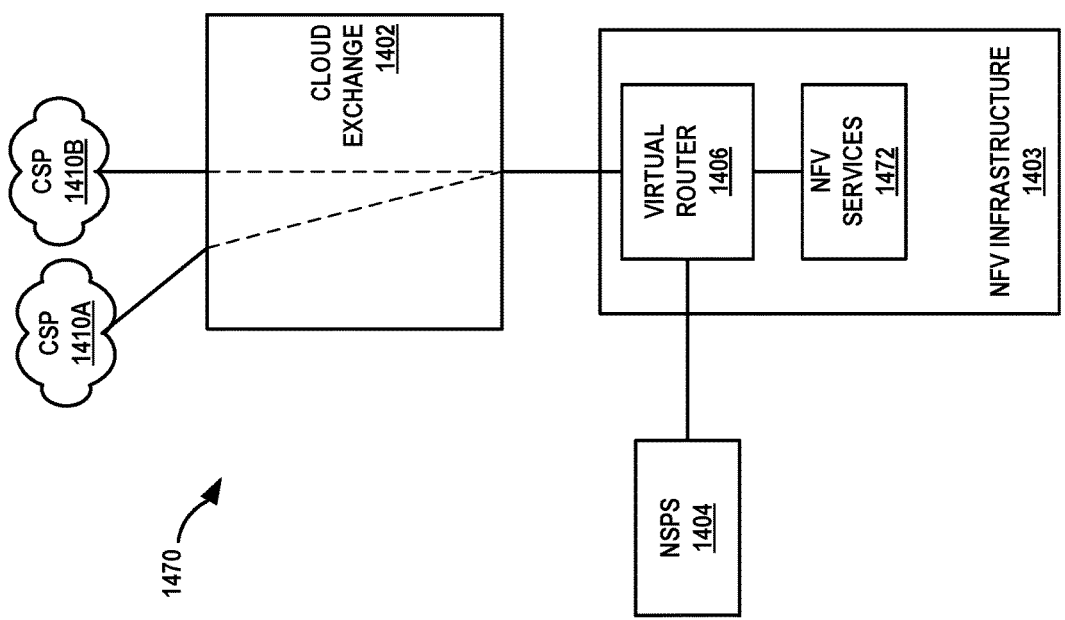

FIGS. 14A-14C are block diagrams illustrating example virtual router deployments in a cloud exchange, according to techniques described herein. System 1450 includes a cloud exchange 1402 having ports by which NSP networks 1404, cloud service provider networks 1410A-1410B, and cloud-based network function virtualization (NFV) services networks 1408 cross-connect to the cloud exchange 1402 using one or more physical connections. A software-based virtual router 1406 executes on one or more real or virtual servers accessible via the cloud exchange 1402. The servers may be located in a data center that hosts the cloud exchange 1402. As used herein, a cross-connect between two networks refers to a physical link that connects ports of the networks. The physical link may represent a CAT5 cable, a fiber connection, or other physical link, for example.

NFV services networks 1408 represent one or more cloud service provider networks co-located in a data center that hosts cloud exchange 1402 and that each offer one or more cloud-based network functions. A "network function" or "NFV service" may include functions applied to packet flows, such as firewall, load balancing, packet inspection, VPN, WAN acceleration, classification, TCP acceleration, and routing. A "network service" may refer to a combination of one or more network functions arranged in topology for application to packet flows mapped to the network service. Because a network service may sometimes include a single network function or NFV service, the terms "network service," "network function," and "NFV service" may be used herein to refer to a similar service.

According to techniques of this disclosure, virtual router 1406 operates as an integration point for virtual connections to NFV services networks 1408, by routing packet flows to one or more of NFV services networks 1408 for application of one or more cloud-based network functions to the packet flows. NFV services networks 1408 may each represent a network that offers one or more NFV instances for application to packet flows. The packet flows may, in some examples, be sourced by or destined to an enterprise network that is not located at the cloud exchange 1402 and is instead reachable only via the NSP networks 1404. That is, an enterprise external to the cloud exchange and not co-located at a data center that hosts the cloud exchange may nevertheless source and receive, via NSPs 1404, packet flows routed in part by virtual router 1406. The enterprise may configure the virtual router 1406 to route packet flows to and from NFV services networks 1408 in a particular ordering or "service chain." The enterprise may contract with the NFV services network 1408 providers to provide network functions to the enterprise traffic according to, e.g., a service level agreement.

In this way, the virtual router 1406 enables a virtual performance hub of one or more network functions for an enterprise customer of the cloud exchange 1402 provider for application of cloud-based network functions with minimal intervention by the cloud exchange provider. To an enterprise, system 1450 may offer cloud connectivity, localized and optimized traffic, multi-cloud connectivity with CSP networks 1410 and NFV services networks 1408, offload of Internet at the edge, connection to the cloud exchange 1042 ecosystem of cloud service providers, and boundary control.

System 1470 of FIG. 14B is similar in some respects to system 1450. Whereas virtual router 1406 is hosted by one or more computing devices reachable via cloud exchange 1402, system 1470 includes one or more computing devices operating as NFV infrastructure 1403 and hosting the virtual router 1406 cross-connected to NSP networks 1404 and cross-connected to the cloud exchange 1402. A cross-connect between the virtual router 1406 and NSPs 1404 or cloud exchange 1402 refers to a physical link that connects a network interface (or port) of the computing device that executes virtual router 1406 and ports of the NSPs 1404/cloud exchange 1402 networks. The physical link may represent a CAT5 cable, a fiber connection, or other physical link, for example. The virtual router 1406 may route packet flows sent or received with CSPs 1410 via cloud exchange 1402.

In addition, the one or more computing devices host software-based network services 1472. The one or more computing devices may be deployed by the cloud exchange provider, in some instances, and leased to an enterprise customer for loading virtualized network functions onto virtualized or physical hardware leased to the enterprise customer by the cloud exchange provider. Virtual router 1406 may be configurable by the enterprise customer to route packet flows among network services 1472 in a service chain for application of the network services. The packet flows may be sourced by or destined to an enterprise network reachable via NSP networks 1404.

System 1490 of FIG. 14C is similar in respects to system 1470 but further includes a distributed data repository 1474 for data caching at the edge. The data repository 1474 may be in the data center that hosts the cloud exchange 1402.

System 1490 may enable a distributed data repository, data cache and edge placement, edge analytics, and data exchange/integration.

Figure 15:
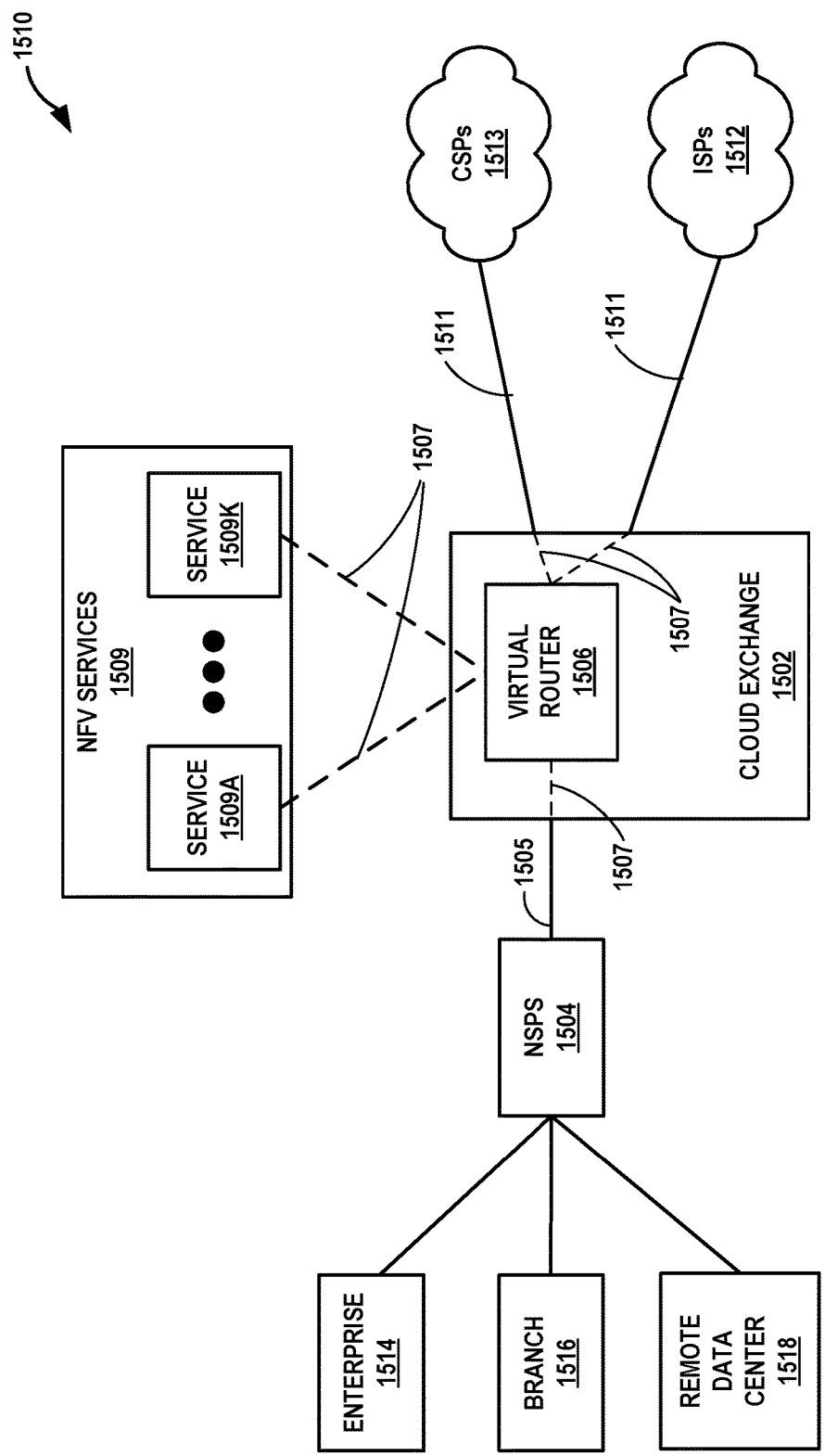
FIG. 15 is a block diagram depicting an example performance hub deployment and an example virtual performance hub according to techniques of this disclosure.

FIG. 15 is a block diagram depicting an example a virtual performance hub, according to techniques of this disclosure. A virtual performance hub contrasts with a physical performance hub rack deployed by an enterprise customer to co-location space in a data center. In a physical performance hub deployment, the data center provider offers cross-connection to, e.g., cloud provider networks, a cloud exchange, a network service provider networks, and to enterprise networks (Enterprise HQ 1514, enterprise data center 1518, and branch offices 1516) via the network service provider networks. The performance hub rack includes slots for multiple dedicated network function appliances, including a router, firewall, VPN terminator, load balancer, and WAN acceleration, as the illustrated examples. The enterprise customer must lease co-location space in the data center to deploy the performance hub rack, which is then cross-connected by the data center provider to one or more networks in order to send and receive packet flows to which the performance hub applies the network functions.

System 1510 operates according to techniques of this disclosure to provide a virtual performance hub that does not require a customer to lease co-location space from the data center provider, and instead routes packet flows among third-party virtualized network functions that are hosted in one or more cloud service provider networks or hosted by one or more computing devices operated by the data center provider but configurable by, e.g., the customer. System 1510 may represent an example instance of system 1450, 1470, and 1490 of FIGS. 14A-14C.

In the illustrated example, a customer of a data center provider, such as an enterprise customer, requests a virtual router from the cloud exchange provider and the customer requests respective virtual circuits from the virtual router to the cloud service provider networks that host NFV services. The cloud exchange provider may provision a cross-connect 1505 from an NSP network 1504, by which the enterprise networks reach the cloud exchange, to the cloud exchange network and further provision a virtual circuit 1507 over the cross-connect 1505 to create a virtual connection between the virtual router 1506 and the enterprise networks 1514. The customer may configure the virtual router 1506 to thereafter route packet flows among third-party network function virtualization service providers that offer NFV services 1509-1509K via virtual connections to cloud exchange 1502. In some cases, one or more of the NFV services may be hosted by the cloud exchange provider in the data center that hosts the cloud exchange. The enterprise may lease processing power and bandwidth, e.g., from the cloud exchange provider to execute the NFV services. The NFV service may be configurable by the customer. The virtual router 1506 may be used as an integration hub for inter-CSP use cases, service linking, and as a termination point for Internet service. Cross connects may be terminated to the data center network infrastructure (platform) with connection pointed to a specific virtual router. The virtual router 1506 may serve as the integration point for virtual connections to third-party NFV service providers.

System 1510 or system 1450 may each include a virtual router and one or more virtual ports over a physical cross-connect 1509 by which a virtual connection 1507 between an NSP network offering connectivity to an enterprise customer and a virtual router in the data center is established. The NSP network may offer WAN connectivity. Via the cloud exchange, the virtual router may route traffic to/from one or more virtualized performance hub servers, the Internet, and one or more other cloud service provider networks 1513 offering Infrastructure, Software, Platform, Data Storage, or other offering as-a-Service. At least in some examples, no colocation is required for a customer to obtain NFV services (e.g., firewall, load balancer, packet inspection) using a virtual performance hub. A system may include a virtual router, virtual ports for connecting a virtual circuit (or "interconnection") 1507 over an NSP/ECX cross connect between an NSP and the virtual router. The system may offer connectivity for a performance hub/NFV services, a WAN connection, and Internet Service connection (ISP/Internet Connect) 1512, and third-party cloud services (IaaS/SaaS).

A virtual router may be configurable by a customer using a user interface to the virtual router. The communication with the virtual router may be via a dedicated management interface for the customer to the virtual router. A virtual router may be deployed using an Infrastructure-aaS option with a virtual router user interface, i.e., the customer may deploy a third-party NFV router selected by the customer, e.g., from a marketplace that may be run by the data center and/or cloud exchange provider. In other words, the cloud exchange provider provides the infrastructure (e.g., processing and bandwidth) for the virtual router. The provider may charge for processing, memory, and bandwidth. The customer may pay for a license and support directly to the NFV router vendor. The provider may provide out of band access for virtual router configuration as well as a minimum configuration. The customer may then manage the device and configuration using management/interface protocols. The out-of-band access may be enabled by a management interface provided by the provider that provides direct configuration access to the virtual router, unmediated by APIs or other interfaces of the data center provider, but at least in some cases directly using the virtual router vendor-supplied interface.

A virtual router may be deployed in using a Software-aaS option with a virtual router user interface, i.e., the customer runs the provider-provided router service. In other words, the provider provides the software as well as the infrastructure for the virtual router. The provider may charge for bandwidth and the virtual router services. The provider may further provide a simplified portal for management of IP addresses, router filters, NAT rules, routing protocols, access control lists, and virtual private networks. The provider may also provide support, but the customer substantially configures the virtual router.

Figure 16:
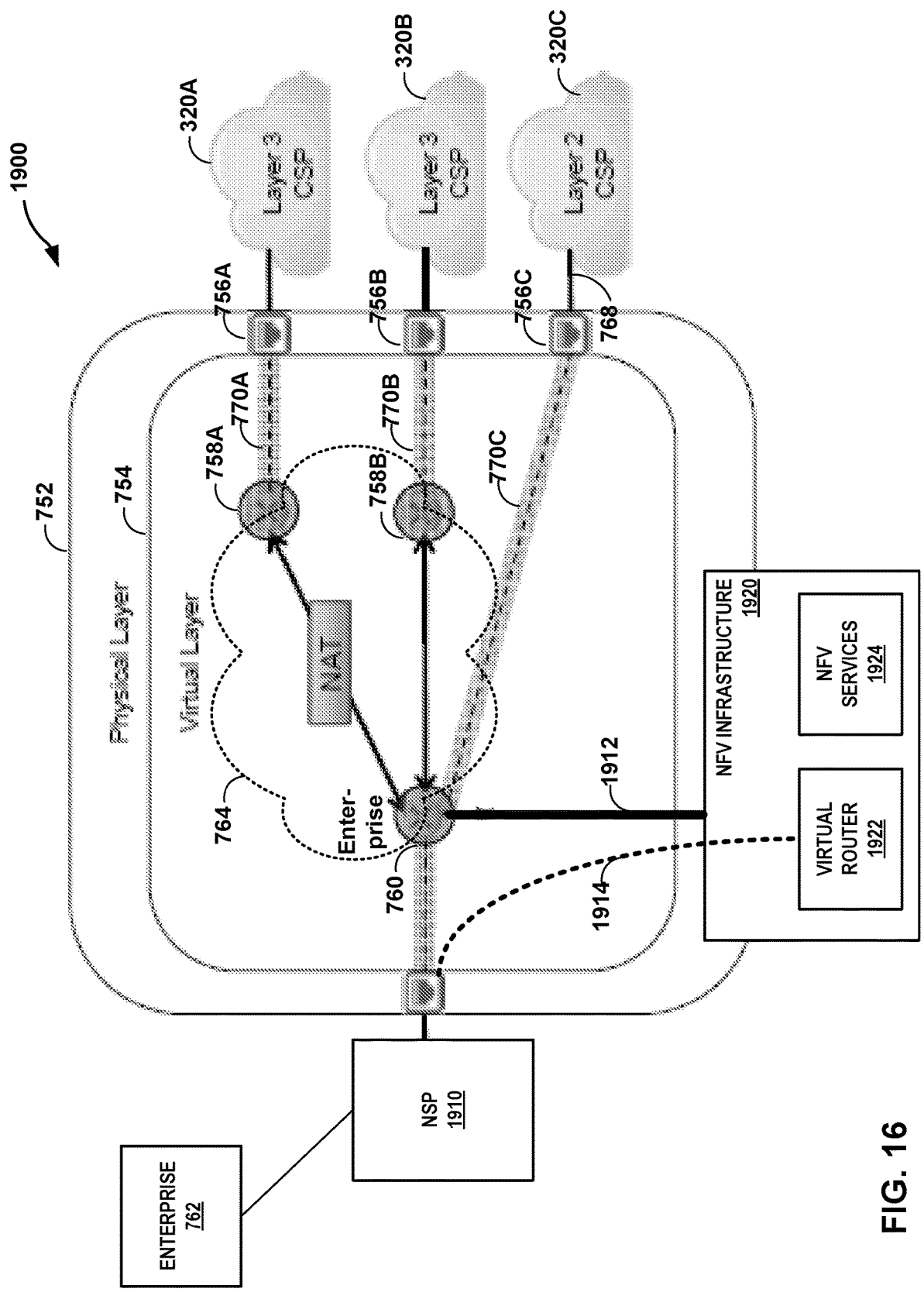
FIG. 16 is a block diagram illustrating a system in which a virtual router routes packet flows among networks using a virtual network layer provided by a data center provider, according to the described techniques.

FIG. 16 is a block diagram illustrating a system in which a virtual router routes packet flows among networks using a virtual network layer provided by a data center provider, according to the described techniques. System 1900 is similar in some respects to system 780 of FIG. 7B in that a cloud exchange includes a physical layer 752 and a virtual layer 754 that consisting in part of customer-specific layer 3 instances for, e.g., multi-network connectivity. System 1900 further includes NFV infrastructure (NFVI) 1920 of one or more computing devices to execute NFV services including virtual router 1922 and other NFV services 1924. The one or more computing devices may represent one or more real or virtual servers located in the data center that hosts the physical layer 752. In some cases, the computing devices may be in another data center or a remote office connected to the physical layer. The physical layer 752 may be referred to herein as a data center network and may include a switch fabric, as described in further detail below.

In general, an NFV implementations include multiple virtualized network functions (VNFs). The cloud exchange provider, for example, may deploy NFVI 1920 and other NFVI instances described herein in the form of one or more computing devices to apply, to data traffic traversing a computer network, network services such as firewall, carrier grade network address translation (CG-NAT), performance enhancement proxies for video, transport control protocol (TCP) optimization and header enrichment, caching, and load balancing. Each of these network services may be referred to as a network function and may be performed by a virtualized network function, which may be executed by one or more virtual machines, containers, or other execution environment of the NFV Infrastructure. In this way, virtualized network functions may be executed by servers, switches, storage devices, and cloud computing infrastructure, instead of having custom hardware appliances for each network function. NFVI 1920 and other NFVI instances described herein may include computing hardware, storage hardware, and network hardware for executing VNFs. NFVI 1920 and other NFVI instances described herein further includes a virtualization layer over the hardware to offer virtual computing, virtual storage, and virtual network for executing VNFs using virtual environments.

A cross-connect 1912 between NFV infrastructure 1920 and physical layer 752 enables connectivity between NFV infrastructure 1920 and networks connected to the physical layer 752. A virtual circuit 1914 is provisioned in the virtual layer 754 to create an interconnection between virtual router 1922 and a port of physical layer 752 to which NSP network 1910 is connected. Enterprise 762 has connectivity to physical layer 752 via NSP 1910. As further described below with respect to FIGS. 19-26, system 1900 may be configured according to techniques described in this disclosure to provide NFV services within a data center without requiring, at least in some cases, co-location of dedicated NFV appliances within the data center. In this way, virtual router 1922 in combination with NFV services 1924 provide a virtual performance hub. In some examples, NFV services 1924 are hosted by any of CSPs 320.

Figure 17:
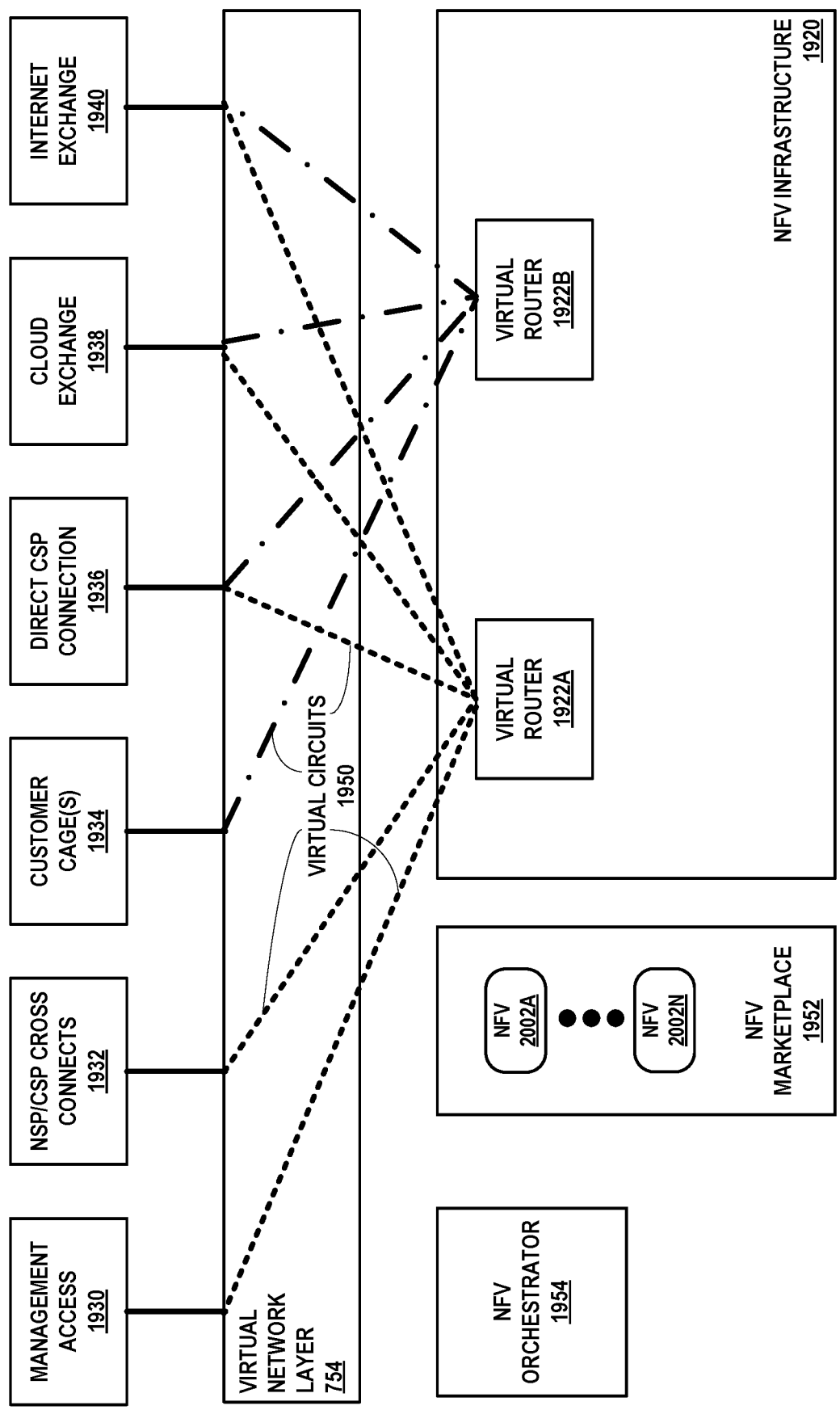
FIG. 17 is a conceptual diagram illustrating virtual routers for respective customers according to techniques described herein.

FIG. 17 is a conceptual diagram illustrating virtual routers for respective customers according to techniques described herein. Virtual network layer 754 for a data center enables connectivity among NFV infrastructure 1920 and networks and service connected to NFV infrastructure, which in the examples of FIGS. 17-24 include management interfaces for management access 1930, NSP/CSP networks via cross-connects 1932, the enterprise customer cage(s) 1934 having customer equipment for enterprises co-located in the data center, direct connections to cloud service providers ("Direct CSP Connection") 1936, a cloud exchange ("ECX") 1938, and an Internet Exchange ("IX") 1940, using respective virtual circuits 1950 between these entities and each of the virtual router 1922. An NFV marketplace with one or more NFV services 2002A-2002N loadable to the NFV infrastructure 1920 may be offered by the data center provider to the customers corresponding to virtual routers 1922A-1922C.

Each of virtual routers 1922A-1922C represents an example instance of virtual router 1922 of FIG. 16. The data center provider may provision cross-connects and virtual circuits 1950 to a virtual router for a customer for any of the above listed networks and interfaces. The customer may subsequently, using management access, configure the virtual router with routing information to direct packet flows along a desired path.

The enterprise customer may lease computing resources from the data center provider, which configures the computing resources of NFV infrastructure 1920 to provide management access to the customer for configuring one or more NFV services (including a virtual router 1922, e.g.) to execute on the NFV infrastructure 1920. The enterprise customer may then manage the NFV services using the NFV service interface, via the management access interface 1930 supplied by the data center. Although described primarily in relation to enterprise customers, the virtual router and virtual performance hub techniques described herein may be applicable in relation to cloud service provider, network service provider, managed service provider, or other "provider" customers of the data center provider.

In this way, the data center provider offers the virtual router as a service to the enterprise such that the enterprise need not deploy its own customer equipment to control a router for routing, through the data center and networks connected therein, packet flows associated with the enterprise. A virtual router-aaS may be offered in partnership with NFV vendors. An enterprise customer or other customer of the data center provider may lease co-location space, purchase cross-connects, management access, Internet connections, cloud exchange connections, and/or Internet exchange connections. The customer may purchase NFV licenses and support from NFV vendors or partners. The customer may lease computing power, memory, bandwidth from the data provider in lieu of co-location space/power. The provider may perform minimal device configuration to give customer access to configure the NFVs. The customer may manage NFV through the vendor-supplied interface.

A router as a service (router-aaS) within a data center environment may enable use cases benefitting enterprises, cloud service providers, and network service providers/managed service providers. For enterprises, router-aaS from a data center provider that provides co-location and interconnection, e.g., may enable a multi-cloud router with high throughput data migration/exchange across clouds, low latency service interoperability across clouds, multi-cloud disaster recovery/high availability. Router-aaS may further enable interconnection ecosystem access, an SD-WAN cloud hub, NFV-aaS, and a performance hub-aaS as described herein.

For cloud service providers, a virtual router-aaS may enable nested CSPs, omnipresent CSPs in remote markets, interdependent CSPs, and cross connect-based CSPs accessed over a cloud exchange. For NSPs/MSPs, a virtual router-aaS may enable rapid NFV-aaS time to market, with NSP as a seller on a cloud exchange, NFV ecosystem participation, and resale of interdependent CSPs, for example.

FIGS. 18-24 are conceptual diagrams depicting use cases for the system of FIG. 17 that includes a data center-provided NFV infrastructure for execution of NFV services.

Figure 18:
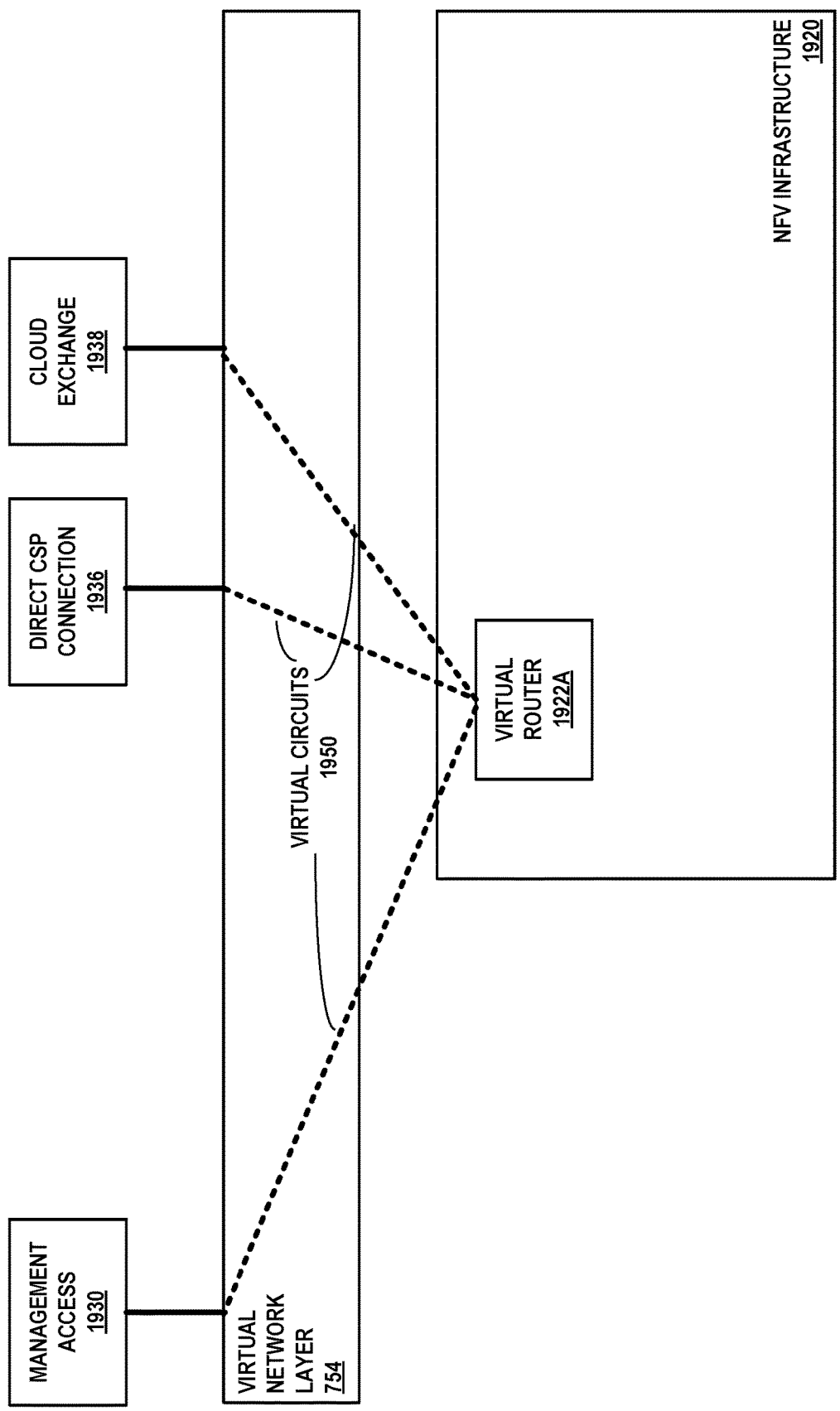
FIGS. 18-24 are conceptual diagrams depicting example use cases for the system of FIG. 17 that include a data center-provided NFV infrastructure for execution of NFV services.

FIG. 18 depicts a multi-cloud router use case in which the data center provider provisions the physical network layer 752 (not shown) with one or more cross-connects and the virtual network layer 754 with one or more virtual circuits to connect a cloud exchange and/or a cloud service provider to virtual router 1922 executed by NFV infrastructure 1920. The virtual router 1922 is configured with IP interfaces and the external Border Gateway Protocol (BGP) for importing/exporting routes and routing packet flows among the cloud exchange 1938 and/or the cloud exchange provider 1936. The customer may configure the virtual router 1922 via the management access interface 1930. The customer has a virtual router provisioned to route between CSOs available via the cloud exchange or a cross-connect (e.g., Direct Connect). The customer has management access to the virtual router but may not have other direct connectivity to the virtual router. A virtual circuit (L2/L3) links a physical port to a virtual endpoint for the virtual router. A virtual router service or customer-chosen NFV router is configured with IP interface and external BGP. External management access to the NFV router enables the customer to manage the device configuration. The IP interfaces may represent IP interfaces for different NFV services executed by NFV infrastructure 1920 or by one or more CSPs.

Figure 19:
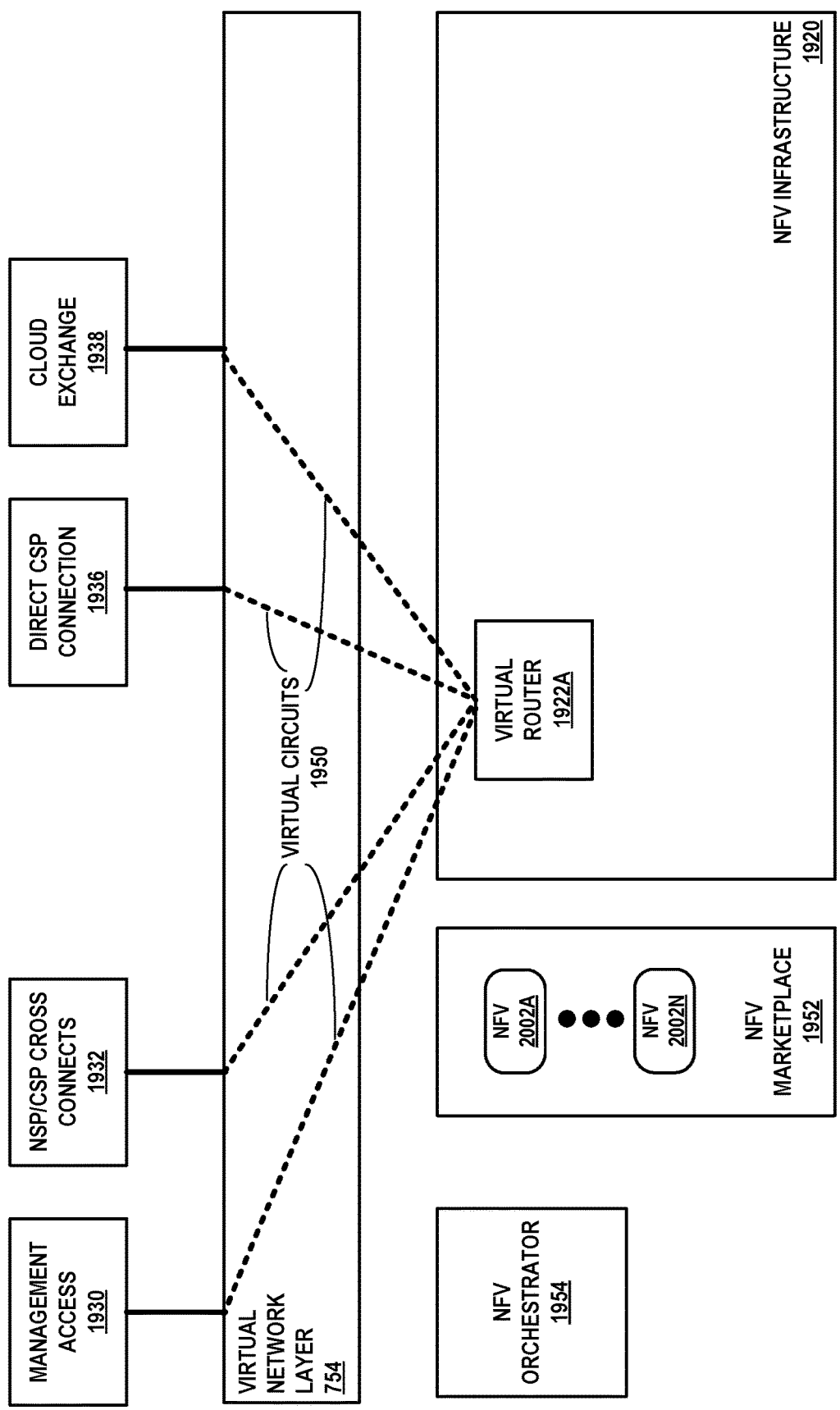

FIG. 19 depicts a multi-cloud router use case in which the data center provider provisions the physical network layer 752 (not shown) with one or more cross-connects and the virtual network layer 754 with one or more virtual circuits to connect a cloud exchange 1938 and/or a cloud service provider 1936 to virtual router 1922 executed by NFV infrastructure 1920 and to provide connectivity with a remote enterprise network not co-located in the data center. The virtual router 1922 is configured with IP interfaces and the external Border Gateway Protocol (BGP) for importing/exporting routes and routing packet flows among the cloud exchange 1938 and/or the cloud exchange provider and the enterprise customer network via an NSP network. A cross connect 1932 from the NSP network to the physical network layer 752 and a virtual circuit over the cross-connect that terminates at the virtual router 1922 may enables communications between the enterprise network and the virtual router and thus to the other networks. The customer may configure the virtual router 1922 via the management access interface 1930. The system of FIG. 19 may be similar in some respects to the system of FIG. 18.

Figure 20:
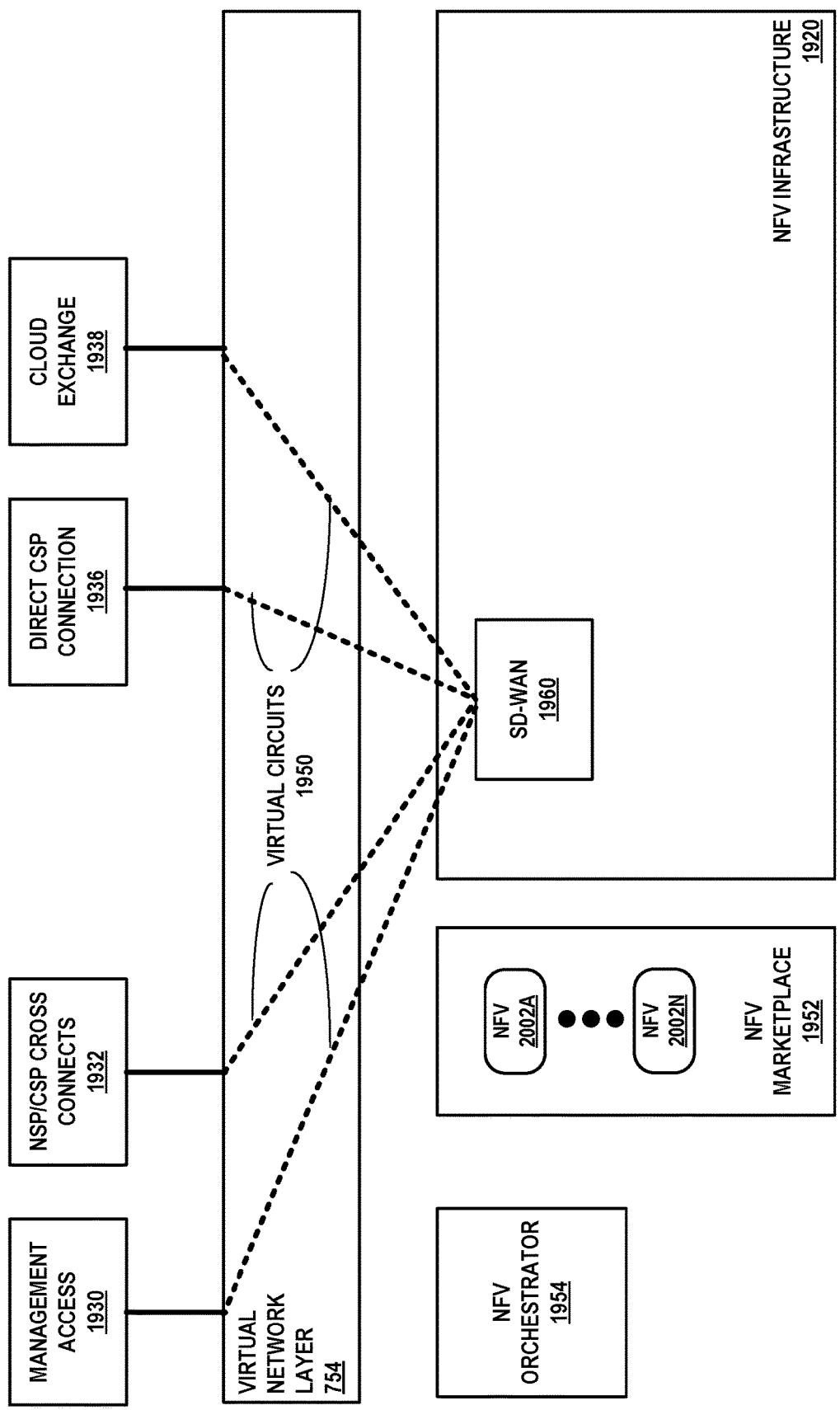

FIG. 20 depicts a system similar to that depicted in FIG. 19, but instead of virtual router 1922, the customer selects SD-WAN software to execute by NFV infrastructure 1920. The SD-WAN software may be chosen from an SD-WAN marketplace and configured per the vendor's requirements.

Figure 21:
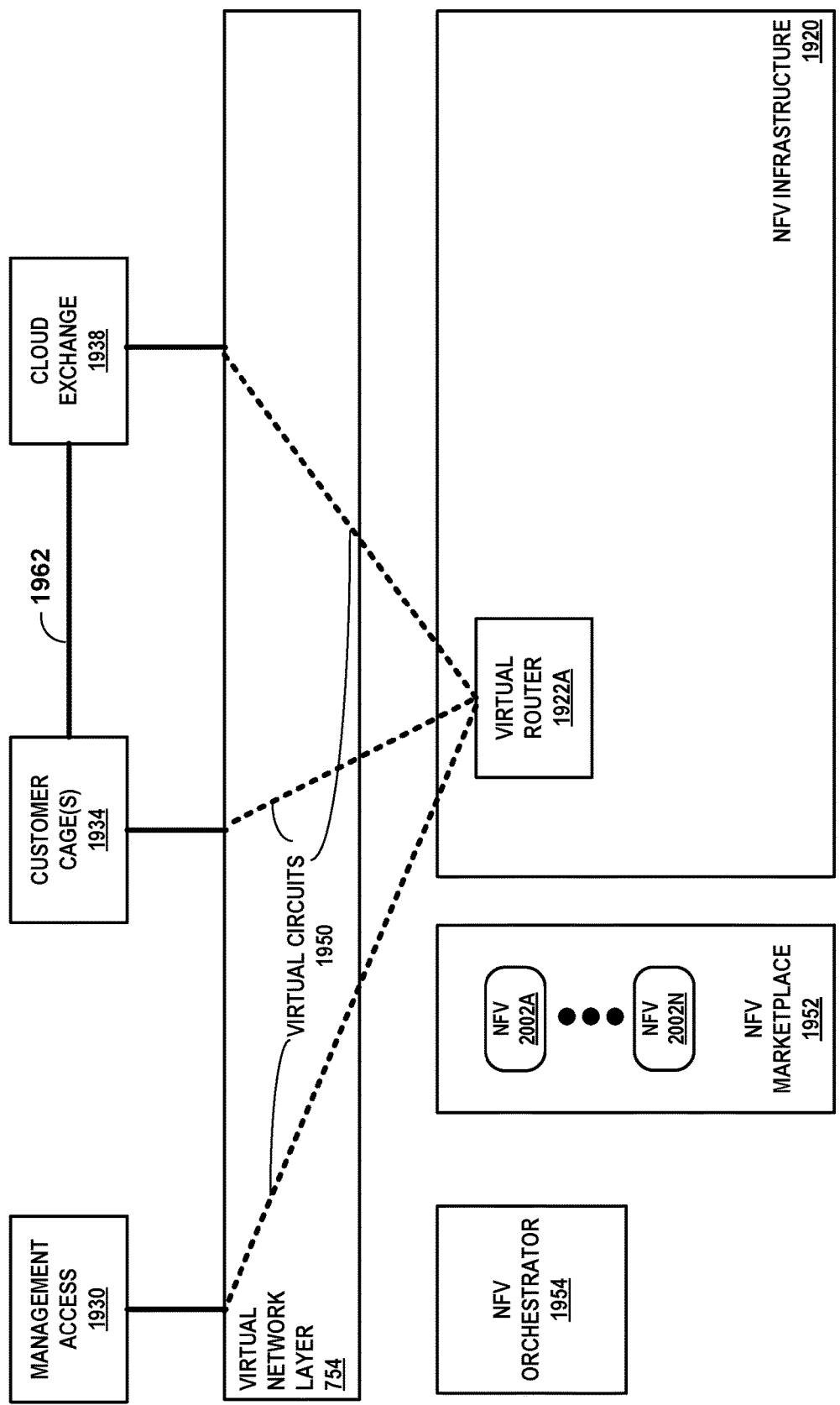

FIG. 21 depicts a system in which a customer requests a virtual router that manages a VPN service to manage VPN connections with CSPs from the enterprise network co-located within a customer cage 1934 in the data center. The VPN traffic may flow through the virtual router or hairpin back to the customer network in the cage 1934. The customer may configure the VPN service via the management access interface 1930. The virtual router service or customer-chosen NFV router is configured with IP interfaces and VPN parameters. In this system, a physical cross-connect connects the customer's cage to the virtual network layer 754. The system of FIG. 21 may be similar in some respects to the system of FIG. 19.

Figure 22:
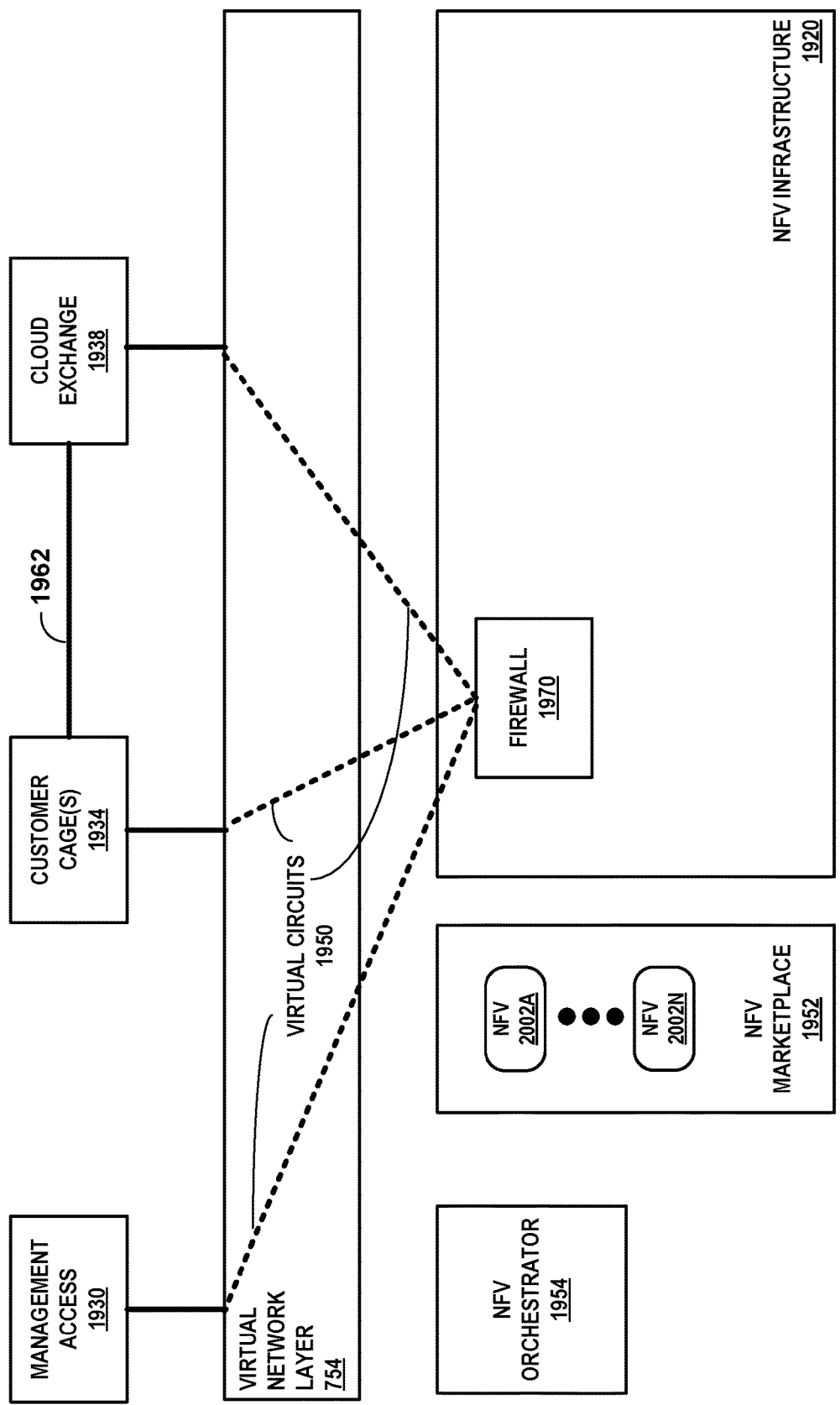

FIG. 22 depicts a system in which a customer requests a software-based firewall service or NFV firewall for traffic between the enterprise network co-located within a customer cage 1934 in the data center and the cloud exchange 1938 (or direct connection to a CSP). The customer deploys an NFV firewall for security purposes as opposed to hardware in their own cage. The secured traffic may flow through the NFV firewall or hairpin back to the customer network in the cage. The customer may configure the firewall via the management access interface 1930 with IP interfaces and firewall rules. The system of FIG. 22 may be similar in some respects to the system of FIG. 21.

Figure 23:
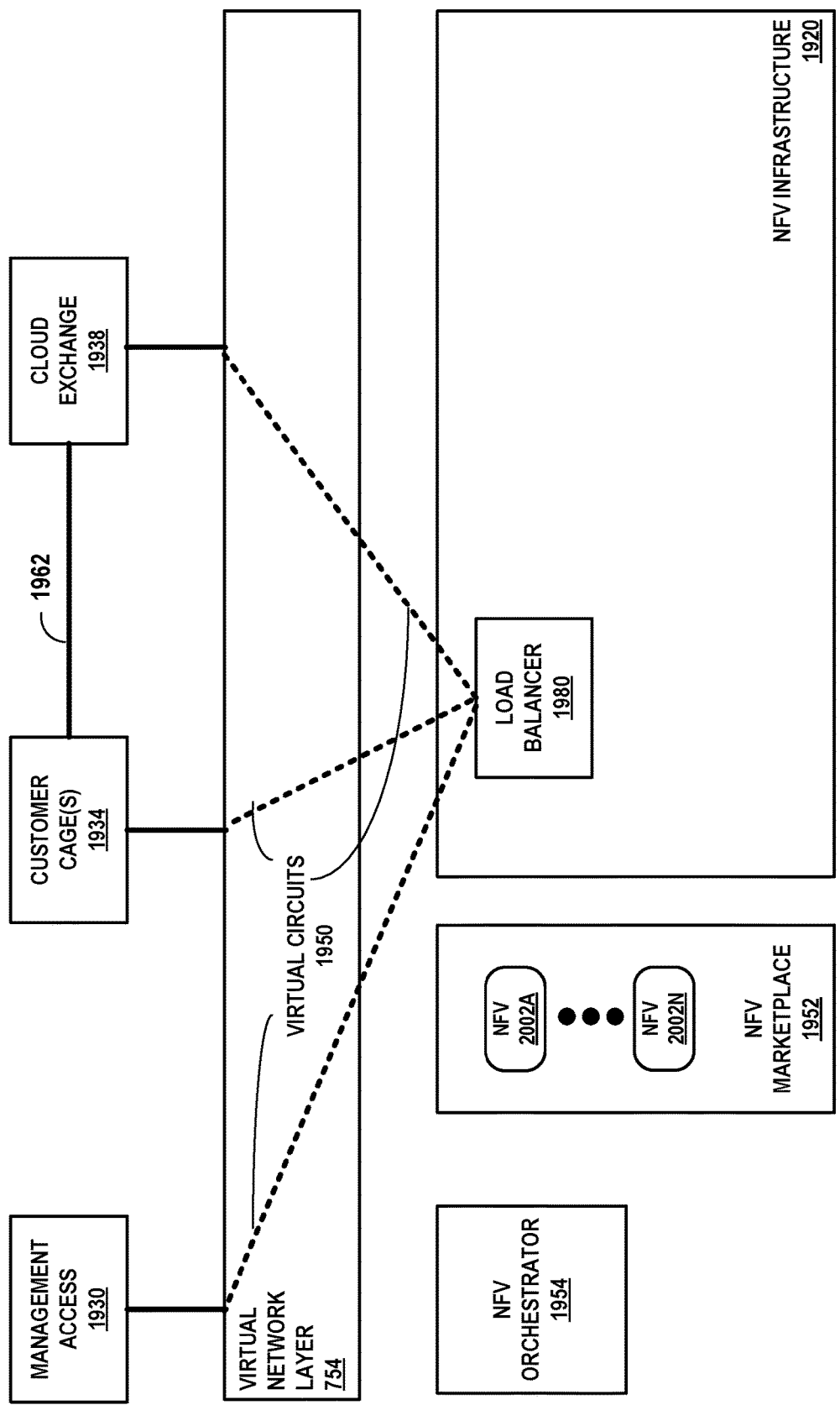

FIG. 23 depicts a system in which a customer requests a software-based load balancer service or NFV load balancer for traffic between the enterprise network co-located within a customer cage 1934 in the data center and the cloud exchange 1938 (or direct connection to a CSP). The customer deploys an NFV load balancer for load balancing as opposed to hardware in their own cage. The load-balanced traffic may flow through the NFV load balancer or hairpin back to the customer network in the cage. The customer may configure the load balancer via the management access interface 1930. The system of FIG. 22 may be similar in some respects to the system of FIG. 20.

Figure 24:
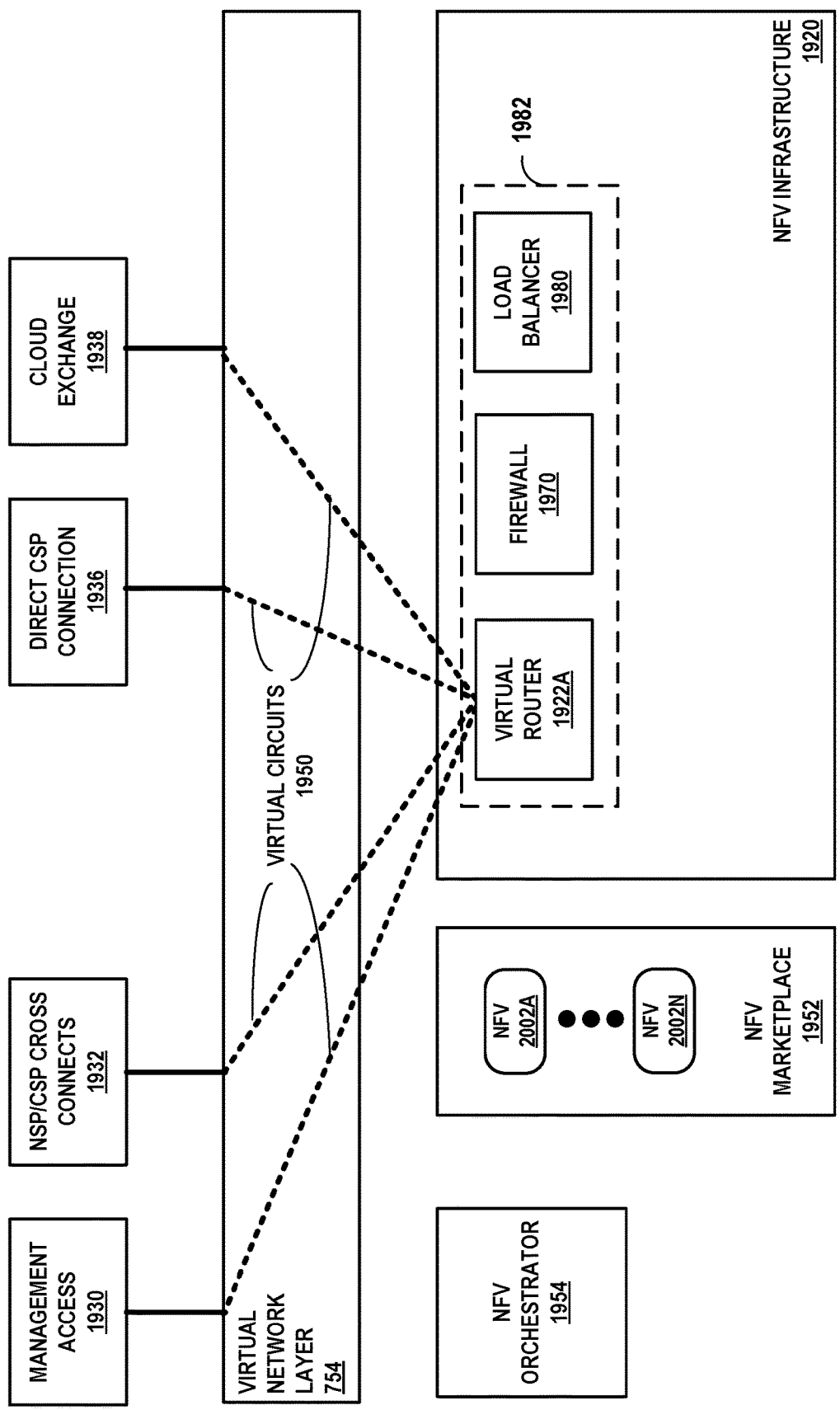

FIG. 24 is a conceptual diagram illustrating an example virtual performance hub 1982 that includes virtual router 1922 and NFV services 1924A-1924B. In this example, NFV infrastructure 1920 hosts virtual router 1922 and one or more additional NFV services 1924A-1924B, here, a firewall service 1970 and a load balancer 1980. In some examples, third-party NFV services may be hosted at a cloud service provider network accessible via the cloud exchange. The customer may configure the virtual router to route packet flows among the NFV services to route, secure, and load balance flows between CSPs available via the cloud exchange 1930 or via a cross connect 1932. The NSP may provide an external connection to the enterprise network. The customer may configure the NFV services including virtual router 1922 via the management access interface 1930 with IP interfaces and device-specific rules.

Figure 25:
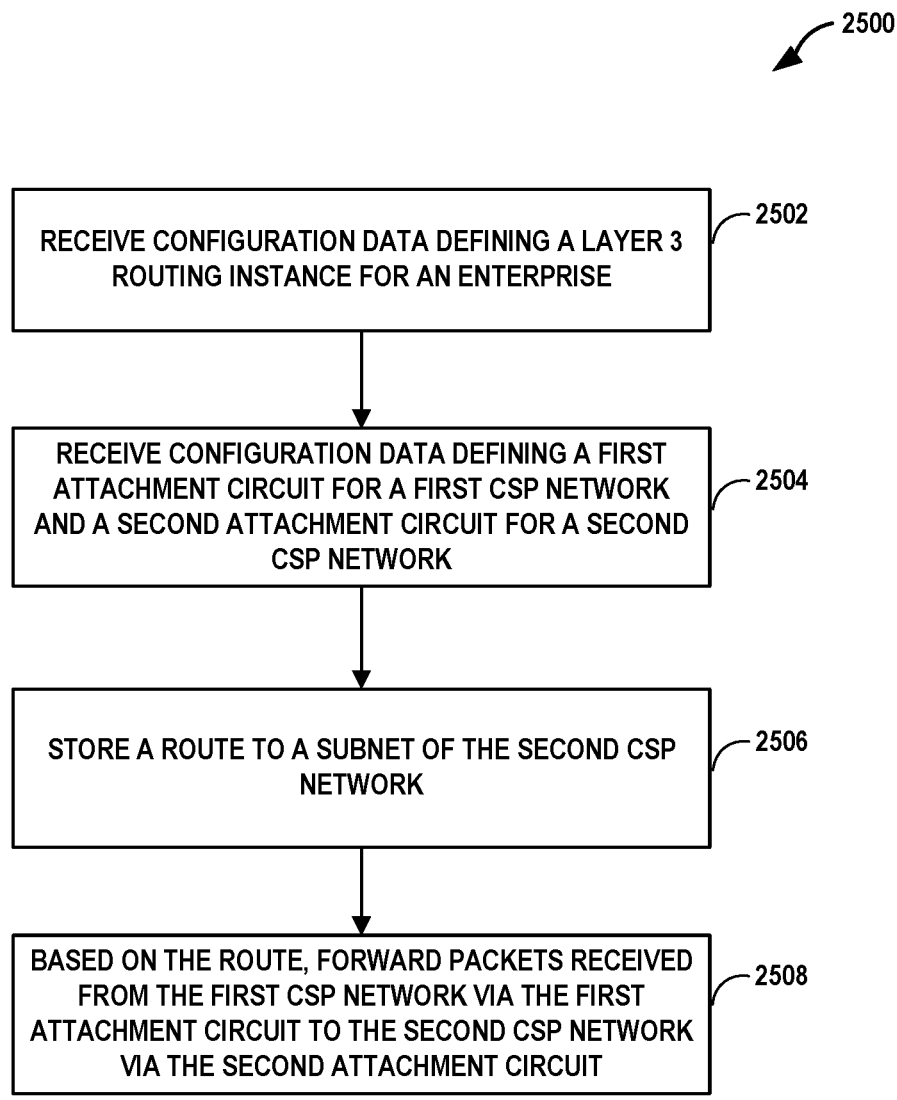
FIG. 25 is a flowchart illustrating an example mode of operation for a layer 3 network of a cloud exchange, according to techniques described in this disclosure.

FIG. 25 is a flowchart illustrating an example mode of operation for a layer 3 network of a cloud exchange, according to techniques described in this disclosure. Mode of operation 2500 is described with respect to PE 502 but may be performed by other PE devices of layer 3 network described in this disclosure.

Provider edge router 502 receives configuration data defining layer 3 (L3) routing instance 512 for an enterprise customer of the cloud exchange provider (2502). Provider edge router 502 further receives configuration data defining a first attachment circuit for a first cloud service provider network for communicating with the L3 routing instance 512, and a further defining a second attachment circuit for a second cloud service provider network for communicating with the L3 routing instance 512 (2504). Provider edge router 502 receives a route to a subnet of the second cloud service provider network (2506). PE router 502 may receive the route from the enterprise customer or from the second cloud service provider network via the second attachment circuit, for example. Based on the route, the PE router 502 executes the L3 routing instance 512 to forward packets from the first cloud service provider network, received by the PE router 502 via the first attachment circuit, to the second cloud service provider network, via the second attachment circuit (2508). In this way, the L3 routing instance may enable customer 510 to facilitate inter-cloud service provider network packet flows associated with the customer 510 via the cloud exchange 504, without routing such packet flows through a router deployed by the customer 510 in co-location space leased from the data center 514 provider.

Figure 26:
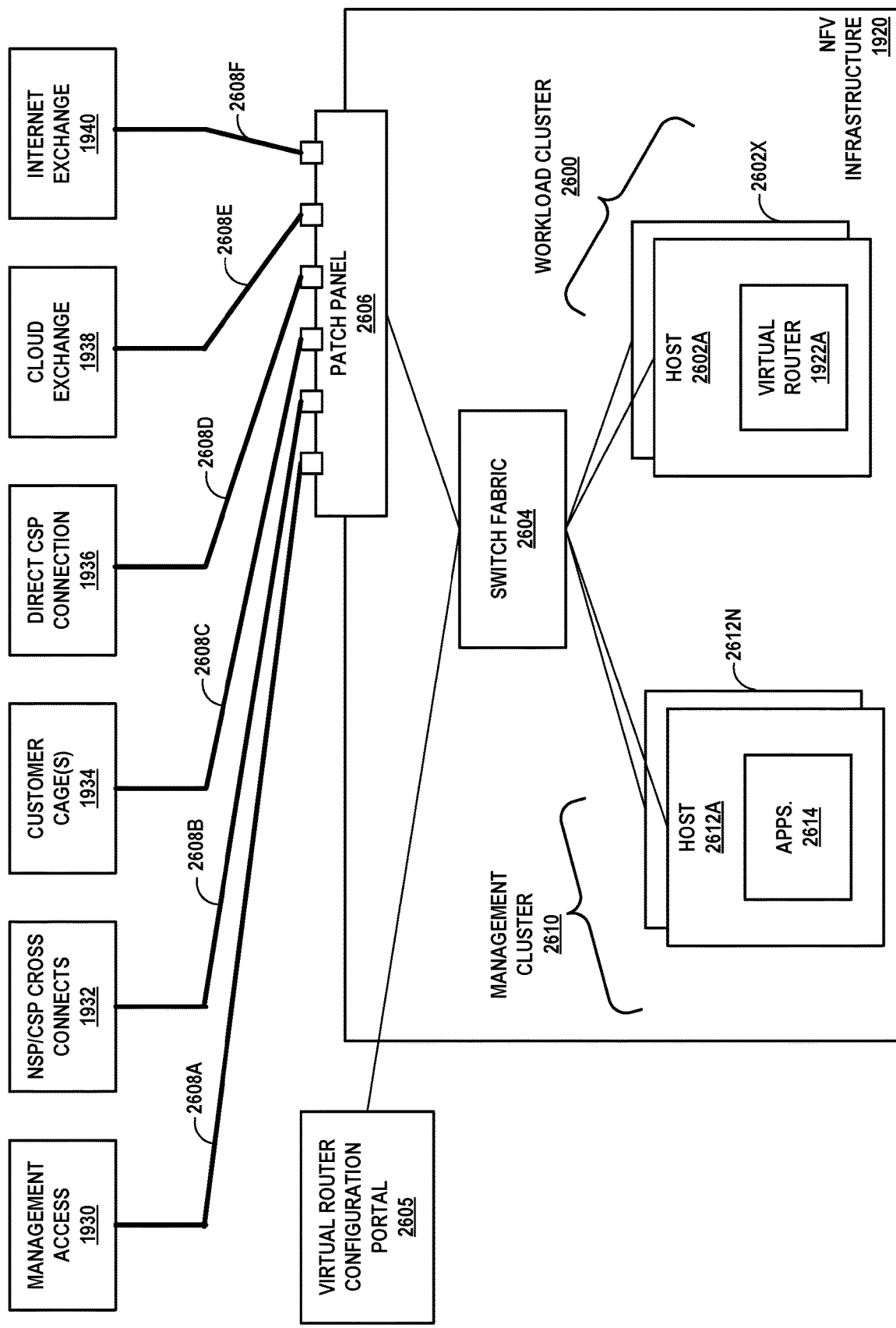
FIG. 26 is a block diagram illustrating a high-level example of hardware resources for a network function virtualization infrastructure for applying virtual routing techniques for implementing a virtual performance hub, according to techniques described in this disclosure.

FIG. 26 is a block diagram illustrating a high-level example of hardware resources for a network function virtualization infrastructure for applying virtual routing techniques for implementing a virtual performance hub, according to techniques described in this disclosure. NFV infrastructure 1920 in the example of FIG. 26 includes host servers 2612A-2612N in a management cluster 2610 and host servers 2602A-2602X in a workload cluster 2600, with both clusters coupled by one or more communication links to a switch fabric 2604 of one or more network switching devices. Switch fabric 2604 is coupled by one or more communication links to a patch panel 2606 by which other networks connect to the NFV infrastructure.

More specifically, communication links 2608A-2608F couple one or more of management access 1930, network service providers (NSP)/cloud service providers (CSP), customer cages 1934 for customer cages co-located in the data center(s) of the data center provider, direct CSP connections 1936, a Cloud Exchange 1938, and an Internet Exchange 1940 to the patch panel 2606 having connectivity to the NFV infrastructure 1920 switch fabric 2604. Communication links 2608 between the networks and the patch panel 2606 may represent cross-connects or virtual circuits.

Hosts 2612 execute one or more management applications 2614 for managing virtualized infrastructure of NFV infrastructure 1920 and orchestrating and deploying NFVs to the virtualized infrastructure. Applications 2614 may include, for instance, OpenStack, VMware applications for virtualization management, Contrail Service Orchestration by Juniper Networks, Network Function Virtualization and Orchestration applications by Cisco, Kubernetes, and Kernel-based VM. In some examples, applications 2614 may operate as Virtualized Infrastructure Managers (VIM), VNF Managers, and NFV Orchestrators to manage infrastructure virtualization, manage VNFs, and apply software-defined networking to network elements to ensure proper traffic flow for the customer traffic through the virtual router and virtual performance hub elements.

A virtual router configuration portal provides an external interface by which the customer may configure a virtual router 1922 deployed by the data center provider for the customer. The virtual router configuration portal may present interfaces for entering configuration data for the virtual routers and send the configuration, via the Internet, to the NFV infrastructure 1920 using a management access interface. The virtual routers 1922 receive configuration data originated by the virtual router configuration portal and operate according to the configuration data.

Figure 27:
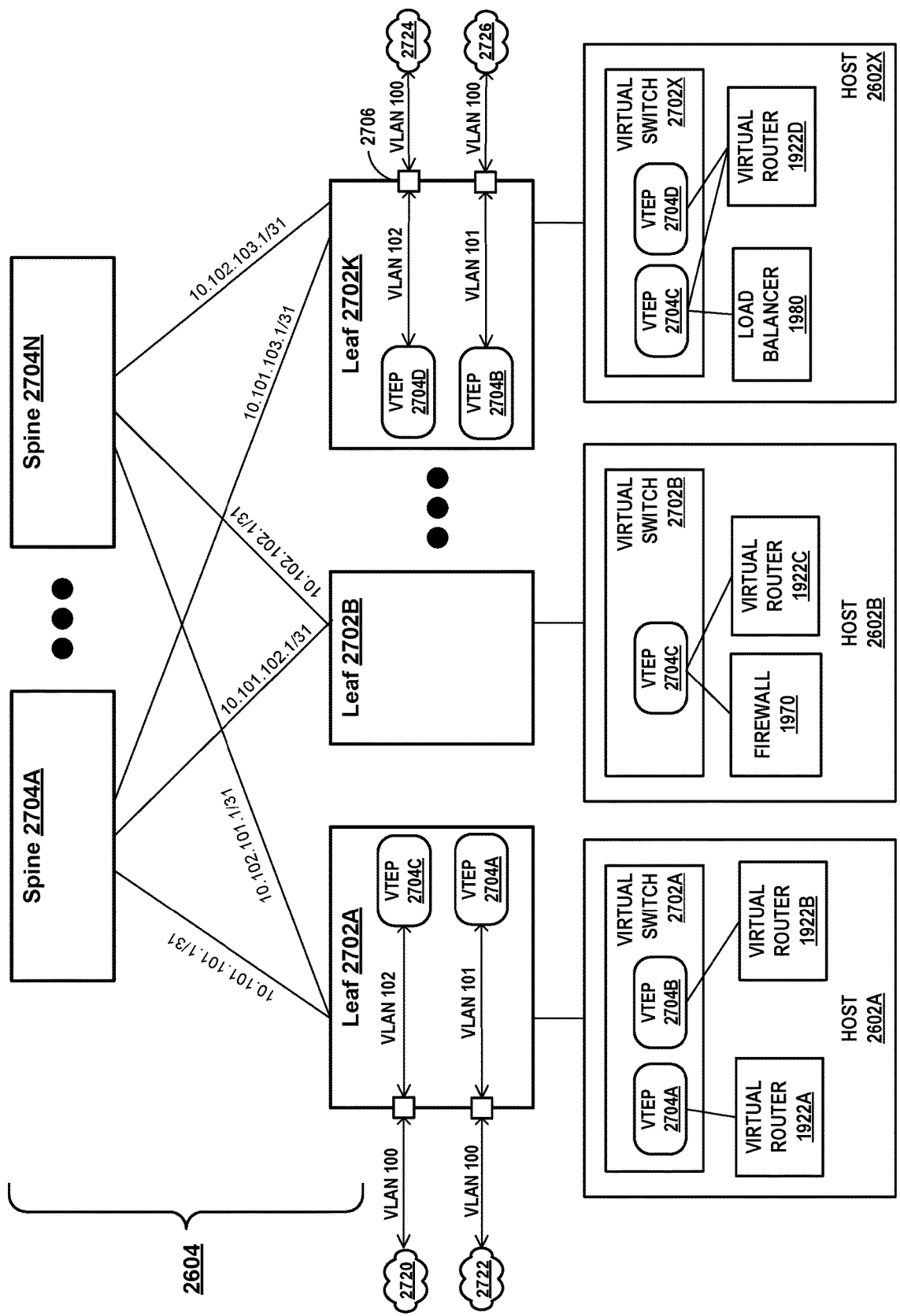
FIG. 27 is a block diagram illustrating, in further detail, example networking resources for a network function virtualization infrastructure for applying virtual routing techniques for implementing a virtual performance hub, according to techniques described in this disclosure.

FIG. 27 is a block diagram illustrating, in further detail, example networking resources for a network function virtualization infrastructure for applying virtual routing techniques for implementing a virtual performance hub, according to techniques described in this disclosure. In this example, switch fabric 2604 for NFV infrastructure 1920 includes a multi-level switching fabric of leaf switches 2702A-2702K coupled to a distribution layer of spine (or "chassis") switches 2704A-2704N. Although not shown, network infrastructure of NFV infrastructure may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. NFV infrastructure 1920 may also include one or more physical network functions (PNFs) such as physical firewalls, load balancers, routers, route reflectors, broadband network gateways (BNGs), Evolved Packet Cores or other cellular network elements, and other PNFs.

In this example, leaf switches 2702 and chassis switches 2704 provide host servers 2602A-2602X with redundant (multi-homed) connectivity to switch fabric 2604 and by extension to any of management access 1930, NSP/CSP 1932, customer cages 1934, direct CSP connections 1936, a Cloud Exchange 1938, and an Internet Exchange 1940. Leaf switches 2702 may be Top-of-Rack (TOR) switches. Spine switches 2704 aggregate traffic flows and provides high-speed connectivity between leaf switches 2702. Leaf switches 2702 and spine switches 2704 may be network devices that provide layer 2 (MAC) and/or layer 3 (e.g., IP) routing and/or switching functionality. Leaf switches 2702 and chassis switches 2704 may each include one or more processors and a memory and can execute one or more software processes. Chassis switches 2704 may implement or be coupled to an IP transport fabric or cloud, which may perform layer 3 routing to route network traffic between leaf switches 2702 and other networks. The switching architecture of NFV infrastructure 1920 is merely an example. Other switching architectures may have more or fewer switching layers, more or fewer spine switches 2704 or leaf switches 2704, or use transport technologies other than VXLAN for tunneling traffic over the underlay network provided by switch fabric 2604 between endpoints 2704.

In the example illustrated for an external network overlay fabric, virtual LANs (VLANs) enable virtual connections for local external connections to networks external to the NFV infrastructure 1920. External VLANs for exchanging traffic with external networks (e.g., associated with or reachable via any of NSP/CSP 1932, customer cages 1934, direct CSP connections 1936, a Cloud Exchange 1938, and an Internet Exchange 1940) are significant at the port level for leaf switches 2702. Switch VLANs are significant at the switch level, and VXLAN virtual network identifiers (VNIs) are globally significant in the switch fabric 2604. A dedicated fabric-global VLAN and VXLAN may be used for management traffic between management access interface 1930 and workload hosts 2602.

Leaf switches 2702 implement VXLAN virtual tunnel endpoints (VTEPs) 2704 to create overlay networks (here, VXLAN segments for segment routing) for external networks to communicate with NFV executing by NFV infrastructure 1920 of the data center provider. Hosts 2602 include respective virtual switches 2702 that also implement VXLAN VTEPs 2704 for the overlay networks. A virtual switch 2702 may represent a Contrail vRouter, an Open vSwitch (OVS), a Virtual Topology Forwarder from Cisco, or other virtual switch or virtual router component for creating overlay networks.

Hosts 2602 each execute one or more virtual machines and each virtual machine has a unique MAC address. VXLAN is an overlay technology that increases the number of available virtual networks operating over an underlay network to support multi-tenancy and network separation, as well as to ensure MAC address uniqueness within overlay networks. VLAN operates by encapsulating L2 traffic from virtual machines and sending the encapsulated traffic over a logical tunnel known as a VXLAN segment.

As one example of techniques virtual routing for implementing a virtual performance hub, as described herein, external network 2720 may be located within a customer cage 1934 and connect to NFV infrastructure using a communication link 2608C and an external VLAN having a VLAN-ID=100. Leaf switch 2702A has a port coupled to communication link 2608C and locally translates the external VLAN to a switch VLAN having a VLAN-ID=102 for network devices attached to the VTEP 2704C. As a result, switch fabric 2604 and virtual switch 2702B facilitate communication between network 2720 and NFV instances executing on virtual machines hosted by host 2602B, via a VXLAN with VTEPs 2704C and a VLAN having a VLAN-ID=102. Switch fabric 2604 and hosts 2602 configured in this way provide the virtual network layer 756 using VLANs configured for the leaf switch ports by providing virtual connections made up of VLANs and VXLAN segments between networks and the virtual routers 1922 (or other VNFs) executing by NFV infrastructure 1920. Furthermore, the communication links between fabric 2604 and other networks having been established, the operator for the NFV infrastructure 1920 may configure VLANs mappings and VXLAN overlays to realize a "virtual patch panel" in which physical communication links underlie software-reconfigurable virtual connections between the fabric 2604 and other networks in different virtual topologies. The VXLAN overlays may be configured to support VXLAN multicast using multiple multicast group addresses.

Because network 2720 may be co-located within a customer cage 1934 and include a PNF, the system may enable a customer to create a network service having a PNF deployed within the data center and stitch the PNF to a network service that includes one or more VNFs executing by NFV infrastructure 1920, using virtual router 1922C and virtual overlays as described above. Customer may utilize management access to configure virtual router 1922C to connect PNF with VNFs in a service chain of multiple network functions each logically located in a separate network using. Additional description for creating service chains using a virtual router is found above with respect to FIG. 8. and in U.S. Publication No. 2016/0337473, Nov. 17, 2016, which is incorporated by reference in its entirety.

Figure 28:
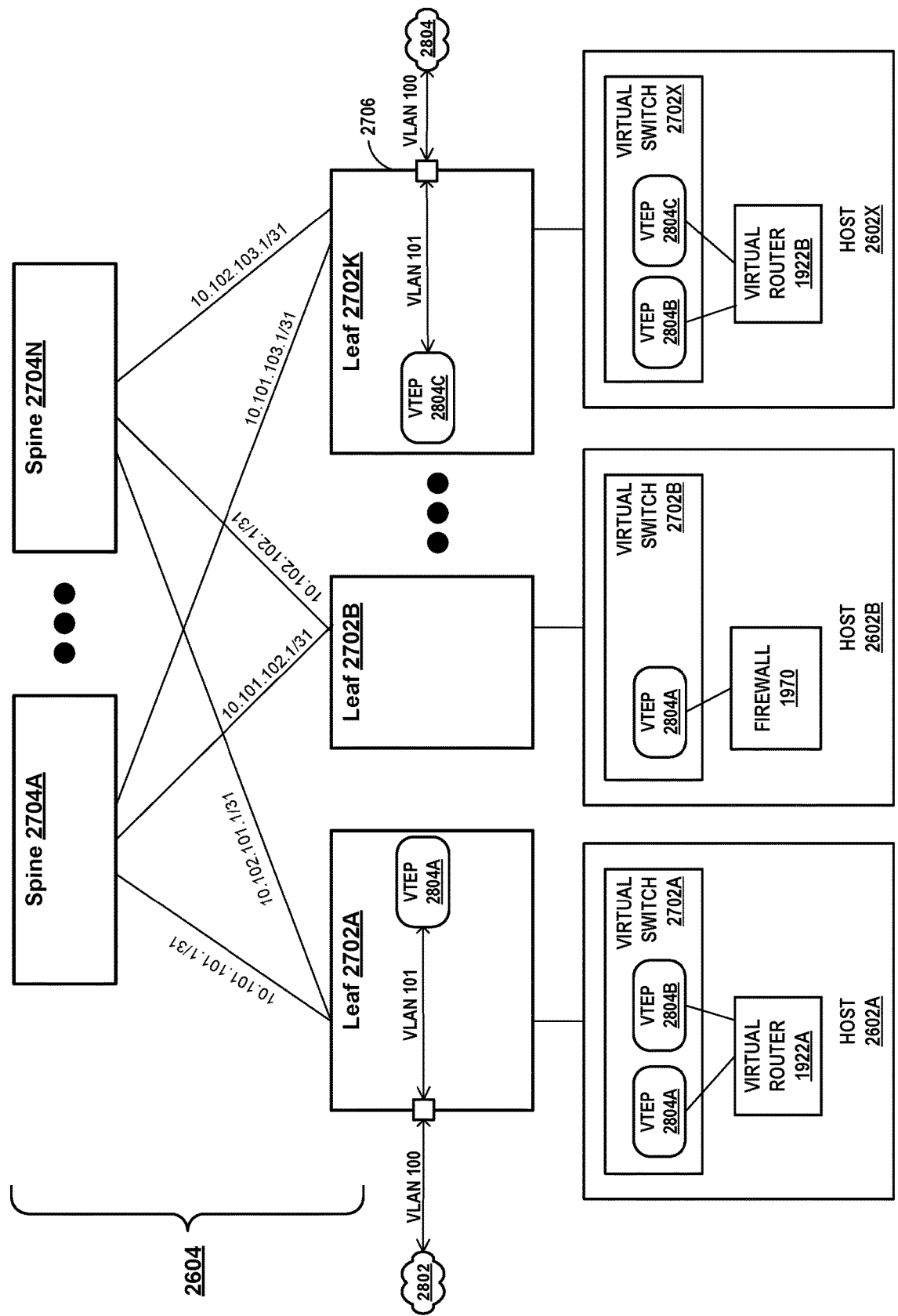
FIG. 28 is a block diagram illustrating, in further detail, example networking resources for a network function virtualization infrastructure for applying virtual routing techniques for implementing a virtual performance hub, according to techniques described in this disclosure.

FIG. 28 is a block diagram illustrating, in further detail, example networking resources for a network function virtualization infrastructure for applying virtual routing techniques for implementing a virtual performance hub, according to techniques described in this disclosure. FIG. 28 illustrates an example configuration for an internal (tenant) network overlay fabric, in which virtual LANs (VLANs) enable virtual connections for local connections to between tenant networks connected to the NFV infrastructure 1920.

In this example, switch fabric 2604 uses VTEPs 2804A to facilitate communication between network 2802 and virtual router 1922A. Similarly, switch fabric 2604 uses VTEPs 2804C to facilitate communication between network 2804 and virtual router 1922B. Switch fabric further uses an intermediate L2 network defined by the VXLAN VNI having VTEPs 2804B to exchange traffic between virtual router 1922A for the first customer network 2802 and virtual router 1922B for the second customer network 2804. As a result, virtual routers 1922A, 1922B may exchange routes for destinations within networks 2802, 2804 and route traffic among VNFs and PNFs located in NFV infrastructure 1920 and customer cage(s) 1934 between network 2802 and network 2804. As a result, the data center provider may offer a virtual performance hub service to customers having networks co-located in the data center, in which a virtual router 1922 routes service traffic among VNFs and PNFs in a service chain controlled at the geographic nexus of physical connectivity, i.e., the multi-tenant data center.

Figure 29:
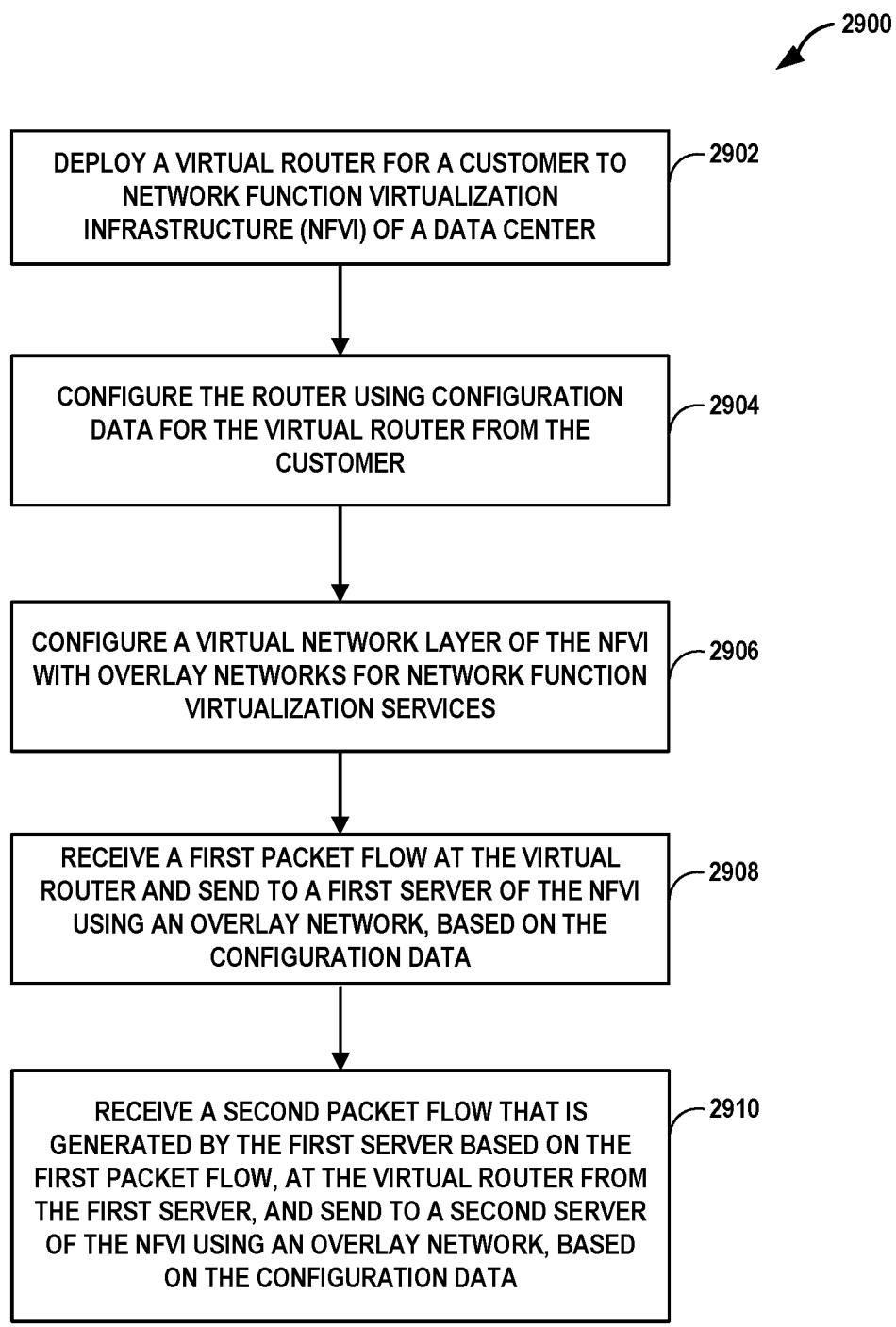
FIG. 29 is a flowchart illustrating an example mode of operation for a virtual router for an enterprise for implementing a virtual performance hub, according to techniques described in this disclosure.

FIG. 29 is a flowchart illustrating an example mode of operation for a virtual router for an enterprise for implementing a virtual performance hub, according to techniques described in this disclosure. Operation 2900 is described with respect to elements of FIG. 27.

A data center provider for a data center deploys a virtual router 1922B for a customer of the data center that is associated with network 2726 that is connected to the data center by at least one NSP 1504 (2902). The customer may use a portal that provides a configuration interface for the virtual router to enter configuration information. The programmable network platform for configuring the data center NFV infrastructure configures the router using configuration data based the configuration information entered to the portal (2904).

The programmable network platform configures the virtual network layer 756 in the form of overlay networks operating over switch fabric 2604 to route traffic to NFV services for the customer (2906). The virtual router 1922D receives a first packet flow for the customer from network 2804 and maps the packet flow to a service chain of the NFV services. Using the overlay network (VXLAN VNI with VTEPs 2704C) and based on the virtual router configuration data, the virtual router 1922B sends the first packet flow to a first host server 2602B (2708). The virtual switch delivers the first packet flow to the firewall 1970, which applies the service to generate a second packet flow. The virtual switch 2702B sends the second packet flow to host 2602X. Based on the virtual router configuration data, the virtual router 1922B sends the second packet flow using a different overlay network to another host server 2602 for application of another NFV service (2910).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:
1. A system comprising:
 at least one computing device deployed to a data center by a provider and configured to execute a virtual router,
 wherein the virtual router is configurable by a customer of the provider to route packet flows to one or more servers that host network function virtualization ser- vices for application of the network function virtualization services to the packet flows,
wherein the virtual router is configured with routing information to cause the virtual router to:
receive a first packet flow from the packet flows;
send the first packet flow to a first server from the servers for application of a first network function virtualization service from the network function virtualization services to generate a second packet flow based on the first packet flow;
receive the second packet flow from the first server; and
send the second packet flow to a second server from the servers for application of a second network function virtualization service from the network function virtualization services to generate a third packet flow based on the second packet flow.

2. The system of claim 1, further comprising:
the one or more servers that host the network function virtualization services.

3. The system of claim 1, wherein the virtual router is configured with routing information to cause the virtual router to route a fourth packet flow from the packet flows to a cloud exchange.

4. The system of claim 1, further comprising:
a management interface configured to provide the customer with direct management access to the virtual router for configuring the virtual router.

5. The system of claim 1, wherein the network function virtualization services comprise at least one of a firewall and a load balancer.

6. The system of claim 1, further comprising:
a switch fabric comprising an underlay network of one or more switches configured to provide overlay networks between the switch fabric and virtual switches configured for execution by the at least one computing device,
wherein the overlay networks transport the packet flows between the virtual router and the one or more servers.

7. The system of claim 6, further comprising:
a port of a switch of the switch fabric coupled by a virtual connection to a network comprising at least one of a cloud service provider network, a network reachable via Cloud Exchange, and a network reachable via an Internet Exchange,
wherein the switch is configured to translate a virtual local area network (VLAN) for the port to a switch VLAN for the switch and forward packet flows transported by the switch VLAN using a first overlay network of the overlay networks to the virtual router.

8. The system of claim 6, further comprising:
a patch panel having a port having a first side to receive a communication link coupled to a switch of the switch fabric and a second side to receive a communication link coupled to one of a network service provider cross connect, a customer cage cross connect, a direct cloud service provider cross connect, a Cloud Exchange cross connect, and an Internet Exchange cross connect.

9. The system of claim 1, wherein at least one of the packet flows is sourced by or destined to a customer network for the customer, the customer network co-located within the data center.

10. The system of claim 1, wherein the provider is a customer of a data center provider of the data center.

11. The system of claim 1,
wherein the first server is deployed by a first cloud service provider to a first cloud service provider network co-located within the data center, and
wherein the second server is deployed by a second cloud service provider to a second cloud service provider network co-located within the data center.

12. The system of claim 11,
wherein the provider is a customer of a data center provider of the data center,
wherein the at least one computing device is deployed to a customer network co-located within the data center.

13. The system of claim 12,
wherein a first virtual circuit of a cloud exchange deployed to the data center is configured to transport the first packet flow between the virtual router and the first cloud service provider network, and
wherein a second virtual circuit of the cloud exchange is configured to transport the second packet flow between the virtual router and the second cloud service provider network.

14. A data center comprising:
a data center network comprising a physical network layer having one or more physical ports to receive cross connects with two or more networks of customer equipment co-located in the data center; and
at least one computing device deployed to the data center and configured to execute a virtual router to route packet flows between the two or more networks,
wherein the virtual router is configured with routing information to cause the virtual router to:
receive a first packet flow from the packet flows;
send the first packet flow to a first server from the servers for application of a first network function virtualization service from the network function virtualization services to generate a second packet flow based on the first packet flow;
receive the second packet flow from the first server; and
send the second packet flow to a second server from the servers for application of a second network function virtualization service from the network function virtualization services to generate a third packet flow based on the second packet flow.

15. The data center of claim 14,
wherein the data center network comprises a virtual network layer configured with a virtual circuit to provide a connection between a network service provider network from the two or more networks and the virtual router, and
wherein the virtual router is configured to route, via the virtual circuit, at least one of the packet flows between the data center network and an enterprise network that sends or receives the packet flows via the network service provider network.

16. The data center of claim 14, wherein the virtual router comprises a management interface, accessible by a customer of a provider of the at least one computing device deployed to the data center, to configure the virtual router to route the packet flows between the two or more networks.

17. A method comprising:
deploying a virtual router to at least one computing device deployed to a data center;
receiving, by the virtual router, configuration data to cause the virtual router to route packet flows to one or more servers that host network function virtualization services for application of the network function virtualization services to the packet flows;
receiving, by the virtual router, a first packet flow from the packet flows;
sending, by the virtual router, the first packet flow to a first server from the servers for application of a first network function virtualization service from the network function virtualization services to generate a second packet flow based on the first packet flow;

receiving, by the virtual router, the second packet flow from the first server; and sending, by the virtual router, the second packet flow to a second server from the servers for application of a second network function virtualization service from the network function virtualization services to generate a third packet flow based on the second packet flow.

18. The method of claim 17, further comprising:

routing, by the virtual router, a fourth packet flow from the packet flows to a cloud exchange.

19. The method of claim 17, wherein the virtual router is deployed by a provider that is a customer of a data center provider of the data center, and wherein a customer of the provider configures the virtual router with the configuration data.

20. The method of claim 17, wherein the first server is deployed by a first cloud service provider to a first cloud service provider network co-located within the data center, and wherein the second server is deployed by a second cloud service provider to a second cloud service provider network co-located within the data center.

\* \* \* \* \*